(12) United States Patent
Topchy et al.

(10) Patent No.: US 12,177,516 B2
(45) Date of Patent: Dec. 24, 2024

(54) METHODS AND APPARATUS TO DETERMINE MEDIA VIEWING INFORMATION FOR HYBRID CONTENT DELIVERY

(71) Applicant: The Nielsen Company (US), LLC, New York, NY (US)

(72) Inventors: Alexander Topchy, Oldsmar, FL (US); Vladimir Kuznetsov, Ellicott City, MD (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

(21) Appl. No.: 17/955,293

(22) Filed: Sep. 28, 2022

(65) Prior Publication Data
US 2024/0107117 A1    Mar. 28, 2024

(51) Int. Cl.
| | | |
|---|---|---|
| *H04N 21/442* | (2011.01) | |
| *H04N 21/235* | (2011.01) | |
| *H04N 21/24* | (2011.01) | |
| *H04N 21/258* | (2011.01) | |

(52) U.S. Cl.
CPC ..... *H04N 21/44204* (2013.01); *H04N 21/235* (2013.01); *H04N 21/2402* (2013.01); *H04N 21/25883* (2013.01)

(58) Field of Classification Search
CPC ........... H04N 21/44204; H04N 21/235; H04N 21/2402; H04N 21/25883
USPC .......................................................... 725/151
See application file for complete search history.

(56) References Cited

U.S. PATENT DOCUMENTS

| | | | |
|---|---|---|---|
| 6,240,555 B1 | 5/2001 | Shoff et al. | |
| 2012/0265735 A1* | 10/2012 | McMillan .......... | H04N 21/6125 707/E17.014 |
| 2014/0172434 A1* | 6/2014 | Price .................... | G10L 19/018 704/500 |
| 2016/0057317 A1 | 2/2016 | Zhao et al. | |
| 2018/0220169 A1* | 8/2018 | Yang .................... | H04N 21/858 |
| 2019/0281349 A1* | 9/2019 | Harkness .............. | G10L 19/018 |

(Continued)

OTHER PUBLICATIONS

Advanced Television Systems Committee, "ATSC Standard: Service Usage Reporting", dated Mar. 31, 2022, 19 pages (Year: 2022).*

(Continued)

*Primary Examiner* — Alfonso Castro

(57) ABSTRACT

Methods and apparatus to determine media viewing information for hybrid content delivery are disclosed. An example apparatus includes at least one memory, machine readable instructions, and processor circuitry to at least one of instantiate or execute the machine readable instructions to monitor network traffic associated with at least one device during a media session, determine viewing information associated with the media session based on a consumption data message in the network traffic, the consumption data message transmitted by the at least one device, determine a program identifier of primary content received by the at least one device, the program identifier indicative of a program presented as the primary content by the at least one device, associate a panelist identifier with the viewing information and the program identifier of the primary content, and generate a media session report based on the panelist identifier, the viewing information, and the program identifier.

20 Claims, 15 Drawing Sheets

(56) References Cited

U.S. PATENT DOCUMENTS

2020/0195535 A1* 6/2020 Smith .............. H04N 21/44209
2020/0314189 A1* 10/2020 Pillers ................ G06Q 30/0201
2021/0014565 A1* 1/2021 Zamudio .......... H04N 21/25866

OTHER PUBLICATIONS

Advanced Television Systems Committee, "ATSC Standard: Signaling, Delivery, Synchronization, and Error Protection", dated Jan. 19, 2021 (Year: 2021).*

Advanced Television Systems Committee, "ATSC Standard: Content Recovery in Redistribution Scenarios", dated Mar. 31, 2022, 64 pages (Year: 2022).*

Advanced Television Systems Committee, "ATSC Standard: Service Usage Reporting", dated Mar. 31, 2022, 19 pages.

Advanced Television Systems Committee, "ATSC Standard: Content Recovery in Redistribution Scenarios", dated Mar. 31, 2022, 64 pages.

Advanced Television Systems Committee, "ATSC Standard: Signaling, Delivery, Synchronization, and Error Protection", dated Jan. 19, 2021, 232 pages.

Cohen et al., "ATSC 3.0: Everything you need to know about broadcast TV's next big thing," www.digitaltrends.com, May 12, 2022, 20 pages.

\* cited by examiner

METHODS AND APPARATUS TO DETERMINE MEDIA VIEWING INFORMATION FOR HYBRID CONTENT DELIVERY

FIELD OF THE DISCLOSURE

This disclosure relates generally to television audience measurement and, more particularly, to methods and apparatus to determine media viewing information for hybrid content delivery.

BACKGROUND

In recent years, the Advanced Television Systems Committee (ATSC) created the standard ATSC 3.0, also known as NextGen TV, which delivers content in a hybrid manner through both an Internet Protocol (IP) and typical broadcast transmission. For instance, programs, such as shows and movies, are broadcasted and received over the air, while commercials, on-demand, and other premium content are delivered over the internet.

Media providers and/or other entities such as, for example, advertising companies, broadcast networks, etc. are often interested in the viewing, listening, and/or media behavior of audience members and/or the public in general. The media usage and/or exposure habits of monitored audience members, as well as demographic data about the audience members, are collected and used to statistically determine the size and demographics of an audience of interest.

Traditionally, audience measurement entities determine audience engagement levels for media programming and/or advertisements based on registered panel members. That is, an audience measurement entity enrolls people who consent to being monitored into a panel. The audience measurement entity then monitors those panel members to collect media measurement data identifying media (e.g., television programs, radio programs, movies, DVDs, etc.) presented to those panel members. In this manner, the audience measurement entity can determine exposure measures for different media (e.g., content and/or advertisements) based on the collected media measurement data.

BRIEF DESCRIPTION OF THE DRAWINGS

The FIGURES are not to scale. In general, the same reference numbers will be used throughout the drawing(s) and accompanying written description to refer to the same or like parts.

Figure 1:
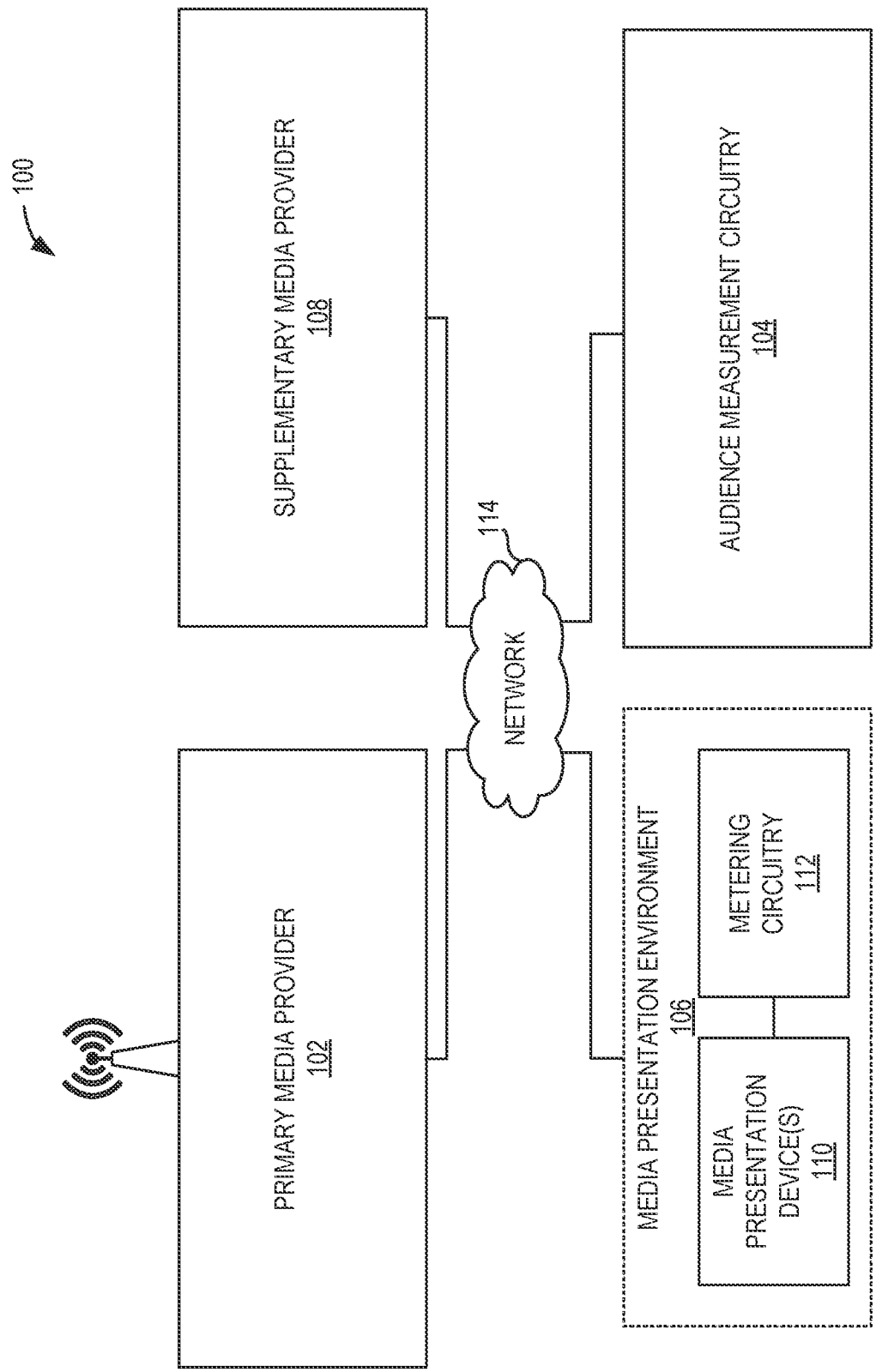
FIG. 1 is a block diagram of an example audience analysis system.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

As used herein, the term "media" includes any type of content and/or advertisement delivered via any type of distribution medium. Thus, media includes television programming or advertisements, radio programming or advertisements, movies, web sites, streaming media, etc.

As used herein, data is information in any form that may be ingested, processed, interpreted and/or otherwise manipulated by processor circuitry to produce a result. The produced result may itself be data.

As used herein, "threshold" is defined to be data such as a numerical value represented in any form, that may be used by processor circuitry as a reference for a comparison operation.

As used herein, "primary content" is defined to be content that is a main program presented for at least some time during a media session. For example, primary content can be a movie, a television show, a documentary, a game, an event, a news report, or any other video content that a user accesses via an over-the-air (OTA) broadcast or the Internet. For example, when a media provider provides a linear service, the primary content is delivered according to a schedule and time base defined by a broadcast. Furthermore, when a media provider is an internet application, the primary content can be delivered to a media device on-demand.

As used herein, "supplementary content" is defined to be content that is supplemental to the primary content. Further, the "supplementary content" is requested by a user and accessed via the Internet. For example, the "supplementary content" can be an advertisement chosen by the user, information associated with the primary content (e.g., an indication of individuals associated with the primary content, statistics associated with the primary content, etc.), and/or other features associated with the primary content (e.g., closed captions, additional and/or alternative camera angles, etc.).

Example methods, apparatus, and articles of manufacture disclosed herein monitor media presentations (e.g., ATSC 3.0 primary content presentations, ATSC 3.0 supplementary content presentations, media sessions, etc.) at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

Audience measurement entities desire knowledge on how users interact with media devices such as smartphones, tablets, laptops, smart televisions, etc. In particular, audience measurement entities want to monitor media presentations made at the media devices to, among other things, monitor exposure to advertisements, determine advertisement effectiveness, determine user behavior, identify purchasing behavior associated with various demographics, etc. In some instances, the audience measurement entities collect viewer data during media sessions to determine characteristics (e.g., demographics) of an audience associated with the sessions. The characteristics of the audience associated with the media sessions can be utilized to determine attributes, such as advertisements, recommendations, etc., to associate with programs encountered during the session and/or similar programs.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

Methods and apparatus to determine media viewing information for hybrid content delivery are disclosed herein. For example, such hybrid content delivery can comply with ATSC 3.0 standards, which offers a combination of broadcast television and Internet media. ATSC 3.0 offers numerous improvements to antenna television, such as better sound quality, higher picture resolution, availability on more devices, more channels without the need for large antenna, and distribution of data in addition to audio and video signals. Examples disclosed herein determine primary content viewing information, supplementary content viewing information, and audience engagement statistics based on communications between an ATSC 3.0 media provider and a media presentation device. Additionally, examples disclosed herein facilitate access to supplementary content based on requests from media presentation devices.

FIG. 1 is a block diagram of an example audience analysis system 100 to enable distribution and analysis of ATSC 3.0 primary and supplementary content. The example audience analysis system 100 of FIG. 1 includes an example primary media provider 102, example audience measurement circuitry 104, an example media presentation environment 106, and an example supplementary media provider 108. The example media presentation environment 106 includes one or more example media presentation device(s) 110 and example metering circuitry 112 in communication with the media presentation device(s) 110. The example primary media provider 102, the example audience measurement circuitry 104, the example media presentation environment 106, and the example supplementary media provider 108 are in communication with an example network 114. In the illustrated example of FIG. 1, the example network 114 is a hybrid network that enables media to be distributed via broadcast and/or the Internet in accordance with ATSC 3.0 standards. As such, devices in communication with the network, such as the primary media provider 102, the audience measurement circuitry 104, the supplementary media provider 108, the media presentation device(s) 110, and the metering circuitry 112, can communicate via radio frequency transmissions (e.g., over-the-air (OTA) broadcast signals) and/or the Internet.

The example audience analysis system 100 of FIG. 1 includes the primary media provider 102 to distribute primary content via the network 114. For example, the primary media provider 102 can distribute the primary content in accordance with ATSC 3.0 standards. In some examples, the primary media provider 102 is implemented by a television network that broadcasts programs, such as news reports, movies, shows, sports, documentaries, events, infomercials, etc., over the network 114 in real time (e.g., via OTA broadcasting). In some examples, the primary media provider 102 is implemented by a streaming service (e.g., Netflix®, Hulu®, HBO®, etc.) that distributes programs over the Internet via the network 114 in response to receiving a request. The primary media provider 102 can utilize Internet Protocol (IP) to deliver audio and video (A/V) signals as well as other IP-based data.

The example audience analysis system 100 of FIG. 1 includes the supplementary media provider 108 to distribute supplementary content in accordance with ATSC 3.0 standards. For example, the supplementary media provider 108 can be implemented by one or more server(s) that distribute advertisements, supplementary media, and/or information supplemental to the primary content over the Internet via the network 114. In some examples, the supplementary media provider 108 delivers advertisements, banners, alternative viewpoints of the primary content, and/or other information associated with the primary content to the media presentation device(s) 110 via the network 114. In some examples, the supplementary media provider 108 distributes the supplementary content to the media presentation device(s) 110 in response to receiving a request. In some examples, the primary media provider 102 includes the supplementary media provider 108.

The example audience analysis system 100 of FIG. 1 includes the media presentation device(s) 110 to present the primary and supplementary content to one or more user(s). Additionally, the media presentation device(s) 110 can transmit consumption data messages to the primary media provider 102 and/or the supplementary media provider 108 via the network 114. Specifically, the consumption data message communicates a consumption data unit indicative of a location (e.g., latitude and longitude) of the media presentation device(s) 110, a regional identifier (e.g., a country, a zip code, etc.), a cable provider, an internet provider, a make, model, and/or manufacturer of the media presentation device(s) 110, a service identifier associated with the service of the primary content and/or the supplementary content being accessed by the media presentation device(s) 110, a start time of the service access, an end time of the service access, a component identifier, a component type (e.g., an audio component, a video component, a closed caption component, etc.), a component role, a component language, an application identifier(s) associated with one or more applications being accessed by the media presentation device(s) 110, a start time of the application access, an end time of the application access, a playback speed at which the media presentation device(s) 110 is presenting the primary and/or supplementary content, a delivery path through which the primary and/or supplementary content is accessed (e.g., a broadcast delivery, a broadband delivery, an alternate IP delivery, a hard-drive source, a time-shift-buffer source, a delivery via direct connection), and/or any other information associated with the viewing session. In the illustrated example of FIG. 1, the media presentation device(s) 110 can be implemented by a television(s), a mobile device(s) (e.g., a smartphone, a tablet, etc.), a gaming console, or any other computing device with an ATSC 3.0-compatible tuner. The media presentation device(s) is discussed further in association with FIG. 2.

The example audience analysis system 100 of FIG. 1 includes the metering circuitry 112 to monitor network traffic between the media presentation device(s) 110 and the primary media provider 102 and the supplementary media provider 108. Advantageously, the metering circuitry 112 can determine information associated with the media presentation device(s) 110, presentation of the primary and supplementary content, and/or audience engagement statistics. Additionally, the metering circuitry 112 can determine information associated with the user(s) that encountered the primary and supplementary content. The metering circuitry 112 is discussed further in association with FIG. 3.

The example audience analysis system 100 of FIG. 1 includes the audience measurement circuitry 104 to determine statistics associated with the primary and supplementary content. For example, the audience measurement circuitry 104 can receive the information associated with the primary and supplementary content and/or the information associated with the user(s) that encountered the primary and supplementary content determined by the metering circuitry 112. Further, the audience measurement circuitry 104 can associate the received information with viewer information. Advantageously, the audience measurement circuitry 104 can cause transmission of the statistics and/or associated viewer information to the primary media provider 102 and/or the supplementary media provider 108. As a result, the primary media provider 102 and/or the supplementary media provider 108 can rate a successfulness of certain programs and/or utilize information associated with an audience that encounters the programs. Thus, the audience measurement circuitry 104 can help the primary media provider 102 and/or the supplementary media provider 108 determine content to present and appeal to the encountered audience. Additionally or alternatively, the audience measurement circuitry 104 can direct the media presentation device(s) 110 to the supplementary media provider 108 for retrieval of requested supplementary content. The audience measurement circuitry 104 is discussed further in association with FIG. 4.

Figure 2:
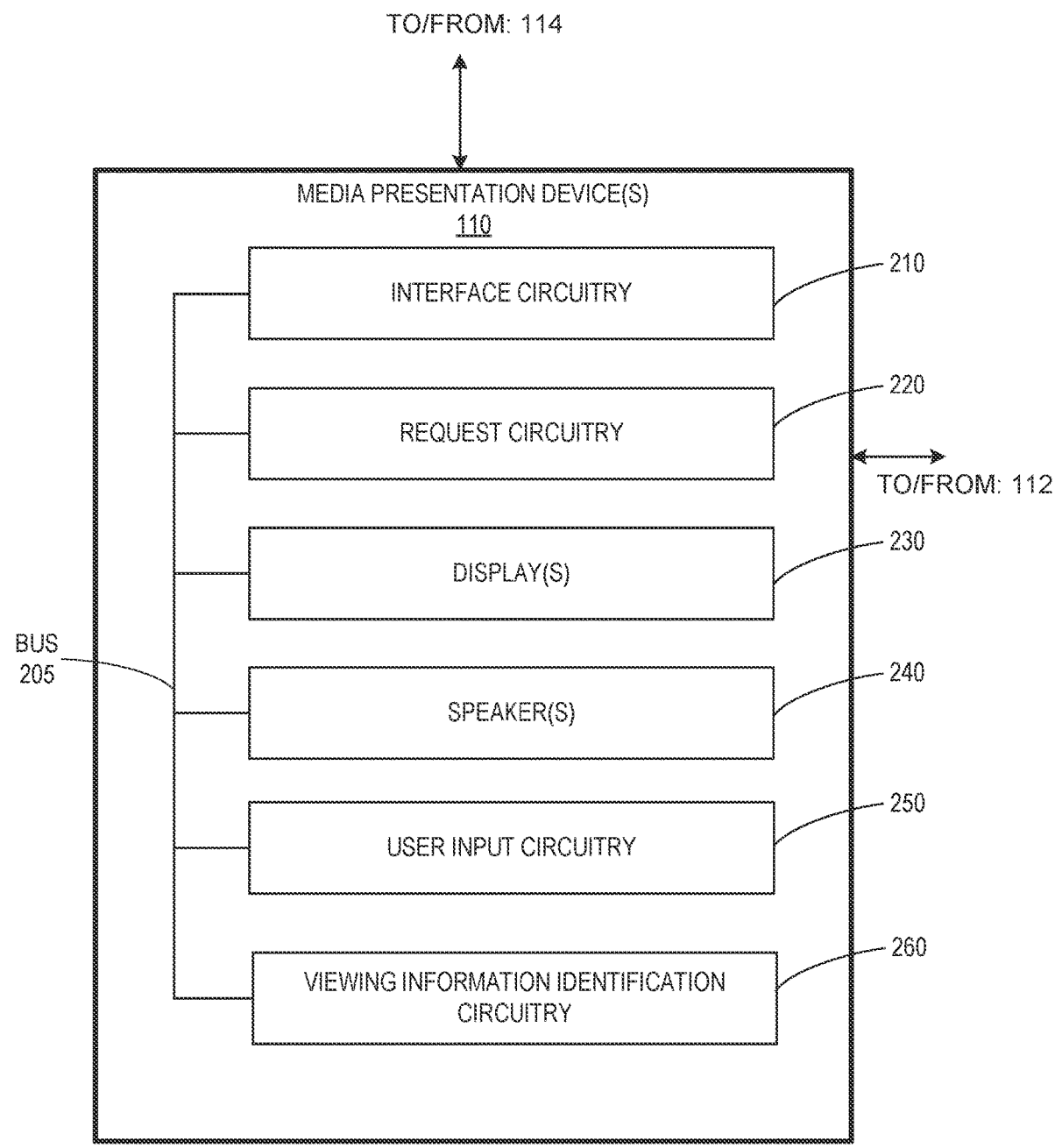
FIG. 2 is a block diagram of an example media presentation device(s) of the example audience analysis system of FIG. 1.

FIG. 2 is a block diagram of the media presentation device(s) 110 to present content in accordance with ATSC 3.0 standards and enable one or more user(s) to indicate information associated with the presented content. The media presentation device(s) 110 of FIG. 2 may be instantiated (e.g., creating an instance of, bring into being for any length of time, materialize, implement, etc.) by processor circuitry such as a central processing unit executing instructions. Additionally or alternatively, the media presentation device(s) 110 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

The example media presentation device(s) 110 of FIG. 2 includes an example bus 205, example interface circuitry 210, example request circuitry 220, an example display(s) 230, an example speaker(s) 240, and example user input circuitry 250. In the illustrated example of FIG. 2, the interface circuitry 210, the request circuitry 220, the display(s) 230, the speaker(s) 240, and the user input circuitry 250 are in communication with the bus 205. In some examples, the bus 205 can be implemented with bus circuitry, bus software, and/or bus firmware. For example, the bus 205 can be implemented by at least one of an Inter-Integrated Circuit (I2C) bus, a Serial Peripheral Interface (SPI) bus, a Peripheral Component Interconnect (PCI) bus, or a Peripheral Component Interconnect Express (PCIe or PCIE) bus. Additionally or alternatively, the bus 205 can be implemented by any other type of computing or electrical bus.

The media presentation device(s) 110 of FIG. 2 includes the interface circuitry 210 to receive and transmit data. For example, the interface circuitry 210 receives primary content from the primary media provider 102 via the network 114. In some examples, the interface circuitry 210 accesses the Internet and/or broadcast channels via the network 114 to obtain the primary content. Further, the interface circuitry 210 receives supplementary content from the supplementary media provider 108. In some examples, the interface circuitry 210 accesses the Internet via the network 114 to obtain the supplementary content. In some examples, the interface circuitry 210 transmits requests for supplementary content to the audience measurement circuitry 104 and/or the supplementary media provider 108. In FIG. 2, the interface circuitry 210 receives requests for identifiers of the primary content and/or the supplementary from the metering circuitry 112 (FIG. 1) and/or from the audience measurement circuitry 104 (FIG. 1) via the network 114. In some examples, the interface circuitry 210 receives data from the request circuitry 220, the display(s) 230, the speaker(s) 240, the user input circuitry 250, and/or the viewing information identification circuitry 260. For example, the interface circuitry 210 can receive viewing information via the viewing information identification circuitry 260. Further, the interface circuitry 210 can transmit a consumption data message including the viewing information to the primary media provider 102 and/or the supplementary media provider 108 via the network 114. Additionally, the interface circuitry 210 can receive data associated with audio and video frames presented by the speaker(s) 240 and the display(s) 230, respectively. In some examples, the interface circuitry 210 receives data associated with a user input from the user input circuitry 250. In some examples, the interface circuitry 210 transmits data corresponding to a user input or response to the audience measurement circuitry 104 and/or the metering circuitry 112.

The media presentation device(s) 110 of FIG. 2 includes the request circuitry 220 to process requests for information associated with the primary and/or supplementary content. In some examples, the request circuitry 220 causes the requests to be presented to a user(s) associated with the media presentation device(s) 110 via the display(s) 230 and/or the speaker(s) 240. For example, the request circuitry 220 can cause a prompt requesting a descriptor of the primary content and/or the supplementary content to be presented to the user(s) via the display(s) 230 and/or the speaker(s) 240. Further, the request circuitry 220 causes the interface circuitry 210 to transmit data indicative of user responses to requests for primary and/or supplementary content information to the metering circuitry 112 and/or the audience measurement circuitry 104. For example, the request circuitry 220 can determine the data based on a selection, a touch input, a visual input, and/or an audible input obtained via the user input circuitry 250. In some examples, the request circuitry 220 determines the user(s) selected an option to obtain supplementary content via the user input circuitry 250. For example, the request circuitry 220 can determine the user(s) indicated a request to obtain a certain advertisement, information associated with the primary content (e.g., an indication of individuals associated with a show, a movie, a sports game, etc.) and/or other features associated with the primary content (e.g., closed captions, additional or alternative camera angles, statistics, etc.). In some examples, the request circuitry 220 is instantiated by processor circuitry executing request instructions and/or configured to perform operations such as those represented by the flowchart of FIG. 5.

The media presentation device(s) 110 of FIG. 2 includes the display(s) 230 and the speaker(s) 240 to present primary content, supplementary content, signatures (e.g., fingerprints, watermarks, etc.) associated with supplementary content options, and/or requests to the user(s) for information associated with the primary and/or supplementary content.

The media presentation device(s) 110 of FIG. 2 includes the user input circuitry 250 to generate data indicative of user inputs. For example, the user input circuitry 250 can generate data indicative of a request for certain primary and/or supplementary content from the user(s). Further, the user input circuitry 250 can generate data indicative of user responses to requests. The user input circuitry 250 can generate the data based on a selection and/or indication from the user, such as a touch input, a visual input, and/or an audible input.

The media presentation device(s) 110 of FIG. 2 includes the viewing information identification circuitry 260 to generate consumption data units. For example, the viewing information identification circuitry 260 can identify viewing information and indicate the viewing information via values in the consumption data unit. In some examples, the viewing information identification circuitry 260 identifies household information associated with the media presentation device(s) 110, such as a device location (e.g., latitude and longitude), a regional identifier (e.g., a country, a zip code, etc.), a cable provider, and/or a make and/or model of the media presentation device(s) 110. Further, the viewing information identification circuitry 260 identifies a service identifier associated with the service of the primary content and/or the supplementary content being accessed by the media presentation device(s) 110, a start time of the service access, and/or an end time of the service access. Additionally, the viewing information identification circuitry 260 can identifies one or more components of the media session being accessed by the media presentation device(s) 110 and indicates the component(s) via values indicative of a component identifier, a component type (e.g., an audio component, a video component, a closed caption component, etc.), a component role, and/or a component language in the consumption data unit. In some examples, the viewing information identification circuitry 260 determines an application identifier(s) associated with one or more applications being accessed by the media presentation device(s) 110, a start time of the application access, and/or an end time of the application access. In some examples, the viewing information identification circuitry 260 identifies a playback speed at which the media presentation device(s) 110 is presenting the primary and/or supplementary content, a delivery path through which the primary and/or supplementary content is accessed (e.g., a broadcast delivery, a broadband delivery, an alternate IP delivery, a hard-drive source, a time-shift-buffer source, a delivery via direct connection), and/or any other information associated with the viewing session. In FIG. 2, the viewing information identification circuitry 260 causes the interface circuitry 210 to transmit the consumption data unit in a consumption data message to the primary media provider 102 and/or the supplementary media provider 108 via the network 114.

Figure 3:
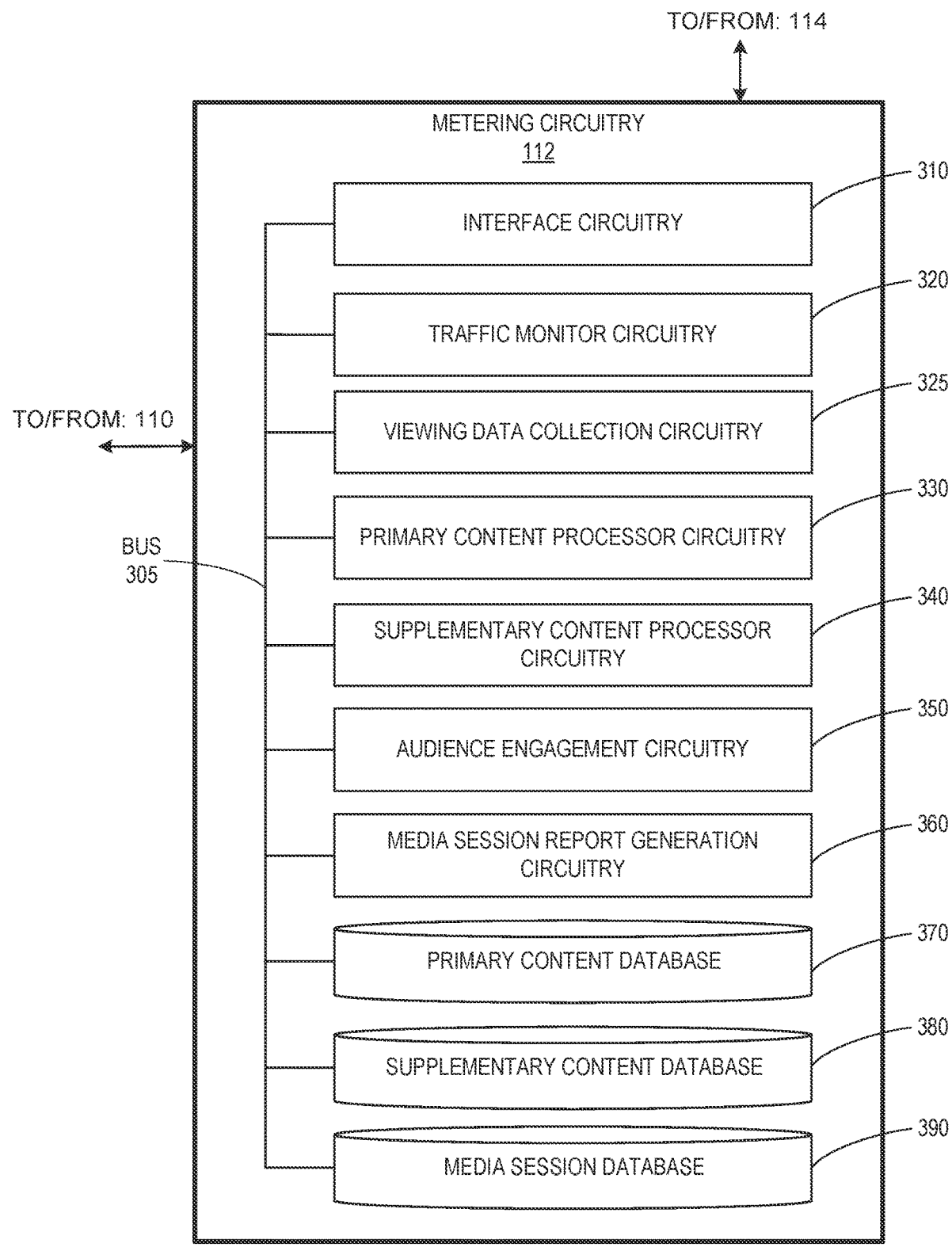
FIG. 3 is a block diagram of example metering circuitry of the example audience analysis system of FIG. 1.

FIG. 3 is a block diagram of the example metering circuitry 112 to determine characteristics of primary content and supplementary content rendered by the media presentation device(s) 110 as well as determine an audience engagement level associated with the user(s) during media sessions. The metering circuitry 112 of FIG. 3 may be instantiated (e.g., creating an instance of, bring into being for any length of time, materialize, implement, etc.) by processor circuitry such as a central processing unit executing instructions. Additionally or alternatively, the metering circuitry 112 of FIG. 3 may be instantiated (e.g., creating an instance of, bring into being for any length of time, materialize, implement, etc.) by an ASIC or an FPGA structured to perform operations corresponding to the instructions. It should be understood that some or all of the metering circuitry 112 of FIG. 3 may, thus, be instantiated at the same or different times. Some or all of the circuitry may be instantiated, for example, in one or more threads executing concurrently on hardware and/or in series on hardware. Moreover, in some examples, some or all of the metering circuitry 112 of FIG. 3 may be implemented by microprocessor circuitry executing instructions to implement one or more virtual machines and/or containers.

The metering circuitry 112 of FIG. 3 includes an example bus 305, example interface circuitry 310, example traffic monitor circuitry 320, example primary content processor circuitry 330, example supplementary content processor circuitry 340, example audience engagement circuitry 350, example media session report generation circuitry 360, an example primary content database 370, an example supplementary content database 380, and an example media session database 390. In the illustrated example of FIG. 3, the interface circuitry 310, the traffic monitor circuitry 320, the primary content processor circuitry 330, the supplementary content processor circuitry 340, the audience engagement circuitry 350, the media session report generation circuitry 360, the primary content database 370, the supplementary content database 380, and the media session database 390 are in communication with the bus 305. In some examples, the bus 305 can be implemented with bus circuitry, bus software, and/or bus firmware. For example, the bus 305 can be implemented by at least one of an Inter-Integrated Circuit (I2C) bus, a Serial Peripheral Interface (SPI) bus, a Peripheral Component Interconnect (PCI) bus, or a Peripheral Component Interconnect Express (PCIe or PCIE) bus. Additionally or alternatively, the bus 305 can be implemented by any other type of computing or electrical bus.

The metering circuitry 112 of FIG. 3 includes the interface circuitry 310 to receive and transmit data. In FIG. 3, the interface circuitry 310 accesses data being transmitted to and/or from the media presentation device(s) 110. In some examples, the interface circuitry 310 transmits requests for information associated with the primary and/or supplementary content presented by the media presentation device(s) 110. In some examples, the interface circuitry 310 transmits the requests for the information associated with the primary and/or supplementary content to the audience measurement circuitry 104, the supplementary media provider 108, and/or the media presentation device(s) 110. In some examples, the interface circuitry 310 transmits media session reports to the audience measurement circuitry 104.

The metering circuitry 112 of FIG. 3 includes the traffic monitor circuitry 320 to monitor communications transmitted to and/or received by the media presentation device(s) 110. For example, the traffic monitor circuitry 320 can process the data that the media presentation device(s) 110 transmits and/or receives via the interface circuitry 310. As such, the traffic monitor circuitry 320 can monitor data that is transmitted between the media presentation device(s) 110 and the primary media provider 102, between the media presentation device(s) 110 and the audience measurement circuitry 104, and/or between the media presentation device(s) 110 and the supplementary media provider 108. In some examples, the traffic monitor circuitry 320 logs the data received and/or transmitted by the interface circuitry 310 in the media session database 390. In some examples, the traffic monitor circuitry 320 causes the interface circuitry 310 to transmit data indicative of traffic encountered by the media presentation device(s) 110 to the audience measurement circuitry 104. In some examples, the traffic monitor circuitry 320 is instantiated by processor circuitry executing traffic monitor instructions and/or configured to perform operations such as those represented by the flowcharts of FIGS. 6-8.

In some examples, the metering circuitry 112 includes means for monitoring network traffic associated with at least one device during a media session. For example, the means for monitoring network traffic may be implemented by the traffic monitoring circuitry 320. In some examples, the traffic monitoring circuitry 320 may be instantiated by processor circuitry such as the example processor circuitry 1112 of FIG. 11. For instance, the condition traffic monitoring circuitry 320 may be instantiated by the example microprocessor 1300 of FIG. 13 executing machine executable instructions such as those implemented by at least block 602 of FIG. 6. In some examples, the traffic monitoring circuitry 320 may be instantiated by hardware logic circuitry, which may be implemented by an ASIC, XPU, or the FPGA circuitry 1400 of FIG. 14 structured to perform operations corresponding to the machine readable instructions. Additionally or alternatively, the traffic monitoring circuitry 320 may be instantiated by any other combination of hardware, software, and/or firmware. For example, the traffic monitoring circuitry 320 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The metering circuitry 112 of FIG. 3 includes viewing data collection circuitry 325 to determine viewing information associated with the media session based on a consumption data message identified in the network traffic logged by the traffic monitor circuitry 320. As such, the viewing data collection circuitry 325 can identify viewing information transmitted by the media presentation device(s) 110. Specifically, the viewing data collection circuitry 325 can analyze values in a consumption data unit of a logged consumption data message to determine the viewing information. For example, the viewing data collection circuitry 325 can perform a look up of information corresponding to the values in the media session database 390 to determine the viewing information.

In some examples, the viewing data collection circuitry 325 determines location information associated with the media presentation device(s) 110 based on the logged consumption data message. In some examples, the viewing data collection circuitry 325 determines a cable provider associated with the media presentation device(s), a make, model, and manufacturer of the media presentation device(s) 110, and/or a device type (e.g., a primary device, a companion device, etc.) based on the logged consumption data message. In some examples, the viewing data collection circuitry 325 determines an identifier of a broadcast stream based on the logged consumption data message. In some examples, the viewing data collection circuitry 325 determines a source of the content received by the media presentation device(s) 110 based on the logged consumption data message. In some examples, the viewing data collection circuitry 325 determines a service identifier associated with a service accessed by the media presentation device(s) 110 based on the logged consumption data message. For example, the service identifier can be indicative of a linear audio/video service, a linear audio-only service, an application-based service, an electronic service guide service, an emergency alert service, a digital rights management service, and/or another type of service accessed by the media presentation device(s) 110. Further, the viewing data collection circuitry 325 can determine a start and/or end time of the service access based on the logged consumption data message. In some examples, the viewing data collection circuitry 325 determines a component type (e.g., an audio component, a video component, a closed caption component, etc.) and/or a component language based on the logged consumption data message. In some examples, the viewing data collection circuitry 325 determines an application accessed by the media presentation device(s), a start and/or end time of the application access, and/or a stage of the application access (e.g., downloaded and not launched, downloaded and auto-launched, downloaded and user-launched, etc.) based on the logged consumption data message. In some examples, the viewing data collection circuitry 325 determines a playback speed of the primary and/or supplementary content, a delivery path through which the primary and/or supplementary content was accessed by the media presentation device(s) 110. Further, the viewing data collection circuitry 325 can store the viewing information via the media session database 390.

In some examples, the metering circuitry 112 includes means for determining viewing information associated with the media session. For example, the means for determining viewing information can determine the viewing information based on data that the media presentation device(s) 110 transmits to the primary media provider 102 and/or the supplementary media provider 108 via the network 114. The means for determining viewing information may be implemented by the viewing data collection circuitry 325. In some examples, viewing data collection circuitry 325 may be instantiated by processor circuitry such as the example processor circuitry 1112 of FIG. 11. For instance, the viewing data collection circuitry 325 may be instantiated by the example microprocessor 1300 of FIG. 13 executing machine executable instructions such as those implemented by at least block 604 of FIG. 6. In some examples, the viewing data collection circuitry 325 may be instantiated by hardware logic circuitry, which may be implemented by an ASIC, XPU, or the FPGA circuitry 1400 of FIG. 14 structured to perform operations corresponding to the machine readable instructions. Additionally or alternatively, the traffic monitoring circuitry 320 may be instantiated by any other combination of hardware, software, and/or firmware. For example, the traffic monitoring circuitry 320 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The metering circuitry 112 of FIG. 3 includes the supplementary content processor circuitry 340 to determine information associated with supplementary content presented by the media presentation device(s) 110. In FIG. 3, the supplementary content processor circuitry 340 detects data indicative of opportunities for the media presentation device(s) 110 to present the supplementary content. For example, the supplementary content processor circuitry 340 can identify a watermark, a fingerprint, or another type of signature in an audio or video frame that the media presentation device(s) 110 renders. In some examples, the supplementary content processor circuitry 340 identifies data associated with the presented watermark, fingerprint, and/or signature.

In FIG. 3, the supplementary content processor circuitry 340 identifies supplementary content opportunities that the user(s) of the media presentation device(s) 110 ignore. For example, the supplementary content processor circuitry 340 can determine a supplemental content option was ignored in response to detecting a termination of the presentation of the watermark, fingerprint, or signature without the media presentation device(s) 110 transmitting a request with the identified data associated with the watermark, fingerprint, or signature to request the supplementary content. In some examples, the supplementary content processor circuitry 340 determines the supplementary content opportunity was ignored in response to the media presentation device(s) 110 receiving only primary content data (e.g., not receiving communications from the supplementary media provider 108) in a time span between the presentation and the termination of the watermark, fingerprint, and/or signature. As a result, the supplementary content processor circuitry 340 can determine that the media presentation device(s) 110 did not present the supplementary content associated with the watermark, fingerprint, or signature.

In FIG. 3, the supplementary content processor circuitry 340 determines information associated with the ignored supplementary content. In some examples, the supplementary content processor circuitry 340 searches for the data associated with the watermark, fingerprint, or other type of signature in the supplementary content database 380. In response to identifying the data in the supplementary content database 380, the supplementary content processor circuitry 340 can extract information associated with the data. For example, the information can indicate specifics regarding the supplementary content, such as a provider of the supplementary content (e.g., a company or organization, an IP address, a domain name, etc.), a type of the supplementary content (e.g., an advertisement for a certain product and/or service, a supplementary camera angle, a type of information related to the primary content), and/or timing information (e.g., a start or end time of the opportunity to obtain the supplementary content, a length that the supplementary content is presented, etc.). In some examples, in response to the data not being in the supplementary content database 380, the supplementary content processor circuitry 340 causes the interface circuitry 310 to transmit a request for the information associated with the data to the media presentation device(s) 110, the supplementary media provider 108, and/or the audience measurement circuitry 104. In some examples, the supplementary content processor circuitry 340 stores the data in the media session database 390 with an indication that the associated supplementary content was not presented by the media presentation device(s) 110. In such examples, the supplementary content processor circuitry 340 associates received or identified information associated with the supplementary content with the watermark, fingerprint, and/or signature data in the media session database 390.

In FIG. 3, the supplementary content processor circuitry 340 identifies supplementary content requested for presentation by the media presentation device(s) 110. For example, the supplementary content processor circuitry 340 determines whether the media presentation device(s) 110 transmitted a request to retrieve supplementary content based on data transmitted by the media presentation device(s) 110 and the data associated with the watermark, fingerprint, or signature presented by the media presentation device(s) 110. In such examples, the supplementary content processor circuitry 340 can analyze the data to determine the watermark, fingerprint, and/or other signature associated with the request and/or an address (e.g., an IP address, a domain name, uniform resource locator (URL), a location, etc.) associated with a device to which the request is being transmitted. In this example, the device is associated with the supplementary media provider 108 and/or the audience measurement circuitry 104. Further, the supplementary content processor circuitry 340 can identify a response received from the supplementary media provider 108 and/or the audience measurement circuitry 104. For example, the response can include a commercial, a supplemental camera angle, and/or information associated with the primary content. In some examples, when the audience measurement circuitry 104 receives the request, the audience measurement circuitry 104 relays the request to the supplementary media provider 108 or transmits a response to the media presentation device(s) 110 with data that enables the media presentation device(s) 110 to access the supplementary content. For example, the media presentation device(s) 110 can transmit fingerprint data to the audience measurement circuitry 104, and the audience measurement circuitry 104 can determine data to be transmitted to the supplementary media provider 108 to obtain the supplementary content associated with the fingerprint data. In turn, the audience measurement circuitry 104 can return the determined data to the media presentation device(s) 110 and/or cause transmission of the determined data to the supplementary media provider 108 with an address of the media presentation device(s) 110 to enable the supplementary media provider 108 to identify a destination for the supplementary content.

In such examples, the supplementary content processor circuitry 340 can analyze a request that the media presentation device(s) 110 transmits to the audience measurement circuitry 104, a response that the audience measurement circuitry 104 transmits to the media presentation device(s) 110, a request that the media presentation device(s) 110 transmits to the supplementary media provider 108, and/or a response that the supplementary media provider 108 transmits to the media presentation device(s) 110 to determine information associated with the supplementary content.

In FIG. 3, the supplementary content processor circuitry 340 determines whether information associated with the indication of the supplementary content opportunity (e.g., the watermark, fingerprint, and/or signature), the request transmitted by the media presentation device(s) 110, and/or the response(s) received by the media presentation device(s) 110 is/are recognized. For example, the supplementary content processor circuitry 340 can compare the data associated with the watermark, the fingerprint, the signature, the request(s), and/or the response(s) to supplementary content data stored in the supplementary content database 380. In some examples, the supplementary content processor circuitry 340 compares portions of the data to the supplementary content data stored in the supplementary content database 380 to enable the supplementary content processor circuitry 340 to extract certain portions of information associated with the supplementary content from the supplementary content database 380 when some information is unknown. For example, the supplementary content processor circuitry 340 can determine the provider of the supplementary content based on an IP address or a domain name associated with the request(s) and/or response(s). Additionally or alternatively, the supplementary content processor circuitry 340 can determine a type of the supplementary content and/or timing information associated with the supplementary content. In some examples, the supplementary content processor circuitry 340 determines an identifier associated with the supplementary content based on the viewing information that the viewing data collection circuitry 325 extracts from the network traffic. For example, the supplementary content processor circuitry 340 can perform a look-up of a content identifier identified by the viewing data collection circuitry 325 in an advertisement registry (e.g., Ad-ID) to determine information associated with the supplementary content that the media device(s) 100 receives, such as an asset associated with a commercial that the media presentation device(s) 100 presents.

In some examples, the supplementary content processor circuitry 340 determines whether to verify the supplementary content data based on when the supplementary content data was previously verified or stored in the supplementary content database 380. For example, the supplementary content processor circuitry 340 can determine information associated with the supplementary content (e.g., in the supplementary content database 380) is invalid in response the information not being verified within a threshold period of time (e.g., within the last week, within the last month, within the last 3 months, etc.). In some examples, the supplementary content processor circuitry 340 configures the recency threshold based on a type of the information associated with the supplementary content. As such, certain portions of the recognized information associated with the supplementary content may satisfy (e.g., were previously identified or verified within) the associated recency threshold while other portions of the recognized information do not satisfy (e.g., were previously identified or verified outside of) the recency threshold. As such, the supplementary content processor circuitry 340 can limit the amount of information being verified to maintain an accuracy of the information associated with the supplementary content while reducing the computing resources utilized by the metering circuitry 112 to verify information associated with the supplementary content. As a result, the metering circuitry 112 enables sufficient computing resources to be dedicated to traffic monitoring as well as detection of viewing information, primary content information, and supplementary content information while maintaining an accuracy of the supplementary content information.

In FIG. 3, in response to at least some information associated with the presented supplementary content being invalid (e.g., not being known and/or verified within a threshold time period), the supplementary content processor circuitry 340 can cause the information to be requested. In some examples, the supplementary content processor circuitry 340 causes the interface circuitry 310 to transmit a request for certain information associated with the supplementary content to the media presentation device(s) 110. In such examples, the media presentation device(s) 110 can prompt the user(s) to provide the information and transmit the information to the metering circuitry 112. In some examples, the supplementary content processor circuitry 340 causes the interface circuitry 310 to transmit a request for the information to the audience measurement circuitry 104 and/or the supplementary media provider 108. In turn, the supplementary content processor circuitry 340 can store the received information in the supplementary content database 380 with data indicative of the supplementary content opportunity (e.g., the watermark, fingerprint, and/or signature), the request(s) transmitted by the media presentation device(s) 110, and/or the response(s) received by the media presentation device(s) 110. In FIG. 3, the supplementary content processor circuitry 340 stores the determined information associated with the presented supplementary content in the media session database 390 with the viewing information identified by the viewing data collection circuitry 325. For example, the supplementary content processor circuitry 340 can store an indication of the commercial, camera angle, or information provided via the supplementary content with an amount of time the media presentation device(s) 110 presented the supplementary content and the consumption data message(s) received when the supplementary content, or the opportunity to access the supplementary content was encountered. Thus, the supplementary content processor circuitry 340 can associate supplementary content information with the identified viewing information. In some examples, the supplementary content processor circuitry 340 is instantiated by processor circuitry executing supplementary content processor instructions and/or configured to perform operations such as those represented by the flowchart of FIGS. 6 and 7.

In some examples, the metering circuitry 112 includes means for determining characteristics of supplementary content presented by at least one device based on data in network traffic. In some examples, the data in the network traffic includes at least one of a request from the at least one device for the supplementary content or a response from a source to provide the supplementary content. For example, the means for determining characteristics of supplementary content may be implemented by the supplementary content processor circuitry 340. In some examples, the supplementary content processor circuitry 340 may be instantiated by processor circuitry such as the example processor circuitry 1112 of FIG. 11. For instance, the supplementary content processor circuitry 340 may be instantiated by the example microprocessor 1300 of FIG. 13 executing machine executable instructions such as those implemented by at least block 606 of FIG. 6 and/or blocks 702, 704, 706, 708, 710, 712, 714, 716, 718, 720, 722, 724 of FIG. 7. In some examples, the supplementary content processor circuitry 340 may be instantiated by hardware logic circuitry, which may be implemented by an ASIC, XPU, or the FPGA circuitry 1400 of FIG. 14 structured to perform operations corresponding to the machine readable instructions. Additionally or alternatively, the supplementary content processor circuitry 340 may be instantiated by any other combination of hardware, software, and/or firmware. For example, the supplementary content processor circuitry 340 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for determining characteristics of supplementary content includes means for detecting a supplementary content opportunity indication. In some examples, the means for determining characteristics of supplementary content includes means for determining whether the supplementary content opportunity was ignored. In some examples, the means for determining characteristics of supplementary content includes means for identifying ignored supplementary content. In some examples, the means for determining characteristics of supplementary content includes means for determining whether supplementary content has been requested. In some examples, the means for determining characteristics of supplementary content includes means for analyzing a request for supplementary content. In some examples, the means for determining characteristics of supplementary content includes means for identifying one or more response(s) received in response to the request for supplementary content. In some examples, the means for determining characteristics of supplementary content includes means for determining whether an indication (e.g., a fingerprint, a watermark, a signature, etc.) of the supplementary content opportunity, the request, and/or the response(s) are known. In some examples, the means for determining characteristics of supplementary content includes means for determining whether a known indication of the supplementary content opportunity, a known request, and/or a known response satisfies a recency threshold for verification. In some examples, the means for determining characteristics of supplementary content includes means for requesting information related to the supplementary content. In some examples, the means for determining characteristics of supplementary content includes means for linking a server from which a response with supplementary content was received with the indication of the supplementary content opportunity. In some examples, the means for determining characteristics of supplementary content includes means for storing the supplementary content characteristics with a media session interval. In some examples, the means for determining characteristics of supplementary content includes means for associating the supplementary content characteristics with viewing information identified for the media session interval.

The metering circuitry 112 of FIG. 3 includes the primary content processor circuitry 330 to determine information associated with primary content presented by the media presentation device(s) 110. Specifically, the primary content processor circuitry 330 determines a program identifier (e.g., a movie title, a show title, a sports game label, etc.) indicative of a program presented as the primary content by the media presentation device(s). In some examples, the primary content processor circuitry 330 determines the program identifier based on a frequency of a received broadcast signal and a time at which the broadcast signal is being received. For example, the primary content processor circuitry 330 can determine the media presentation device(s) 110 is receiving a broadcast signal in response to the viewing data collection circuitry 325 determining an identifier of a broadcast and/or the traffic monitor circuitry 320 determining the media presentation device(s) 110 is receiving a broadcast signal. In some examples, the primary content processor circuitry 330 determines a provider (e.g., the primary media provider 102) of the primary content based on the identifier of the broadcast identified by the viewing data collection circuitry 325 and/or on a frequency of the broadcast signal identified by the traffic monitor circuitry 320. In some examples, in response to the identifier of the broadcast identified by the viewing data collection circuitry 325 not being associated with a known provider, the primary content processor circuitry 330 links the provider associated with the frequency of the broadcast signal identified by the traffic monitor circuitry 320 with the identifier of the broadcast. In some examples, the primary content processor circuitry 330 compares the provider determined based on the frequency of the broadcast signal to a provider associated with the identifier of the broadcast to verify the provider. Further, the primary content processor circuitry 330 can determine the program identifier based on a program scheduled to be broadcasted by the provider at the time at which the broadcast signal is received. In some examples, the primary content processor circuitry 330 determines the time at which the broadcast signal is received based on the viewing information stored in the media session database 390 and/or a timestamp generated by the traffic monitor circuitry 320 in response to identifying the broadcast signal.

In FIG. 3, in response to the media presentation device(s) 110 accessing the primary content via the Internet, the primary content processor circuitry 330 determines the application accessed by the media presentation device(s) 110 via the viewing information stored in the media session database 390. For example, the primary content processor circuitry 330 can determine that the media presentation device(s) 110 is not receiving a broadcast signal based on the viewing information and/or the network traffic identified by the traffic monitor circuitry 320. Accordingly, in response to determining the media presentation device(s) 110 is not receiving a broadcast signal, the primary content processor circuitry 330 can determine the media presentation device(s) 110 is accessing the primary content via the Internet and, in turn, identify the application that the media presentation device(s) 110 is accessing based on the identified viewing information. In some examples, the primary content processor circuitry 330 determines a program being accessed via the application based on additional data in the viewing information, such as a content identifier indicative of the program. For example, the content identifier can be an Entertainment Identifier Registry (EIDR) value. Additionally or alternatively, the primary content processor circuitry 330 can determine whether the identified supplementary content characteristics are associated with a specific program that is presented via the identified application. For example, the primary content processor circuitry 330 can determine that identified supplementary content, such as a certain advertisement or an indication of information associated with the primary content, corresponds with a certain program of the application. In some examples, the primary content processor circuitry 330 determines the primary content based on the time at which one or more instances of supplementary content was accessed relative to a run time of the program. For example, a certain program provided by the identified application can offer opportunities to access certain supplemental content at certain times and, thus, the primary content processor circuitry 330 can determine the program identifier based on the identified supplemental content and the time at which the supplemental content, or the opportunity to access the supplemental content, was encountered.

In FIG. 3, in response to the media presentation device(s) 110 accessing the primary content via the Internet and the supplemental content identified by the supplemental content processor circuitry 340 not being associated with a program of the application, the primary content processor circuitry 330 causes the interface circuitry 310 to transmit a request for the program identifier to the media presentation device(s) 110. In turn, the primary content processor circuitry 330 can determine the program identifier based on a response received from the media presentation device(s) 110. Further, the primary content processor circuitry 330 can compare the received program identifier to programs that the identified application offers to verify the received program identifier. In response to receiving and verifying the program identifier, the primary content processor circuitry 330 associates the program identifier with at least a portion of the data in the consumption data message. Further, the primary content processor circuitry 330 can store the program identifier with the associated consumption data message, or portion thereof, in the primary content database 370.

In FIG. 3, the primary media provider 102 determines a certain area or portion of the consumption data message (e.g., an identifier data location) that corresponds to (e.g., represents, is indicative of, etc.) the program identifiers. In such examples, the primary content processor circuitry 330 determines the identifier data location based on portions of consumption data message that matched in previous media sessions associated with the same program identifier. For example, in response to encountering a first consumption data message in the network traffic and a second consumption data message in the network traffic that is partially different from the first consumption data message and indicative of the same program identifier, the primary content processor circuitry 330 determines a data location indicative of the program identifier based on respective positions of a first data portion of the consumption data message and a second data portion of the second consumption data message that matches the first data portion.

Furthermore, the primary content processor circuitry 330 can update the determined data location based on a third consumption data message identified in the network traffic in response to the third consumption data message being associated with the same program identifier and a third data portion of the third data within the data location being partially different from the first data portion and the second data portion. As such, the primary content processor circuitry 330 can narrow in on the data location in the network traffic that corresponds with program identifiers and the specific data associated with certain program identifiers. In some examples, the primary content processor circuitry 330 determines the data location on a provider-specific basis to account for differences in information conveyed by the consumption data messages that the media presentation device(s) 110 transmits to different media sources (e.g., ones of the primary media provider 102, ones of the supplementary media provider 108). Accordingly, the primary content processor circuitry 330 can determine a first data location for a first primary media source (e.g., a first one of the primary media provider 102) and a second data location for a second primary media source (e.g., a second one of the primary media provider 102) based on the messages and/or signals that the media presentation device(s) 110 transmits to the respective sources.

In FIG. 3, the primary content processor circuitry 330 performs a verification of the program identifier to account for changes in the data indicative of the program identifier and/or user response inaccuracies. In some examples, the primary content processor circuitry 330 compares the program identifier with a program scheduled to be broadcasted at the frequency at which the media presentation device(s) 110 receives the primary content. In such examples, the primary content processor circuitry 330 verifies the program identifier in response to the program identifier being scheduled for broadcasting within a threshold time range (e.g., 15 minutes, 30 minutes, 1 hour, etc.) of the encountered media session interval. In such examples, the primary content processor circuitry 330 determines the threshold time range based on a program associated with the program identifier to enable extensions for certain programs, such as sports broadcasts, that may differentiate from the scheduled broadcast time associated therewith. In some examples, the primary content processor circuitry 330 verifies the program identifier based on data stored in the media session database 390. For example, the primary content processor circuitry 330 can compare the viewing information indicated by a user to viewing information identified by the viewing data collection circuitry 325. In some examples, the primary content processor circuitry 330 determines a trustworthiness of the user associated with the media presentation device(s) 110 based on the comparison. Further, in response to the user providing an answer inconsistent with the viewing information identified by the viewing data collection circuitry 325 more than a threshold number of times, the primary content processor circuitry 330 can refrain from requesting the primary content information from the user and direct processing resources to other operations to increase a bandwidth available for such operations and/or a rate at which such operations are performed. In some examples, the primary content processor circuitry 330 stores the program identifier with an indication of whether the program identifier is verified via the primary content database 370. In some examples, the validity of the program identifier expires in response to an expiration of a predetermined period of time (e.g., 1 month, 6 months, 1 year, etc.) to account for changes in the data indicative of the program identifier.

In FIG. 3, the primary content processor circuitry 330 stores data associated with the primary content encountered during the media session via the media session database 390. For example, the primary content processor circuitry 330 can store information associated with the media presentation device(s) 110, information associated with the primary media provider 102, the determined service type, the determined program identifier, and the media session interval with an identification value associated with the media session via the media session database 390. In some examples, the primary content processor circuitry 330 is instantiated by processor circuitry executing primary content processor instructions and/or configured to perform operations such as those represented by the flowcharts of FIGS. 6 and 8.

In some examples, the metering circuitry 112 includes means for determining characteristics of primary content presented by at least one device during a media session based on data in network traffic associated with the at least one device. In some examples, the characteristics of the primary content include a source of the primary content, a destination of the primary content, a program associated with the primary content, a service type associated with the primary content, and/or an interval associated with a presentation of the primary content. For example, the means for determining may be implemented by the primary content processor circuitry 330. In some examples, the primary content processor circuitry 330 may be instantiated by processor circuitry such as the example processor circuitry 1112 of FIG. 11. For instance, the primary content processor circuitry 330 may be instantiated by the example microprocessor 1300 of FIG. 13 executing machine executable instructions such as those implemented by at least block 608 of FIG. 6 and/or blocks 802, 804, 806, 808, 810, 812, 814, 816, 818, 820 of FIG. 8. In some examples, the primary content processor circuitry 330 may be instantiated by hardware logic circuitry, which may be implemented by an ASIC, XPU, or the FPGA circuitry 1400 of FIG. 14 structured to perform operations corresponding to the machine readable instructions. Additionally or alternatively, the primary content processor circuitry 330 may be instantiated by any other combination of hardware, software, and/or firmware. For example, the primary content processor circuitry 330 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for determining characteristics of primary content includes means for associating a program identifier of the primary content with at least a portion of a consumption data message. In such examples, the program identifier is indicative of a program presented as the primary content by the at least one device. In some examples, the means for determining characteristics of primary content includes means for determining a source of a program indicated by the program identifier based on the consumption data message. In some examples, the means for determining characteristics of primary content includes means for determining a data location indicative of the program identifier based on respective positions of a first data portion of a first consumption data message and a second data portion of a second consumption data message in response to the second consumption data message being detected in the network traffic. In such examples, the second consumption data message is partially different from the first consumption data message and is associated with the same program identifier as the first consumption data message. Additionally, in such examples, the first data portion matches the second data portion. In some examples, the means for determining characteristics of primary content includes means for requesting a program identifier. In some examples, the means for determining characteristics of primary content includes means for associating a received program identifier with viewing information. In some examples, the means for determining characteristics of primary content includes means for storing the primary content characteristics with the media session interval.

The metering circuitry 112 of FIG. 3 includes the audience engagement circuitry 350 to determine engagement statistics associated with the user(s) that encountered the media session. For example, the audience engagement circuitry 350 (FIG. 3) can determine the engagement level of the user(s) associated with the media presentation device(s) 110 based on the identified viewing information, the determined characteristics of the primary content, and/or the determined characteristics of the supplementary content. In some examples, the audience engagement circuitry 350 determines the engagement level of the user(s) based on changes in the identified viewing information, the determined primary content characteristics, and/or the determined supplementary content characteristics over time. For example, the audience engagement circuitry 350 can assign an engagement level to one or more program(s) associated with the primary content presented by the media presentation device(s) 110 based on a length of time that the media presentation device(s) 110 presented the program(s). In some examples, the audience engagement circuitry 350 identifies the length of time relative to the timeslot for the program(s). For example, the audience engagement circuitry 350 can identify that the user(s) started viewing the program(s) at a first time associated with the program(s) and stopped viewing the program(s) at a second time associated with the program(s). In some examples, the audience engagement circuitry 350 determines the audience engagement level of the user(s) based on the type of the supplementary content, the interval over which the supplementary content was accessed by the media presentation device(s) 110, the decision made by the user(s) of the media presentation device(s) 110 to retrieve or ignore the supplementary content, timing information associated with the retrieval or disregard of the opportunity to access the supplementary content, and/or any other information associated with the supplementary content.

In some examples, the audience engagement circuitry 350 determines one or more panelist identifier(s) associated with the user(s) based on an indication from the user(s) and/or a depiction of a viewing environment in which the user(s) are located. In such examples, the audience engagement circuitry 350 associates the panelist identifier(s) with the audience engagement level, the encountered primary content characteristics, and the encountered supplementary content characteristics. The audience engagement circuitry 350 stores the audience engagement level of the user(s) for respective time intervals with the viewing information, the characteristics of the primary content, and/or the characteristics of the supplementary content via the media session database 390. In some examples, the audience engagement circuitry 350 is instantiated by processor circuitry executing audience engagement instructions and/or configured to perform operations such as those represented by the flowchart of FIG. 6.

In some examples, the apparatus includes means for determining audience engagement information. In some examples, the means for determining audience engagement information determines an audience engagement level and/or statistics based on the determined viewing information, the determined primary content information, and/or the determined supplementary content information. For example, the means for determining audience engagement information may be implemented by the audience engagement circuitry 350. In some examples, the audience engagement circuitry 350 may be instantiated by processor circuitry such as the example processor circuitry 1112 of FIG. 11. For instance, the audience engagement circuitry 350 may be instantiated by the example microprocessor 1300 of FIG. 13 executing machine executable instructions such as those implemented by at least block 610 of FIG. 6. In some examples, the audience engagement circuitry 350 may be instantiated by hardware logic circuitry, which may be implemented by an ASIC, XPU, or the FPGA circuitry 1400 of FIG. 14 structured to perform operations corresponding to the machine readable instructions. Additionally or alternatively, the audience engagement circuitry 350 may be instantiated by any other combination of hardware, software, and/or firmware. For example, the audience engagement circuitry 350 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The metering circuitry 112 of FIG. 3 includes the media session report generation circuitry 360 to generate media session reports based on the determined viewing information, the determined primary content information, the determined supplementary content information, the determined audience engagement statistics, information associated with the user(s) of the media presentation device(s) 110, and/or logged consumption data messages associated with the media presentation device(s) 110. Thus, the media session report generation circuitry 360 can utilize the data stored in the media session database 390 to generate the media session reports. In some examples, the media session report generation circuitry 360 causes the interface circuitry 310 to transmit the media session reports to the audience measurement circuitry 104. In some examples, the media session report generation circuitry 360 is instantiated by processor circuitry executing media session reporting instructions and/or configured to perform operations such as those represented by the flowchart of FIG. 6.

In some examples, the metering circuitry 112 includes means for generating a media session report. In some examples, the means for generating generates the media session report based on a panelist identifier, determined viewing information, determined primary content information, determined supplementary content information, and/or determined audience engagement information. For example, the means for generating the media session report may be implemented by the media session report generation circuitry 360. In some examples, the media session report generation circuitry 360 may be instantiated by processor circuitry such as the example processor circuitry 1112 of FIG. 11. For instance, the media session report generation circuitry 360 may be instantiated by the example microprocessor 1300 of FIG. 13 executing machine executable instructions such as those implemented by at least block 614 of FIG. 6. In some examples, the media session report generation circuitry 360 may be instantiated by hardware logic circuitry, which may be implemented by an ASIC, XPU, or the FPGA circuitry 1400 of FIG. 14 structured to perform operations corresponding to the machine readable instructions. Additionally or alternatively, the media session report generation circuitry 360 may be instantiated by any other combination of hardware, software, and/or firmware. For example, the media session report generation circuitry 360 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate. In some examples, the means for generating the media session report includes means for associating the panelist identifier with the determined characteristics of the primary content, determined second characteristics of the supplementary content, and/or determined audience engagement information.

Figure 4:
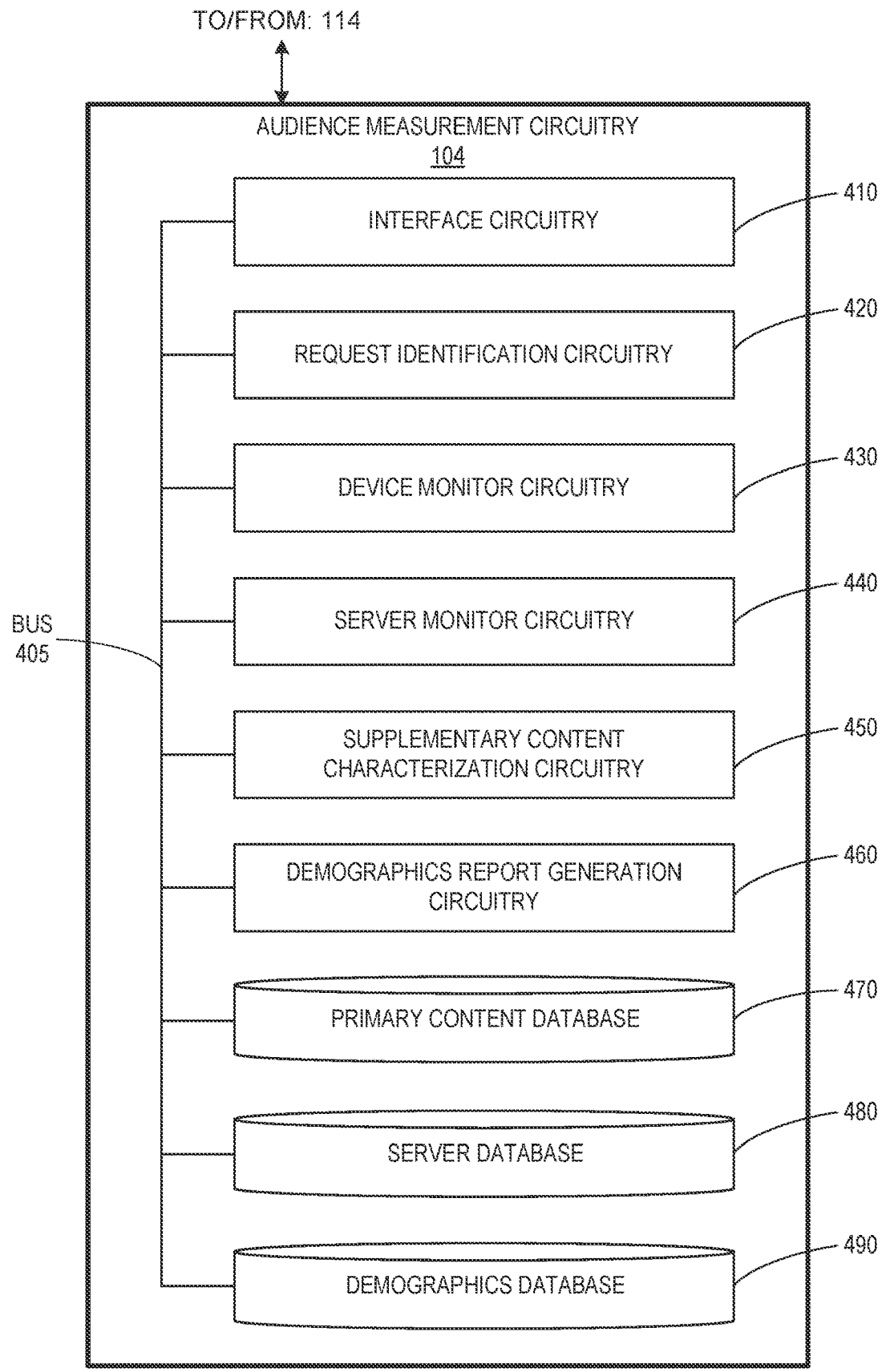
FIG. 4 is a block diagram of example audience measurement circuitry of the example audience analysis system of FIG. 1.

FIG. 4 is a block diagram of the example audience measurement circuitry 104 to monitor and/or facilitate supplementary content traffic and/or determine demographics associated with viewers that encounter primary and/or supplementary content. The audience measurement circuitry 104 of FIG. 4 may be instantiated (e.g., creating an instance of, bring into being for any length of time, materialize, implement, etc.) by processor circuitry such as a central processing unit executing instructions. Additionally or alternatively, the audience measurement circuitry 104 of FIG. 4 may be instantiated (e.g., creating an instance of, bring into being for any length of time, materialize, implement, etc.) by an ASIC or an FPGA structured to perform operations corresponding to the instructions. It should be understood that some or all of audience measurement circuitry 104 of FIG. 4 may, thus, be instantiated at the same or different times. Some or all of the circuitry may be instantiated, for example, in one or more threads executing concurrently on hardware and/or in series on hardware. Moreover, in some examples, some or all of audience measurement circuitry 104 of FIG. 4 may be implemented by microprocessor circuitry executing instructions to implement one or more virtual machines and/or containers.

The audience measurement circuitry 104 of FIG. 4 includes an example bus 405, example interface circuitry 410, example request identification circuitry 420, example device monitor circuitry 430, example server monitor circuitry 440, example supplementary content characterization circuitry 450, example demographics report generation circuitry 460, an example primary content database 470, an example server database 480, and an example demographics database 490. In the illustrated example of FIG. 4, the interface circuitry 410, the request identification circuitry 420, the device monitor circuitry 430, the server monitor circuitry 440, the supplementary content characterization circuitry 450, the demographics report generation circuitry 460, the primary content database 470, the server database 480, and the demographics database 490 are in communication with the bus 405. In some examples, the bus 405 can be implemented with bus circuitry, bus software, and/or bus firmware. For example, the bus 405 can be implemented by at least one of an Inter-Integrated Circuit (I2C) bus, a Serial Peripheral Interface (SPI) bus, a Peripheral Component Interconnect (PCI) bus, or a Peripheral Component Interconnect Express (PCIe or PCIE) bus. Additionally or alternatively, the bus 405 can be implemented by any other type of computing or electrical bus.

The audience measurement circuitry 104 of FIG. 4 includes the interface circuitry 410 to receive and transmit data. In some examples, the interface circuitry 410 transmits requests for data to the supplementary media provider 108, the media presentation device(s) 110, other media presentation devices registered with the audience measurement circuitry 104, and/or the metering circuitry 112. Further, the interface circuitry 410 can receive data from the supplementary media provider 108, the media presentation device(s) 110, the other media presentation devices registered with the audience measurement circuitry 104, and/or the metering circuitry 112. In some examples, the interface circuitry 410 receives data indicative of a request for supplementary content transmitted by the media presentation device(s) 110. That is, the interface circuitry 410 can receive data associated with a watermark, fingerprint, and/or some other signature corresponding to a supplementary content option rendered by the media presentation device(s) 110. In some examples, the interface circuitry 410 receives media session reports from the metering circuitry 112. In some examples, the interface circuitry 410 transmits demographics reports to the primary media provider 102 and/or the supplementary media provider 108. In some examples, the interface circuitry 410 transmits server reports to the supplementary media provider 108. In some examples, the interface circuitry 410 receives data indicative of traffic encountered by the media presentation device(s) 110 and/or other media presentation devices associated with panelists registered with the audience measurement circuitry 104.

The audience measurement circuitry 104 of FIG. 4 includes the request identification circuitry 420 to facilitate requests for supplementary content received from the media presentation device(s) 110. For example, the request identification circuitry 420 can access data associated with requests for supplementary content received by the interface circuitry 410. In some examples, the request identification circuitry 420 identifies a file, a signal, and/or other response data based on the received request. In some examples, the request identification circuitry 420 determines an address of the supplementary media provider 108 based on the received request. In some examples, the request identification circuitry 420 can include the file, signal, and/or other response data in a response to the media presentation device(s) 110. In such examples, the response enables the media presentation device(s) 110 to obtain access to the supplementary content. For example, the media presentation device(s) 110 can utilize the response from the audience measurement circuitry 104 to generate another request to the supplementary media provider 108. In turn, the supplementary media provider 108 can provide the media presentation device(s) 110 access to the supplementary content. In some examples, the request identification circuitry 420 causes transmission of a request directly to the supplementary media provider 108 based on the data in the request received from the media presentation device(s) 110. In some examples, the request identification circuitry 420 is instantiated by processor circuitry executing request identification instructions and/or configured to perform operations such as those represented by the flowchart of FIG. 9.

In some examples, the audience measurement circuitry 104 includes means for facilitating requests for supplementary content. For example, the means for facilitating requests for supplementary content may be implemented by the request identification circuitry 420. In some examples, the request identification circuitry 420 may be instantiated by processor circuitry such as the example processor circuitry 1212 of FIG. 12. For instance, the request identification circuitry 420 may be instantiated by the example microprocessor 1300 of FIG. 13 executing machine executable instructions such as those implemented by at least blocks 902, 904 of FIG. 9. In some examples, the request identification circuitry 420 may be instantiated by hardware logic circuitry, which may be implemented by an ASIC, XPU, or the FPGA circuitry 1400 of FIG. 14 structured to perform operations corresponding to the machine readable instructions. Additionally or alternatively, the request identification circuitry 420 may be instantiated by any other combination of hardware, software, and/or firmware. For example, the request identification circuitry 420 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate. In some examples, the means for facilitating requests for supplementary content includes means for accessing requests for supplementary content. In some examples, the means for facilitating requests for supplementary content includes means for causing transmission of a response to one or more media presentation device(s) and/or a request to a supplementary media provider.

The audience measurement circuitry 104 of FIG. 4 includes the device monitor circuitry 430 to process data associated with communications between the supplementary media provider 108 and the media presentation device(s) 110 and/or other respective media presentation devices that are registered with the audience measurement circuitry 104. The device monitor circuitry 430 can determine data associated with the communications between the supplementary media provider 108 and the media presentation device(s) 110 and/or the other respective media presentation devices. In some examples, the device monitor circuitry 430 classifies the communication data associated with the media presentation device(s) 110 based on the external device with which the media presentation device(s) 110 communicated. In some examples, the device monitor circuitry 430 is instantiated by processor circuitry executing device monitor instructions and/or configured to perform operations such as those represented by the flowchart of FIG. 9.

In some examples, the device monitor circuitry 430 includes means for monitoring traffic between a requesting device and a supplementary media provider. For example, the means for monitoring traffic may be implemented by the device monitor circuitry 430. In some examples, the device monitor circuitry 430 may be instantiated by processor circuitry such as the example processor circuitry 1212 of FIG. 12. For instance, the device monitor circuitry 430 may be instantiated by the example microprocessor 1300 of FIG. 13 executing machine executable instructions such as those implemented by at least block 906 of FIG. 9. In some examples, the device monitor circuitry 430 may be instantiated by hardware logic circuitry, which may be implemented by an ASIC, XPU, or the FPGA circuitry 1400 of FIG. 14 structured to perform operations corresponding to the machine readable instructions. Additionally or alternatively, the device monitor circuitry 430 may be instantiated by any other combination of hardware, software, and/or firmware. For example, the device monitor circuitry 430 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate. In some examples, the means for monitoring traffic between a requesting device and a supplementary media provider includes means for associating the requesting device and/or the traffic with the supplementary media provider.

The audience measurement circuitry 104 of FIG. 4 includes the server monitor circuitry 440 to monitor communications between the supplementary media provider 108 and panelist media devices, such as the media presentation device(s) 110. In some examples, the supplementary media provider 108 enables the server monitor circuitry 440 to monitor the communications directly. In some examples, the server monitor circuitry 440 identifies the communications between the supplementary media provider 108 and the panelist media devices (e.g., the media presentation device(s) 110) based on the communication data associated with the panelist media devices. For example, the server monitor circuitry 440 can determine the communication data from the panelist media devices that is associated with the supplementary media provider 108 based on classifications that the device monitor circuitry 430 assigns to the communication data. In some examples, the server monitor circuitry 440 is instantiated by processor circuitry executing server monitor instructions and/or configured to perform operations such as those represented by the flowchart of FIG. 9.

In some examples, the audience measurement circuitry 104 includes means for monitoring traffic between one or more supplementary media provider(s) and panelist devices. For example, the means for monitoring traffic may be implemented by the server monitor circuitry 440. In some examples, the server monitor circuitry 440 may be instantiated by processor circuitry such as the example processor circuitry 1212 of FIG. 12. For instance, the server monitor circuitry 440 may be instantiated by the example microprocessor 1300 of FIG. 13 executing machine executable instructions such as those implemented by at least block 908 of FIG. 9. In some examples, the server monitor circuitry 440 may be instantiated by hardware logic circuitry, which may be implemented by an ASIC, XPU, or the FPGA circuitry 1400 of FIG. 14 structured to perform operations corresponding to the machine readable instructions. Additionally or alternatively, the server monitor circuitry 440 may be instantiated by any other combination of hardware, software, and/or firmware. For example, the server monitor circuitry 440 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate. In some examples, the means for monitoring traffic between one or more supplementary media provider(s) and panelist devices includes means for associating the supplementary media provider(s) and/or the traffic with an identification value of the respective panelist device.

The audience measurement circuitry 104 of FIG. 4 includes the supplementary content characterization circuitry 450 to determine information associated with supplementary content encountered by the media presentation device(s) 110 and/or the other media presentation devices associated with registered panelists. In some examples, the supplementary content characterization circuitry 450 identifies the information associated with the supplementary content based on the identified communication data between the supplementary media provider 108 and the media presentation device(s) 110 and data stored in the server database 480. For example, the supplementary media provider 108 can insert a pin in messages and/or signals transmitted to the media presentation device(s), and the pin can be indicative of information associated with the supplementary content being accessed by the media presentation device(s) 110. Further, the server database 480 can include data indicative of supplementary content information associated with the respective pins. In some examples, the supplementary content characterization circuitry 450 identifies the information based on data in media session reports from the media presentation device(s) 110. In some examples, the supplementary content characterization circuitry 450 arranges the supplementary content information based on the source of the supplementary content (e.g., the supplementary media provider 108) and/or the supplementary content information. In some examples, the supplementary content information includes data indicative of whether the supplementary content is an advertisement, a product associated with the advertisement, a camera angle, information related to individuals associated with the primary content, etc. In some examples, the supplementary content information includes data indicative of a provider of the supplementary content, an interval over which the supplementary content was accessed by the media presentation device(s) 110, a decision made by the user(s) of the media presentation device(s) 110 to retrieve the supplementary content, and/or any other information associated with the supplementary content.

In the illustrated example of FIG. 4, in response to the information associated with the supplementary content being unidentified, the supplementary content characterization circuitry 450 can cause the interface circuitry 410 to request the supplementary content information from the supplementary media provider 108, the media presentation device(s) 110, and/or the metering circuitry 112. In such examples, the supplementary content characterization circuitry 450 can determine the supplementary content information based on one or more response(s) received from the supplementary media provider 108, the media presentation device(s) 110, and/or the metering circuitry 112. Further, the supplementary content characterization circuitry 450 can store the supplementary content information with associated communication data via the sever database 480 to enable subsequent recognition of the supplementary content information based on the associated communication data.

In the illustrated example of FIG. 4, the supplementary content characterization circuitry 450 determines engagement statistics associated with communications between the supplementary content media provider 108 and registered panelist devices, such as the media presentation device(s) 110. For example, the supplementary content characterization circuitry 450 can determine engagement statistics based on a frequency of communications between the supplementary media provider 108 and the registered panelist devices. In the illustrated example of FIG. 4, the supplementary content characterization circuitry 450 determines demographic information associated with the registered panelist devices based on panelist identifiers received in associated media session reports and data associated with the panelist identifiers in the demographics database 490. In some examples, the supplementary content characterization circuitry 450 is instantiated by processor circuitry executing supplementary content characterization instructions and/or configured to perform operations such as those represented by the flowchart of FIG. 9.

In some examples, the audience measurement circuitry 104 includes means for determining supplementary media provider engagement information. For example, the means for determining engagement information may be implemented by the supplementary content characterization circuitry 450. In some examples, the supplementary content characterization circuitry 450 may be instantiated by processor circuitry such as the example processor circuitry 1212 of FIG. 12. For instance, the supplementary content characterization circuitry 450 may be instantiated by the example microprocessor 1300 of FIG. 13 executing machine executable instructions such as those implemented by at least blocks 910, 912, 914, 916, 918, 920, 922 of FIG. 9. In some examples, the supplementary content characterization circuitry 450 may be instantiated by hardware logic circuitry, which may be implemented by an ASIC, XPU, or the FPGA circuitry 1400 of FIG. 14 structured to perform operations corresponding to the machine readable instructions. Additionally or alternatively, the supplementary content characterization circuitry 450 may be instantiated by any other combination of hardware, software, and/or firmware. For example, the supplementary content characterization circuitry 450 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate. In some examples, the means for determining supplementary media provider engagement information includes means for requesting information associated with the supplementary content. In some examples, the means for determining supplementary media provider engagement information includes means for linking supplementary content information with a supplementary media provider. In some examples, the means for determining supplementary media provider engagement information includes means for determining engagement of media presentation device(s) with the supplementary content. In some examples, the means for determining supplementary media provider engagement information includes means for identifying demographics associated with the media presentation device(s). In some examples, the means for determining supplementary media provider engagement information includes means for associating identified supplementary content information, engagement, and demographics with the supplementary media provider.

The audience measurement circuitry 104 of FIG. 4 includes the demographics report generation circuitry 460 to generate demographics reports. In some examples, the demographics report generation circuitry 460 generates supplementary content demographics reports for the supplementary media provider 108 based on determined supplementary content information, determined viewing information, determined engagement statistics, and/or determined demographic information associated with users that encountered content from the supplementary media provider 108. In such examples, the demographics report generation circuitry 460 causes the interface circuitry 410 to transmit the server demographics reports to the supplementary media provider 108.

In the illustrated example of FIG. 4, the demographics report generation circuitry 460 generates primary content demographics reports. For example, the demographics report generation circuitry can analyze primary content data associated with the media presentation device(s) 110 that is received by the interface circuitry 410. In some examples, the demographics report generation circuitry 460 identifies timestamps associated with certain events encountered in primary content, such as a timespan within a sports game (e.g., a last 2 minutes of a football game), a television show, and/or a movie (e.g., a climax, a beginning, middle, or end of the movie). For example, the interface circuitry 410 can receive event data and associated timestamps from the primary media provider 102. Additionally or alternatively, the demographics report generation circuitry 460 can analyze the primary content to generate the timestamps associated with the events. In such examples, the demographics report generation circuitry 460 can store the timestamps and associated events with data indicative of the primary content via the primary content database 470. In some examples, the demographics report generation circuitry 460 associates the events with supplementary content and/or ignored supplementary content opportunities encountered by the media presentation device(s) 110. As such, the association between the events in the primary content and the characteristics of the supplementary content can provide an indication of factors that played a role in user behavior.

In FIG. 4, the demographics report generation circuitry 460 identifies demographic information associated with panelist identifiers received in the media session reports. Further, the demographics report generation circuitry 460 can associate the demographic information with the data in the media session reports to generate demographic reports. As such, the demographics report generation circuitry 460 can include the determined demographic information associated with the panelist identifiers, the identified viewing information, characteristics associated with the primary content encountered during the media session, characteristics associated with the supplementary content encountered during the media session, and/or identified relationships between the events in the primary content and the characteristics associated with the supplementary content in the demographics reports. Furthermore, the demographics report generation circuitry 460 can cause the interface circuitry 410 to transmit the demographics report to the primary media provider 102 and/or the supplementary media provider 108 via the network 114. In some examples, the demographics report generation circuitry 460 is instantiated by processor circuitry executing demographics reporting instructions and/or configured to perform operations such as those represented by the flowcharts of FIGS. 9-10.

In some examples, the audience measurement circuitry 104 includes means for generating one or more demographics reports. In some examples, the means for generating the demographics report(s) generates server demographics reports including identified viewing information, identified supplementary content, determined engagement information associated with panelist devices, and demographics information associated with users of the panelist devices. In some examples, the means for generating the demographics report(s) generates primary and/or supplementary content demographics reports. For example, the means for generating one or more demographics reports may be implemented by the demographics report generation circuitry 460. In some examples, the demographics report generation circuitry 460 may be instantiated by processor circuitry such as the example processor circuitry 1212 of FIG. 12. For instance, the demographics report generation circuitry 460 may be instantiated by the example microprocessor 1300 of FIG. 13 executing machine executable instructions such as those implemented by at least block 922 of FIG. 9 and/or blocks 1002, 1004, 1006, 1008, 1010 of FIG. 10. In some examples, the demographics report generation circuitry 460 may be instantiated by hardware logic circuitry, which may be implemented by an ASIC, XPU, or the FPGA circuitry 1400 of FIG. 14 structured to perform operations corresponding to the machine readable instructions. Additionally or alternatively, the demographics report generation circuitry 460 may be instantiated by any other combination of hardware, software, and/or firmware. For example, the demographics report generation circuitry 460 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate. In some examples, the means for generating one or more demographics reports includes means for identifying demographics associated with one or more users. In some examples, the means for generating one or more demographics reports includes means for causing transmission of the demographics reports.

While an example manner of implementing the media presentation environment 106 of FIG. 1 is illustrated in FIGS. 2 and 3, one or more of the elements, processes, and/or devices illustrated in FIGS. 2 and 3 may be combined, divided, re-arranged, omitted, eliminated, and/or implemented in any other way. Further, the example media presentation device(s) 110, the example metering circuitry 112, the example interface circuitry 210, the example request circuitry 220, the example display(s) 230, the example speaker(s) 240, the example user input circuitry 250, the example interface circuitry 310, the example traffic monitor circuitry 320, the example primary content processor circuitry 330, the example supplementary content processor circuitry 340, the example audience engagement circuitry 350, the example media session report generation circuitry 360, the example primary content database 370, the example supplementary content database 380, the example media session database 390, and/or, more generally, the example media presentation environment 106 of FIG. 1, may be implemented by hardware alone or by hardware in combination with software and/or firmware. Thus, for example, any of the example media presentation device(s) 110, the example metering circuitry 112, the example interface circuitry 210, the example request circuitry 220, the example display(s) 230, the example speaker(s) 240, the example user input circuitry 250, the example interface circuitry 310, the example traffic monitor circuitry 320, the example primary content processor circuitry 330, the example supplementary content processor circuitry 340, the example audience engagement circuitry 350, the example media session report generation circuitry 360, the example primary content database 370, the example supplementary content database 380, the example media session database 390, and/or, more generally, the example media presentation environment 106, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example media presentation environment 106 of FIG. 1 may include one or more elements, processes, and/or devices in addition to, or instead of, those illustrated in FIGS. 2 and 3, and/or may include more than one of any or all of the illustrated elements, processes and devices.

While an example manner of implementing the audience measurement circuitry 104 of FIG. 1 is illustrated in FIG. 4, one or more of the elements, processes, and/or devices illustrated in FIG. 4 may be combined, divided, re-arranged, omitted, eliminated, and/or implemented in any other way. Further, the example interface circuitry 410, the example request identification circuitry 420, the example device monitor circuitry 430, the example server monitor circuitry 440, the example supplementary content characterization circuitry 450, the example demographics report generation circuitry 460, the example primary content database 470, the example server database 480, the example demographics database 490, and/or, more generally, the example audience measurement circuitry 104 of FIG. 1, may be implemented by hardware alone or by hardware in combination with software and/or firmware. Thus, for example, any of the example interface circuitry 410, the example request identification circuitry 420, the example device monitor circuitry 430, the example server monitor circuitry 440, the example supplementary content characterization circuitry 450, the example demographics report generation circuitry 460, the example primary content database 470, the example server database 480, the example demographics database 490, and/or, more generally, the example audience measurement circuitry 104, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example audience measurement circuitry 104 of FIG. 1 may include one or more elements, processes, and/or devices in addition to, or instead of, those illustrated in FIG. 4, and/or may include more than one of any or all of the illustrated elements, processes and devices.

Figure 5:
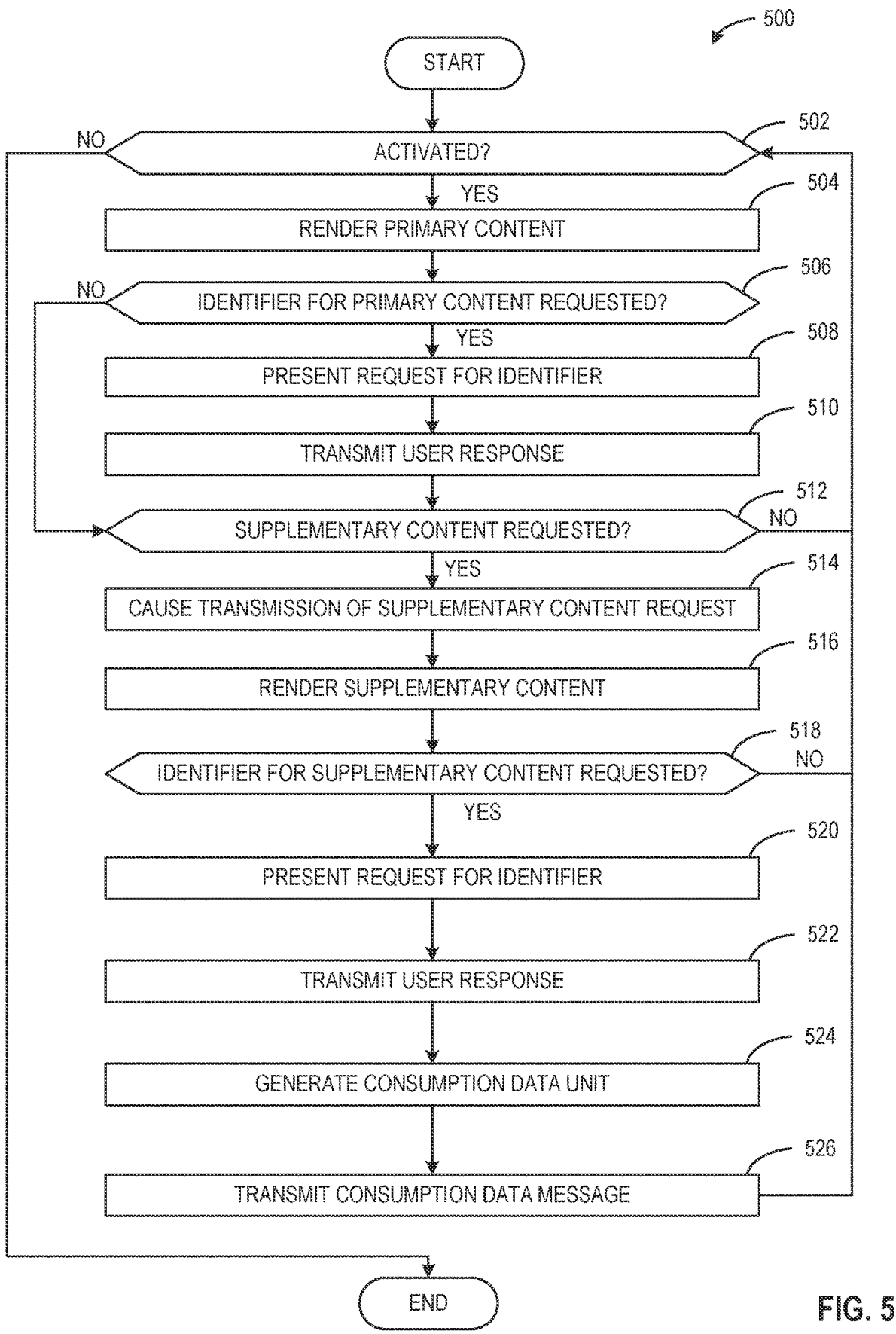
FIG. 5 is a flowchart representative of example machine readable instructions and/or example operations that may be executed by example processor circuitry to implement the example media presentation device(s) of FIG. 2.

A flowchart representative of example machine readable instructions, which may be executed to configure processor circuitry to implement the media presentation device(s) 110 of FIGS. 1 and/or 2, is shown in FIG. 5. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 13 and/or 14.

Figure 6:
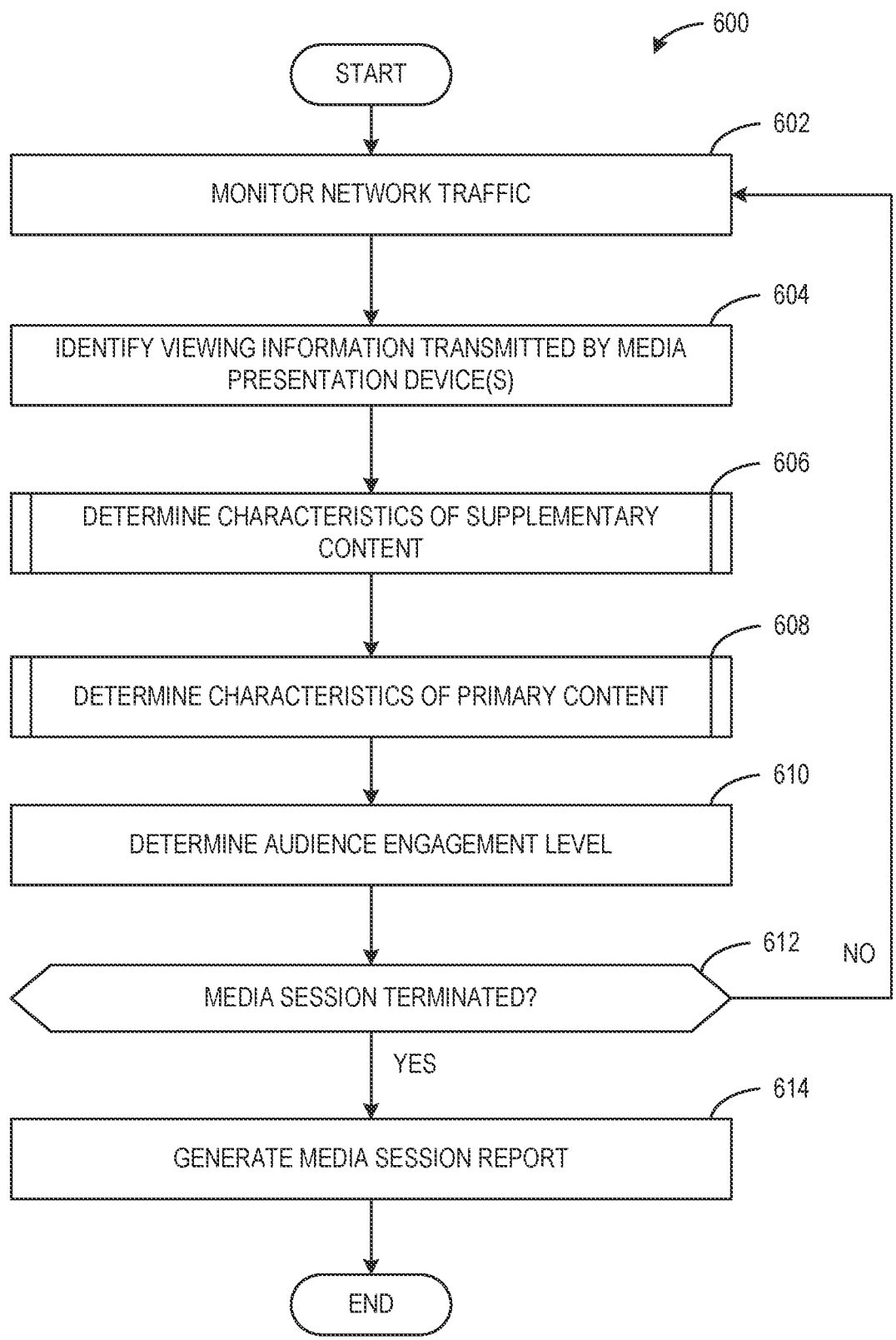
FIG. 6 is a flowchart representative of example machine readable instructions and/or example operations that may be executed by example processor circuitry to implement the example metering circuitry of FIG. 3.
Figure 7:
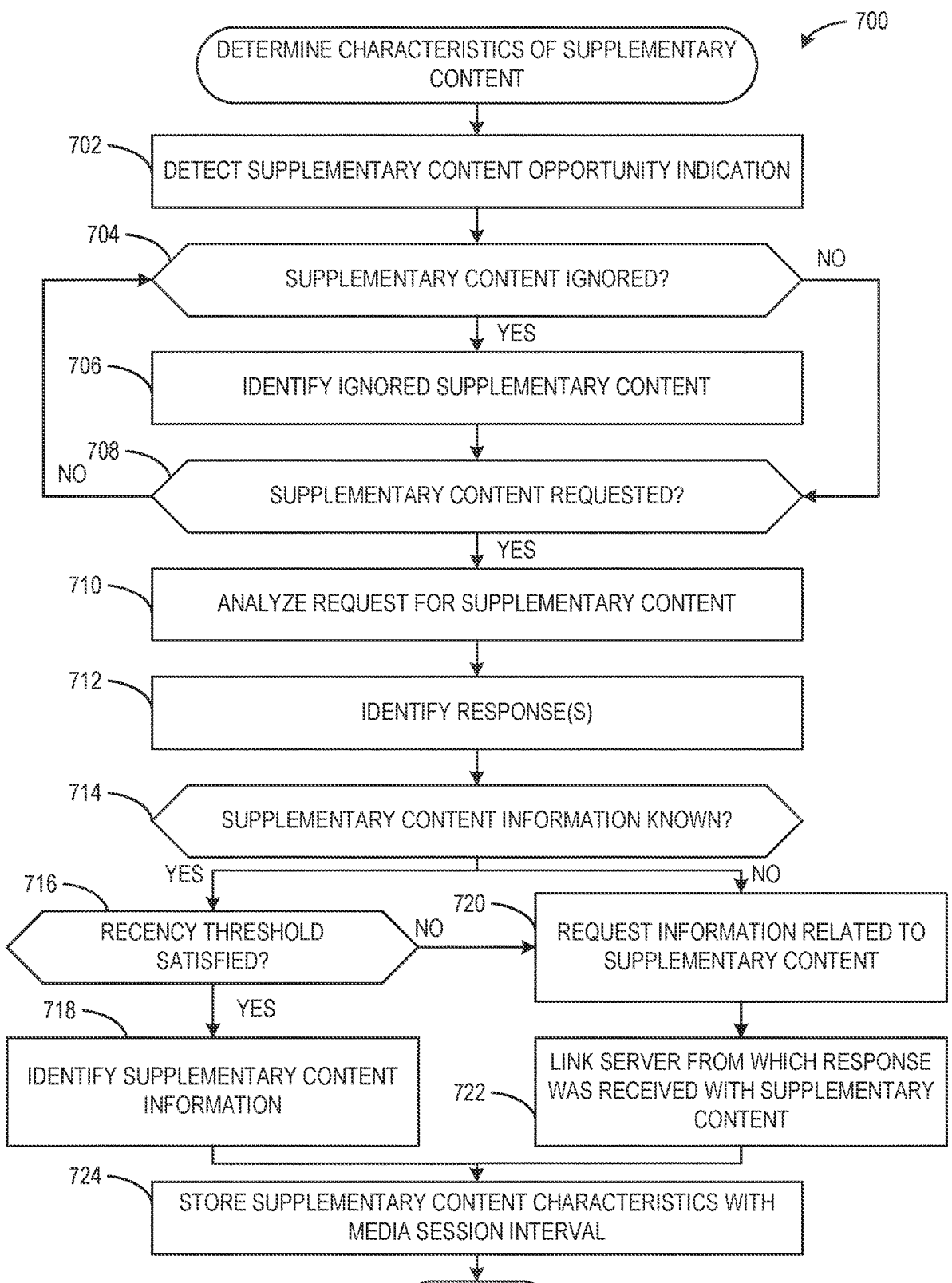
FIG. 7 is another flowchart representative of example machine readable instructions and/or example operations that may be executed by example processor circuitry to implement the example metering circuitry of FIG. 3.
Figure 8:
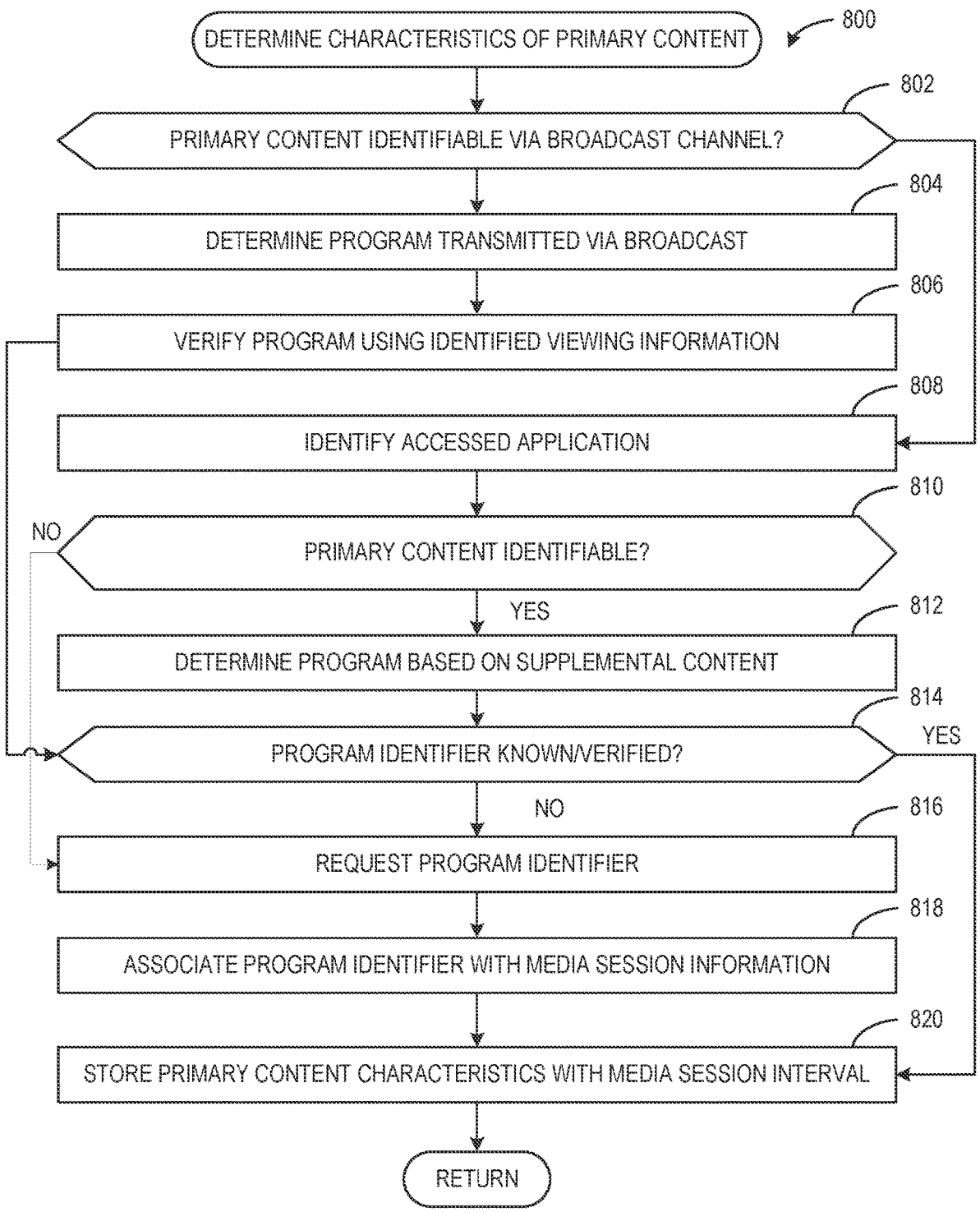
FIG. 8 is another flowchart representative of example machine readable instructions and/or example operations that may be executed by example processor circuitry to implement the example metering circuitry of FIG. 3.

Flowcharts representative of example machine readable instructions, which may be executed to configure processor circuitry to implement the metering circuitry 112 of FIGS. 1 and/or 3, are shown in FIGS. 6-8. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 13 and/or 14.

Figure 9:
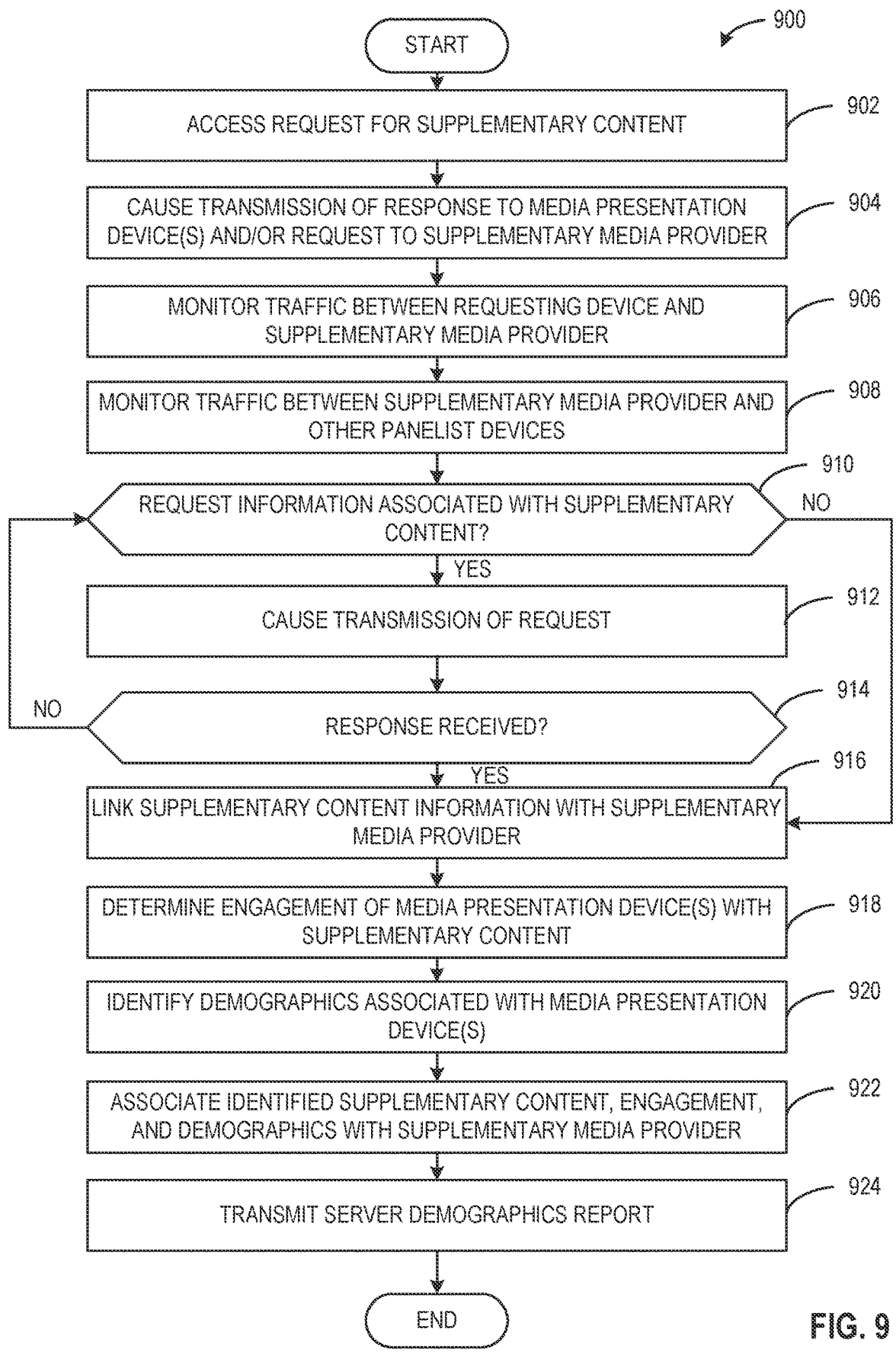
FIG. 9 is a flowchart representative of example machine readable instructions and/or example operations that may be executed by example processor circuitry to implement the example audience measurement circuitry of FIG. 4.
Figure 10:
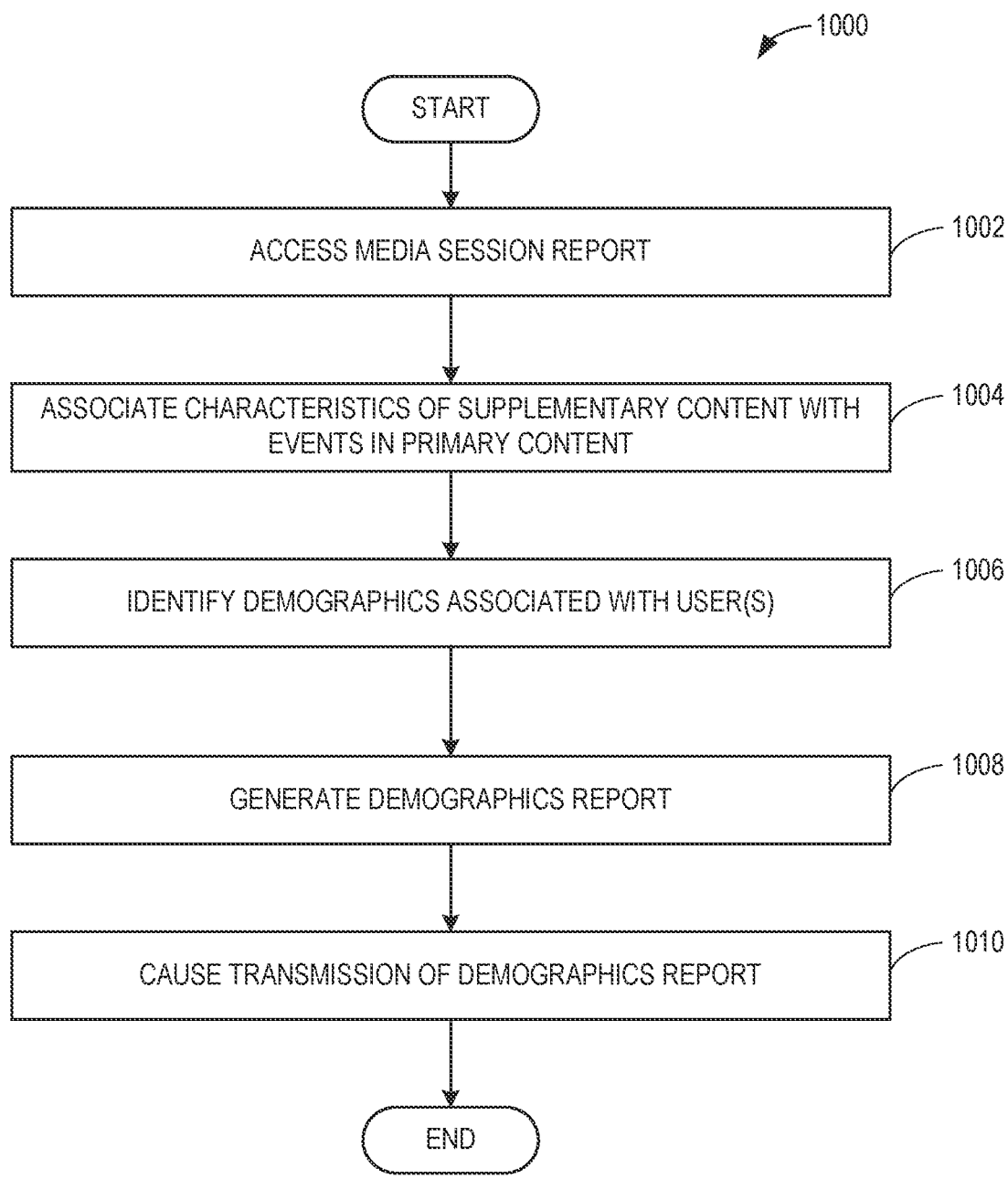
FIG. 10 is another flowchart representative of example machine readable instructions and/or example operations that may be executed by example processor circuitry to implement the example audience measurement circuitry of FIG. 4.

Flowcharts representative of example machine readable instructions, which may be executed to configure processor circuitry to implement the audience measurement circuitry 104 of FIGS. 1 and/or 4, are shown in FIGS. 9-10. The machine readable instructions may be one or more executable programs or portion(s) of an executable program for execution by processor circuitry, such as the processor circuitry 1212 shown in the example processor platform 1200 discussed below in connection with FIG. 12 and/or the example processor circuitry discussed below in connection with FIGS. 13 and/or 14.

The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 5-10, many other methods of implementing the example audience analysis system 100 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 5-10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions and/or example operations 500 that may be executed and/or instantiated by processor circuitry to present content in accordance with ATSC 3.0 standards and enable a user(s) to provide information associated with the presented content. The machine readable instructions and/or the operations 500 of FIG. 5 begin at block 502, at which the media presentation device(s) 110 (FIGS. 1 and 2) cause the operations 500 to proceed to block 504 in response to being activated. For example, in response to receiving power, the media presentation device(s) 110 can cause the operations 500 to proceed to block 504. Otherwise, in response to the media presentation device(s) 110 not being activated, the operations 500 terminate.

At block 504, the media presentation device(s) 110 render primary content. For example, the interface circuitry 210 (FIG. 2) accesses the primary content via the network 114 (FIG. 1). In turn, the media presentation device(s) 110 can present the primary content to the user(s) via the display(s)

230 (FIG. 2) and/or the speaker(s) 240. In some examples, the primary content is media provided via a linear service according to a schedule and time base defined by the primary media provider 102 (FIG. 1). In some examples, the primary content is media that the primary media provider 102 delivers to the media device presentation device(s) 110 on-demand in response to the user(s) selecting the media in an application. As such, the interface circuitry 210 accesses the Internet and/or a broadcast channel via the network 114 to obtain the primary content.

At block 506, the media presentation device(s) 110 determines whether a first identifier (e.g., a name, a title, an identification value, etc.) of the primary content has been requested. For example, the interface circuitry 210 receives a request for the first identifier of the primary content. In some examples, the interface circuitry 210 receives the request for the first identifier of the primary content from the metering circuitry 112 (FIGS. 1 and 3). In some examples, the interface circuitry 210 receives the request for the first identifier of the primary content from the audience measurement circuitry 104 (FIGS. 1 and 4) via the network 114. In response to receiving a request for the first identifier of the primary content, the operations 500 proceed to block 508. Otherwise, the operations 500 skip to block 512.

At block 508, the media presentation device(s) 110 presents a request for the first identifier to the user(s) of the media presentation device(s) 110. In some examples, the request circuitry 220 (FIG. 2) causes the request for the first identifier of the primary content to be presented via the display(s) 230 and/or the speaker(s) 240. For example, the request circuitry 220 can cause a prompt requesting a descriptor of the primary content to be presented to the user(s) via the display(s) 230 and/or the speaker(s) 240.

At block 510, the media presentation device(s) 110 transmits a user response. For example, the request circuitry 220 can cause the interface circuitry 210 to transmit data corresponding to an indication provided by the user(s) in response to the request for the first identifier. In some examples, the request circuitry 220 determines the data indicative of the user response based on one or more signal(s) from the user input circuitry 250 (FIG. 2). For example, the request circuitry 220 can determine the data based on a selection, a touch input, a visual input, and/or an audible input obtained via the user input circuitry 250. In some examples, the request circuitry 220 causes the interface circuitry 210 to transmit the data indicative of the user response to the audience measurement circuitry 104 and/or the metering circuitry 112.

At block 512, the media presentation device(s) 110 determines whether supplementary content has been requested. In some examples, the request circuitry 220 determines the user(s) selected an option to obtain supplementary content via the user input circuitry 250. For example, the request circuitry 220 can determine the user(s) indicated a request to obtain a certain advertisement, information associated with the primary content, such as an indication of individuals associated with a show, a movie, a sports game, etc., and/or other features associated with the primary content, such as closed captions, additional or alternative camera angles, etc. In some examples, in response to the supplementary content being requested, the operations 500 proceed to block 514. Otherwise, the operations 500 return to block 502.

At block 514, the media presentation device(s) 110 causes transmission of a supplementary content request. In some examples, the interface circuitry 210 transmits the supplementary content request to the audience measurement circuitry 104 and/or the supplementary media provider 108 (FIG. 1).

At block 516, the media presentation device(s) 110 renders the supplementary content. For example, interface circuitry 210 can receive one or more signal(s) corresponding to the supplementary content. In turn, the display(s) 230 and/or the speaker(s) 240 can visually and/or audibly present the supplementary content to the user(s).

At block 518, the media presentation device(s) 110 determines whether a second identifier for the supplementary content has been requested. For example, the interface circuitry 210 can receive a request for the second identifier associated with the supplementary content being presented by the display(s) 230 and/or the speaker(s) 240 from the metering circuitry 112 and/or from the audience measurement circuitry 104. In response to receiving a request for the second identifier of the supplementary content, the operations 500 proceed to block 520. Otherwise, the operations 500 return to block 502.

At block 520, the media presentation device(s) 110 presents the request for the second identifier to the user(s) of the media presentation device(s) 110. In some examples, the request circuitry 220 causes the request for the second identifier of the supplementary content to be presented via the display(s) 230 and/or the speaker(s) 240. For example, the request circuitry 220 can cause a prompt requesting a descriptor of the supplementary content to be presented to the user(s) via the display(s) 230 and/or the speaker(s) 240.

At block 522, the media presentation device(s) 110 transmits a user response. For example, the request circuitry 220 can determine data corresponding to an indication provided by the user(s) in response to the request for the first identifier. In some examples, the request circuitry 220 determines the data indicative of the user response based on one or more signal(s) from the user input circuitry 250. For example, the request circuitry 220 can determine the data based on a selection, a touch input, a visual input, and/or an audible input obtained via the user input circuitry 250. In some examples, the request circuitry 220 causes the interface circuitry 210 to transmit the data indicative of the user response to the audience measurement circuitry 104 and/or the metering circuitry 112.

At block 524, the media presentation device(s) 110 generates a consumption data unit. For example, the viewing information identification circuitry 260 can generate the consumption data unit based on identified viewing information. In some examples, the viewing information identification circuitry 260 identifies household information associated with the media presentation device(s) 110, such as a device location (e.g., latitude and longitude), a regional identifier (e.g., a country, a zip code, etc.), a cable provider, and/or a make and/or model of the media presentation device(s) 110. Further, the viewing information identification circuitry 260 identifies a service identifier associated with the service of the primary content and/or the supplementary content being accessed by the media presentation device(s) 110, a start time of the service access, an end time of the service access. In some examples, the viewing information identification circuitry 260 determines a content identifier (e.g., an Ad-ID value, an EIDR value, etc.) associated with the primary content and/or the supplementary content being accessed by the media presentation device(s) 110. Additionally, the viewing information identification circuitry 260 identifies a component of the media session being accessed by the media presentation device(s) 110, such as a component identifier, a component type (e.g., an audio component, a video component, a closed caption component, etc.), a component role, and/or a component language. In some examples, the viewing information identification circuitry 260 determines an application identifier(s) associated with one or more applications being accessed by the media presentation device(s) 110, a start time of the application access, and/or an end time of the application access. In some examples, the viewing information identification circuitry 260 identifies a playback speed at which the media presentation device(s) 110 is presenting the primary and/or supplementary content, a delivery path through which the primary and/or supplementary content is accessed (e.g., a broadcast delivery, a broadband delivery, an alternate IP delivery, a hard-drive source, a time-shift-buffer source, a delivery via direct connection), and/or any other information associated with the viewing session.

At block 526, the media presentation device(s) 110 transmits a consumption data message. For example, the viewing information identification circuitry 260 causes the interface circuitry 210 to transmit the consumption data unit including the viewing information in the consumption data message. The interface circuitry 210 can transmit the consumption data message to the primary media provider 102 and/or the supplementary media provider 108 via the network 114. In some examples, the viewing information identification circuitry 260 causes the interface circuitry 210 to periodically transmit the consumption data message (e.g., every 5 seconds).

FIG. 6 is a flowchart representative of example machine readable instructions and/or example operations 600 that may be executed and/or instantiated by processor circuitry to determine viewing information, such as content presented by the media presentation device(s) 110 (FIGS. 1 and 2) and presentation information. Further, the example machine readable instructions and/or example operations 600 may be executed by the processor circuitry to associate the viewing information with a respective user(s) of the media presentation device(s) 110. The machine readable instructions and/or the operations 600 of FIG. 6 begin at block 602, at which the metering circuitry 112 (FIGS. 1 and 3) monitors network traffic associated with the media presentation device(s) 110. For example, the interface circuitry 310 (FIG. 3) can access data being transmitted to and/or from the media presentation device(s) 110. In some examples, the traffic monitor circuitry 320 (FIG. 3) processes the data that the media presentation device(s) 110 transmits and/or receives via the network 114. As such, the traffic monitor circuitry 320 can monitor data that is transmitted between the media presentation device(s) 110 and the primary media provider 102, between the media presentation device(s) 110 and the audience measurement circuitry 104, and/or between the media presentation device(s) and the supplementary media provider 108. In some examples, the traffic monitor circuitry 320 accesses data transmitted by the media presentation device(s) 110 that corresponds to viewing information identified by the viewing information identification circuitry 260 (FIG. 2). In some examples, the traffic monitor circuitry 320 monitors primary content that the primary media provider 102 broadcasts and/or transmits to the media presentation device(s) 110 via the network 114. In such examples, the traffic monitor circuitry 320 monitors messages and/or signals transmitted between the media presentation device(s) 110 and the primary media provider 102. In some examples, the traffic monitor circuitry 320 monitors signals associated with audio and/or video rendered by the media presentation device(s) 110 to enable detection of audio watermarks, video watermarks, and/or fingerprints indicative of supplementary content presented by the media presentation device(s) 110.

At block 604, the metering circuitry 112 identifies viewing information transmitted by the media presentation device(s) 110. For example, the viewing data collection circuitry 325 (FIG. 3) can analyze a consumption data message that the media presentation device(s) 110 transmits to extract a consumption data unit and, in turn, determine viewing information indicated by the consumption data unit. For example, the viewing data collection circuitry 325 can determine a device location, a regional identifier, a cable provider, a make and/or model of the media presentation device(s) 110, a service identifier, a start and/or end time of the service access, a content identifier, a broadcast identifier, a broadcast interval, a content source, a component identifier, a component type, a component role, a component language, an application identifier, a start and/or end time of the application access, a playback speed, a delivery path through which the primary and/or supplementary content is being accessed, and/or any other information indicated in the transmission from the media presentation device(s) 110. Further, the viewing data collection circuitry 325 can store the viewing information via the media session database 390 (FIG. 3).

At block 606, the metering circuitry 112 determines characteristics of supplementary content. For example, the supplementary content processor circuitry 340 (FIG. 3) can determine whether an indication of an opportunity to present supplementary content has been received in response to the media presentation device(s) 110 presenting a watermark, a fingerprint, and/or another type of signature. In some examples, the watermark includes data that directly or indirectly enables the media presentation device(s) 110 to access the supplementary media provider 108 (FIG. 1) associated with the supplementary content. In some examples, the media presentation device(s) 110 extracts the fingerprint or signature from a presented audio or video frame and transmits the fingerprint or signature to the audience measurement circuitry 104. In such examples, the audience measurement circuitry 104 transmits data (e.g., a uniform resource locator (URL), an IP address, a domain name, etc.) to the media presentation device(s) 110 to enable the media presentation device(s) 110 to retrieve the supplementary content from the supplementary media provider 108. The supplementary content processor circuitry 340 can determine the characteristics associated with the supplementary content that the media presentation device(s) 110 has the opportunity to present. For example, the supplementary content processor circuitry 340 can determine a type of the supplementary content (e.g., an advertisement, a camera angle, information related to individuals associated with the primary content, etc.), a provider of the supplementary content, an interval over which the supplementary content was accessed by the media presentation device(s) 110, a decision made by the user(s) of the media presentation device(s) 110 to retrieve or ignore the supplementary content, and/or any other information associated with the supplementary content. In some examples, the supplementary content processor circuitry 340 determines one or more of the characteristics based on the watermark, the fingerprint, and/or the signature presented by the media presentation device(s) 110. In such examples, the supplementary content processor circuitry 340 can determine characteristics of supplementary content presented by the media presentation device(s) 110 as well as supplementary content options that are ignored by the user(s) of the media presentation device(s) 110. For example, the supplementary content processor circuitry 340 can determine characteristics of supplementary content associated with a watermark presented by the media presentation device(s) 110 and determine the supplementary content associated with the watermark was ignored by the user(s) in response to data in the watermark not being transmitted by the media presentation device(s) 110 to retrieve the supplementary content associated therewith. In some examples, the supplementary content processor circuitry 340 determines one or more of the characteristics based on one or more signal(s) and/or message(s) transmitted between the supplementary media provider 108 and the media presentation device(s) 110. In some examples, the supplementary content processor circuitry 340 determines one or more of the characteristics based on the viewing information identified by the viewing data collection circuitry 325. Example operations according to which the metering circuitry 112 determines the characteristics of the supplementary content are discussed further in association with FIG. 7.

At block 608, the metering circuitry 112 determines characteristics of primary content obtained by the media presentation device(s) 110. For example, the primary content processor circuitry 330 (FIG. 3) can determine the characteristics associated with the primary content being presented by the media presentation device(s) 110 based on a broadcast signal identified by the traffic monitor circuitry 320 and a time at which the broadcast signal is received by the media presentation device(s) 110. In some examples, the primary content processor circuitry 330 determines the characteristics associated with the primary content being presented by the media device(s) 110 based on at least a portion of the viewing information determined by the viewing data collection circuitry 325. For example, the primary content processor 330 can determine a program associated with the primary content based on the content identifier, the broadcast identifier, the broadcast interval, the application identifier, and/or any other information determined by the viewing data collection circuitry 325. In some examples, the primary content processor circuitry 330 determines the characteristics associated with the primary content based on determined characteristics of the supplementary content. For example, in response to the primary content being received over the Internet, the primary content processor circuitry can determine the primary content based on the application identifier and characteristics of the supplementary content that are indicative of a certain program that the application offers. The primary content processor circuitry 330 stores the determined characteristics of the primary content and/or the consumption data unit via the primary content database 370 (FIG. 3). Example operations according to which the metering circuitry 112 determines the characteristics of the primary content are discussed further in association with FIG. 8.

At block 610, the metering circuitry 112 determines an audience engagement level. For example, the audience engagement circuitry 350 (FIG. 3) can determine the engagement level of the user(s) associated with the media presentation device(s) 110 based on the determined viewing information, the determined characteristics of the primary content, and/or the determined characteristics of the supplementary content. In some examples, the audience engagement circuitry 350 determines the engagement level of the user(s) based on changes in the determined viewing information, the determined primary content characteristics, and/or the determined supplementary content characteristics over time. For example, the audience engagement circuitry 350 can assign an engagement level to one or more program(s) associated with the primary content presented by the media presentation device(s) 110 based on a length of time that the media presentation device(s) 110 presented the program(s). In some examples, the audience engagement circuitry 350 identifies the length of time relative to the timeslot for the program(s). For example, the audience engagement circuitry 350 can identify that the user(s) started viewing the program(s) at a first time associated with the program(s) (e.g., a start of the program(s), a certain time from a start or end of the program(s), etc.) and stopped viewing the program(s) at a second time associated with the program(s) (e.g., an end of the program(s), a certain time from the start or end of the program, etc.). In some examples, the audience engagement circuitry 350 determines the audience engagement level of the user(s) based on the type of the supplementary content, the interval over which the supplementary content was accessed by the media presentation device(s) 110, the decision made by the user(s) of the media presentation device(s) 110 to retrieve or ignore the supplementary content, and/or any other information associated with the supplementary content. In some examples, the audience engagement circuitry 350 determines one or more panelist identifier(s) associated with the user(s) based on an indication from the user(s) and/or a depiction of a viewing environment in which the user(s) are located. In such examples, the audience engagement circuitry 350 associates the panelist identifier(s) with the audience engagement level, the encountered primary content characteristics, and the encountered supplementary content characteristics. The audience engagement circuitry 350 stores the audience engagement level of the user(s) for respective time intervals with the characteristics of the primary content and/or the supplementary content via the media session database 390.

At block 612, the metering circuitry 112 determines whether the media session has been terminated. For example, the metering circuitry 112 can determine the media session has been terminated in response to the media presentation device(s) 110 not presenting audio or video for at least a threshold period of time. In some examples, the metering circuitry 112 determines the media session has been terminated in response to the media presentation device(s) 110 not transmitting data to the primary content provider 102 and/or the supplementary content provider 108 for at least a threshold period of time (e.g., 10 seconds, 20 seconds, etc.). In response to the media session being terminated, the operations 600 proceed to block 612. Otherwise, in response to the media session continuing, the operations 600 return to block 602.

At block 614, the metering circuitry 112 generates a media session report. For example, the media session report generation circuitry 360 (FIG. 3) can generate the media session report based on the determined characteristics of the primary content encountered by the user(s), the determined characteristics of the supplementary content encountered by the user(s), the audience engagement level of the user(s), the viewing information, and the panelist identifier(s) associated with the user(s). In some examples, the media session report generation circuitry 360 compares the viewing information to the determined characteristics of the primary content and/or the determined characteristics of the supplementary content. In some examples, the media session report generation circuitry 360 flags a portion of the determined characteristics of the primary content and/or a portion of the determined characteristics of the supplementary content that contradicts the viewing information. In some examples, the media session report generation circuitry 360 removes the flagged portions of the determined characteristics from the media session report to improve an accuracy of the media session report. In some examples, the media session report generation circuitry 360 determines a trustworthiness of user responses based on the flagged portions of the determined characteristics. In such examples, the media session report generation circuitry 360 stores the trustworthiness in the media session database 390 to help the primary content processor circuitry 330 and/or the supplementary content processor circuitry 340 determine how often to request primary and/or supplementary content characteristics from the users. In some examples, the media session report generation circuitry 360 causes the interface circuitry 310 to transmit the media session report to the audience measurement circuitry 104.

FIG. 7 is a flowchart representative of example machine readable instructions and/or example operations 700 that may be executed and/or instantiated by processor circuitry to determine characteristics of supplementary content rendered by the media presentation device(s) 110 (FIGS. 1 and 2). The example operations 700 can implement block 606 of the operations 600 of FIG. 6. The machine readable instructions and/or the operations 700 of FIG. 8 begin at block 702, at which the metering circuitry 112 (FIGS. 1 and 3) detects an indication of an opportunity for the media presentation device(s) 110 to receive supplementary content. For example, the supplementary content processor circuitry 340 can identify a watermark, a fingerprint, or some other signature in an audio or video frame presented by the media presentation device(s) 110. In some examples, the supplementary content processor circuitry 340 (FIG. 3) processes data associated with the presented watermark, fingerprint, and/or signature.

At block 704, the metering circuitry 112 determines whether supplementary content has been ignored by the user(s) of the media presentation device(s) 110. For example, the supplementary content processor circuitry 340 can determine the opportunity to present the supplementary has been ignored by the user(s) in response to the media presentation device(s) 110 ending a presentation of the watermark, fingerprint, and/or other signature previously detected in the audio or video frame of the media presentation device(s) 110 and data associated with the watermark, fingerprint, and/or other signature not being transmitted by the media presentation device(s) 110 to the audience measurement circuitry 104 and/or the supplementary media provider 108.

At block 706, the metering circuitry 112 identifies the ignored supplementary content. For example, the supplementary content processor circuitry 340 can identify the ignored supplementary content based on the data associated with the presented watermark, fingerprint, and/or signature. In some examples, the supplementary content processor circuitry 340 performs a look-up of the data in the supplementary content database 380 (FIG. 3). In such examples, the supplementary content processor circuitry 340 extracts characteristics associated with the data in the supplementary content database 380.

In some examples, in response to the data associated with the presented watermark, fingerprint, and/or signature not being identified in the supplementary content database 380, the supplementary content processor circuitry 340 generates an association between the data and the media session and/or the time interval with an indication that the data corresponds to supplementary content ignored by the user(s) of the media presentation device(s) 110. In such examples, the supplementary content processor circuitry 340 stores the generated association in the media session database 390 (FIG. 3).

In some examples, the supplementary content processor circuitry 340 causes the interface circuitry 310 (FIG. 3) to request information associated with the supplementary content from the media presentation device(s) 110. In such examples, the media presentation device(s) 110 can prompt the user(s) to provide the information and/or return the information to the metering circuitry 112. In such examples, the supplementary content processor circuitry 340 generates and stores an association between the data associated with the ignored supplementary content and the received information in the supplementary content database 380. In some examples, the supplementary content processor circuitry 340 can request the information associated with the ignored supplementary content in response to the associated watermark, fingerprint, and/or signature being encountered at least a threshold number of times and characteristics of the supplementary content not being stored in the supplementary content database 380.

At block 708, the metering circuitry 112 determines whether supplementary content has been requested. For example, the supplementary content processor circuitry 340 can determine whether the media presentation device(s) 110 transmitted a request to retrieve supplementary content. In some examples, the supplementary content processor circuitry 340 identifies the request in response to the media presentation device(s) 110 transmitting data associated with a watermark, fingerprint, and/or other signature presented by the media presentation device(s) 110 (e.g., in audio and/or video frames). In some examples, the supplementary content processor circuitry 340 identifies the request in response to the media presentation device(s) 110 transmitting a message or signal to the supplementary media provider 108 and/or the audience measurement circuitry 104 while the watermark, fingerprint, and/or signature is being presented. In some examples, the supplementary content processor circuitry 340 identifies the request in response to the media presentation device(s) transmitting a message or signal to a first address that is different from a second address that is providing the primary content to the media presentation device(s) 110. In response to determining that supplementary content has been requested, the operations 800 proceed to block 810. Otherwise, in response to determining that supplementary content has not been requested, the operations return to block 804.

At block 710, the metering circuitry 112 analyzes the request transmitted by the media presentation device(s) 110 to retrieve supplementary content. In some examples, the supplementary content processor circuitry 340 extracts data in the request that is indicative of information associated with the supplementary content being requested. In such examples, the supplementary content processor circuitry 340 can analyze the extracted data to determine the watermark, fingerprint, and/or other signature associated with the request. Additionally or alternatively, the supplementary content processor circuitry 340 can analyze the extracted data to identify a destination associated with the request.

At block 712, the metering circuitry 112 identifies a response received by the media presentation device(s) 110. In some examples, the supplementary content processor circuitry 340 can identify a first response indicative of data, such as a supplementary media provider location (e.g., an IP address, uniform resource locator (URL), etc.) and media timing information, that enables the media presentation device(s) 110 to access and present the supplementary content from the supplementary media provider 108 (FIG.

1). In some examples, the supplementary content processor circuitry 340 receives the first response from the audience measurement circuitry 104. In some examples, the supplementary content processor circuitry 340 identifies a second response including the supplementary content from the supplementary media provider 108. In some example, the data associated with a watermark enables the media presentation device(s) 110 to retrieve a single response from the supplementary media provider 108 including the supplementary content.

At block 714, the metering circuitry 112 determines whether information associated with the supplementary content, or the supplementary content opportunity encountered by the media presentation device(s) 110 is known. For example, the supplementary content processor circuitry 340 can compare data associated with the watermark, the fingerprint, the signature, the request, and/or the response(s) to supplementary content data stored in the supplementary content database 380. In some examples, the supplementary content processor circuitry 340 compares portions of the data to the supplementary content data stored in the supplementary content database 380 to enable the supplementary content processor circuitry 340 to extract certain portions of information associated with the supplementary content from the supplementary content database 380. In some examples, the supplementary content processor circuitry 340 determines whether the information associated with the supplementary content is known based on the viewing information determined by the viewing data collection circuitry 325. In response to the information associated with the supplementary content being known, the operations 700 proceed to block 716. Otherwise, the operations 700 proceed to block 720.

At block 716, the metering circuitry 112 determines whether the known information associated with the indication, the request, and/or the response(s) satisfies a recency threshold. For example, the supplementary content processor circuitry 340 can determine whether the known information was identified within a threshold period of time (e.g., within the last week, within the last month, within the last 3 months, etc.). In some examples, the supplementary content processor circuitry 340 configures the recency threshold based on a type of the information associated with the supplementary content. For example, the supplementary content processor circuitry 340 can determine an organization associated with an address from which a response was received (e.g., from which the supplementary content was retrieved) is to be verified after a first threshold period. Further, the watermark that enabled a request that led to the response can include data indicative of a brand represented by an advertisement. As the watermark may be utilized for a different purpose, such as being associated with an advertisement for a different brand associated with the organization, on a more frequent basis, the advertisement associated with the data in the watermark can be verified after a second threshold period shorter than the first threshold period to help maintain an accuracy of the identified information associated with the supplementary content. As such, certain portions of the known information associated with the supplementary content may satisfy (e.g., were previously identified or verified within) the associated recency threshold while other portions of the known information do not satisfy (e.g., were previously identified or verified outside of) another recency threshold. Thus, the supplementary content processor circuitry 340 can determine a provider of the supplementary content is known while also triggering a verification of a type of the supplementary content provided.

In response to the identification or verification of the known information satisfying the recency threshold, the operations 800 proceed to block 818. Otherwise, the operations 800 proceed to block 820.

At block 718, the metering circuitry 112 identifies the supplementary content information. In some examples, the supplementary content processor circuitry 340 identifies the supplementary content information based on information associated with the data stored in the supplementary content database 380 that matches at least a portion of the data associated with the supplementary content, the supplementary content opportunity indication (e.g., the watermark, the fingerprint, etc.), the request for the supplementary content, and/or the response(s) that led to the supplementary content. In some examples, the supplementary content processor circuitry 340 determines an identification of a provider of the supplementary content, such as a company or organization that is the source of the supplementary content based on the information associated with the data stored in the supplementary content database 380. For example, the supplementary content processor circuitry 340 can identify the provider of the supplementary content based on an address associated with a server from which the supplementary content was received. In some examples, the supplementary content processor circuitry 340 determines a type of the supplementary content presented based on the information associated with the data stored in the supplementary content database 380. For example, the supplementary content processor circuitry 340 can determine the supplementary content is an advertisement for a certain product and/or service, a supplementary camera angle for the primary content, information related to individuals associated with the primary content, and/or another type of supplementary content based on the address of the source of the supplementary content, data associated with the watermark or fingerprint associated with the supplementary content, a timespan over which the supplementary content was presented by the media presentation device(s) 110, and/or any other data associated with the supplementary content opportunity indication (e.g., the watermark, the fingerprint, etc.), the request for the supplementary content, and/or the response(s) that led to the supplementary content. In some examples, the supplementary content processor circuitry 340 determines the supplementary content information based on the viewing data detected by the viewing data collection circuitry 325. For example, the supplementary content processor circuitry 340 can determine the supplementary content information based on the application identifier, the content identifier, the broadcast identifier, and/or the interval over which the supplementary content was accessed.

At block 720, the metering circuitry 112 requests information related to the supplementary content. For example, the supplementary content processor circuitry 340 can request an identification of a provider of the supplementary content, a type of the supplementary content, a product or service associated with the supplementary content, etc. In some examples, the supplementary content processor circuitry 340 causes the interface circuitry 310 to transmit a request for certain information associated with the supplementary content to the media presentation device(s) 110. In such examples, the media presentation device(s) 110 can prompt the user(s) to provide the information and/or return the information to the metering circuitry 112. In some examples, the supplementary content processor circuitry 340 causes the interface circuitry 310 to transmit a request for the information to the audience measurement circuitry 104 and/or the supplementary media provider 108. In turn, the audience measurement circuitry 104 and/or the supplementary media provider 108 can return the information to the metering circuitry 112.

At block 722, the metering circuitry 112 associates the received information with the supplementary content data. For example, the supplementary content processor circuitry 340 can generate an association between the provider of the supplementary content and an address from which the supplementary content was received. Further, the supplementary content processor circuitry 340 can generate an association between the type of the supplementary content and/or the product or service associated and the supplementary content with at least a portion of the data associated with the supplementary content opportunity indication (e.g., the watermark, the fingerprint, etc.), the request for the supplementary content, the response(s) that led to the supplementary content, and/or the timespan over which the supplementary content was presented by the media presentation device(s) 110. In turn, the supplementary content processor circuitry 340 can store the associations in the supplementary content database 380. In some examples, the supplementary content processor circuitry 340 stores a timestamp indicative of when the associations were generated in the supplementary content database 380.

At block 724, the metering circuitry 112 stores the identified information associated with the supplementary content with an identifier of the media session and the associated media session interval during which the supplementary content, or indication of the supplementary content, was presented by the media presentation device(s) 110. For example, the supplementary content processor circuitry 340 can store the information associated with the supplementary content with the identifier and timespan associated with the media session in the media session database 390. In some examples, the supplementary content processor circuitry 340 stores an indication of whether the identified supplementary content was accessed or ignored by the user(s) associated with the media presentation device(s) 110 in the media session database 390.

FIG. 8 is a flowchart representative of example machine readable instructions and/or example operations 800 that may be executed and/or instantiated by processor circuitry to determine characteristics of primary content rendered by the media presentation device(s) 110. The example operations 800 can implement block 608 of the operations 600 of FIG. 6. The machine readable instructions and/or the operations 800 of FIG. 8 begin at block 802, at which the metering circuitry 112 (FIGS. 1 and 3) the primary content accessed by the media presentation device(s) 110 (FIGS. 1 and 2) is identifiable via a broadcast channel. For example, the primary content processor circuitry 330 (FIG. 3) can determine the media presentation device(s) 110 is receiving the primary content via a broadcast signal in response to the viewing data collection circuitry 325 (FIG. 3) determining an identifier of a broadcast and/or the traffic monitor circuitry 320 (FIG. 3) determining the media presentation device(s) 110 is receiving a broadcast signal. In response to the media presentation device(s) 110 receiving the primary content via a broadcast channel, the operations 800 proceed to block 802. Otherwise, in response to the media presentation device(s) 110 not receiving the primary content via a broadcast channel, the operations proceed to block 808.

At block 804, the metering circuitry 112 determines a program identifier associated with a program transmitted via the broadcast. In some examples, the primary content processor circuitry 330 determines the program identifier based on a frequency of a received broadcast signal and a time at which the broadcast signal is being received. In some examples, the primary content processor circuitry 330 determines the program identifier based on the identifier of the broadcast, the broadcast interval, and/or a content identifier that the viewing data collection circuitry 325 identified.

At block 806, the metering circuitry 112 verifies the determined program identifier. For example, the primary content processor circuitry 330 can compare the program identifier determined based on the frequency of the received broadcast signal with the program identifier determined based on the program identifier identified based on the viewing information. Further, the operations 800 proceed to block 814.

At block 808, the metering circuitry 112 identifies an application accessed by the media presentation device(s) 110. For example, in response to the media presentation device(s) 110 accessing the primary content via the Internet, the primary content processor circuitry 330 can identify the application that the media presentation device(s) 110 is accessing based on the application identifier that the data collection circuitry 325 stores via the media session database 390 (FIG. 3).

At block 810, the metering circuitry 112 determines whether the program identifier is identifiable based on the viewing information identified at block 604 (FIG. 6) and/or the supplementary content characteristics determined at block 606 (FIG. 6). For example, the primary content database 370 can include data indicative of supplementary content information associated with programs accessible via certain applications. As such, the primary content processor circuitry 330 can determine whether the identified supplementary content characteristics are associated with a specific program that is presented via the identified application. In response to the primary content being identifiable via the identified viewing information and/or the determined supplementary content characteristics, the operations 800 proceed to block 812. Otherwise, the operations 800 skip to block 816.

At block 812, the metering circuitry 112 determines the program identifier. For example, the primary content processor circuitry 330 can determine that identified supplementary content, such as a certain advertisement or an indication of information associated with the primary content, corresponds with a certain program presentable via the identified application. In some examples, the primary content circuitry 330 determines the program identifier based on the time at which one or more instances of supplementary content was accessed relative to a run time of the program. For example, a certain program provided by the identified application can offer opportunities to access certain supplemental content at certain times and, thus, the primary content processor circuitry 330 can determine the program identifier based on the identified supplemental content and the time at which the supplemental content, or the opportunity to access the supplemental content, was encountered.

At block 814, the metering circuitry 112 determines whether a program identifier associated with the media session information is known and/or verified. In response to the program identifier being known and/or verified, the operations 800 skip to block 820. Otherwise, the operations 800 proceed to block 816.

At block 816, the metering circuitry 112 requests a program identifier. For example, the primary content processor circuitry 330 can cause the interface circuitry 310 (FIG. 3) to transmit a request for the program identifier to the media presentation device(s) 110. In some examples, the media presentation device(s) 110 identifies the program identifier based on received signals. In some examples, the media presentation device(s) 110 requests the program identifier from an associated user(s). Further, the media presentation device(s) 110 can transmit the program identifier to the metering circuitry 112.

At block 818, the metering circuitry 112 associates the program identifier with at least a portion of the accessed media session information. For example, the primary content processor circuitry 330 can associate the program identifier with at least a portion of the data in the message(s) and/or signal(s) transmitted between the media presentation device(s) 110 and the primary media provider 102. In some examples, the primary content processor circuitry 330 stores the program identifier and the associated data indicative of the program identifier via the primary content database 370.

In some examples, the primary content processor circuitry 330 determines a data location in the data consumption messages associated with the program identifier based on portions of the data consumption messages that matched in previous media sessions associated with the same program identifier. For example, in response to encountering a first data consumption message associated with the program identifier at a first time and a second data consumption message associated with the program identifier at a second time, the primary content processor circuitry 330 determines a data location indicative of the program identifier based on respective positions of a first data portion of the first data consumption message and a second data portion of the second data consumption message that matches the first data portion. Thus, the primary content processor circuitry 330 can compare the messages and/or signals to identify a matching data portion in the first and second data that is indicative of the program identifier. In some examples, the primary content processor circuitry 330 identifies different data locations indicative of program identifiers for different providers (e.g., different ones of the primary media provider 102, different television stations or streaming services, etc.).

At block 820, the metering circuitry 112 stores the primary content characteristics with the media session interval. For example, the primary content process circuitry 330 can store the program identifier with the associated media session interval via the media session database 390 (FIG. 3).

FIG. 9 is a flowchart representative of example machine readable instructions and/or example operations 900 that may be executed and/or instantiated by processor circuitry to monitor and/or facilitate supplementary content traffic to associate demographics of supplementary content engagement with supplementary media providers. The machine readable instructions and/or the operations 900 of FIG. 9 begin at block 902, at which the audience measurement circuitry 104 (FIGS. 1 and 4) accesses a request for supplementary content. For example, the interface circuitry 410 (FIG. 4) can access a request for supplementary content transmitted by the media presentation device(s) 110. That is, the interface circuitry 410 can receive data associated with a watermark, fingerprint, and/or signature. Further, the request identification circuitry 420 (FIG. 4) can access the data associated with the request for the supplementary content.

At block 904, the audience measurement circuitry 104 causes transmission of a response to the media presentation device(s) 110 and/or a request to the supplementary media provider 108 (FIG. 1). For example, the request identification circuitry 420 can determine an address of the supplementary media provider 108 based on the data in the request received from the media presentation device(s) 110. In some examples, the request identification circuitry 420 identifies a file, a signal, and/or other response data based on the received request. In some examples, the request identification circuitry 420 determines an address of the supplementary media provider 108 based on the received request. In some examples, the request identification circuitry 420 can include the file, signal, and/or other response data in a response to the media presentation device(s) 110. In such examples, the response enables the media presentation device(s) 110 to obtain access to the supplementary content. For example, the media presentation device(s) 110 can utilize the response from the audience measurement circuitry 104 to generate another request to the supplementary media provider 108. In turn, the supplementary media provider 108 can provide the media presentation device(s) 110 access to the supplementary content. In some examples, the request identification circuitry 420 causes transmission of a request directly to the supplementary media provider 108 based on the data in the request received from the media presentation device(s) 110.

At block 906, the audience measurement circuitry 104 monitors traffic between the media presentation device(s) 110 and the supplementary media provider 108. For example, the device monitor circuitry 430 (FIG. 4) can monitor communications between the media presentation device(s) 110 and the supplementary media provider 108.

At block 908, the audience measurement circuitry 104 monitors traffic between other panelist devices and the supplementary media provider 108. For example, the server monitor circuitry 440 (FIG. 4) can monitor communications between the supplementary media provider and other media presentation devices registered with the audience measurement circuitry 104 (e.g., panelist devices). In some examples, the device monitor circuitry 430 monitors the communications between the supplementary media provider 108 and the other media presentation devices. For example, the other media presentation devices can be associated with the metering circuitry 112 similar to the media presentation device(s) 110.

At block 910, the audience measurement circuitry 104 determines whether to request information associated with the supplementary content. For example, the supplementary content characterization circuitry 450 (FIG. 4) can determine whether to request information associated with the supplementary content based on data stored in the server database 480 (FIG. 4) and/or the monitored communications between the supplementary media provider 108 and the media presentation device(s) 110 and/or the other media presentation devices registered with the audience measurement circuitry 104. In some examples, the supplementary content characterization circuitry 450 determines the information associated with the supplementary content is to be requested in response to the server database 480 not having data associated with the supplementary content for the supplementary media provider 108 and/or in response to the communications between the supplementary media provider 108 and the media presentation device(s) 110 and/or the other media presentation devices including different data than the data associated with the supplementary media provider 108 in the server database 480. In some examples, the supplementary content characterization circuitry 450 searches for registered pins in the communications between the supplementary media provider 108 and the media presentation device(s) 110 and/or the other media presentation devices. For example, the supplementary content characterization circuitry 450 can cross-reference pins stored in the server database 480 with data in the communications between the supplementary media provider 108 and the media presentation device(s) 110 and/or the other media presentation devices. In some examples, the pin can include a payload indicative of a source of the communication and/or a type of supplementary content provided via the communication. In some examples, in response to the communications not including a registered pin, the supplementary content characterization circuitry 450 determines information associated with the supplementary content is to be requested. In response to determining that information associated with the supplementary content is to be requested, the operations 900 proceed to block 912. Otherwise, the operations 900 skip to block 916.

At block 912, the audience measurement circuitry 104 causes transmission of the request for information associated with the supplementary content. For example, the supplementary content characterization circuitry 450 can cause the interface circuitry 410 to transmit the request to the supplementary media provider 108, the media presentation device(s) 110, the other media presentation devices registered with the audience measurement circuitry 104, and/or the metering circuitry 112.

At block 914, the audience measurement circuitry 104 determines whether the information associated with the supplementary content has been received. For example, the supplementary content characterization circuitry 450 can determine whether the information associated with the supplementary content has been received by the interface circuitry 410. In response to the information associated with the supplementary content being received, the operations 900 proceed to block 916. Otherwise, the operations 900 return to block 910.

At block 916, the audience measurement circuitry 104 links the information associated with the supplementary content with the supplementary media provider 108. In some examples, the supplementary content characterization circuitry 450 links the information received from the supplementary media provider 108, the media presentation device(s) 110, the other media presentation devices registered with the audience measurement circuitry 104, and/or the metering circuitry 112 with an identification value assigned to the supplementary media provider 108. The supplementary content characterization circuitry 450 stores the information linked to the supplementary media provider 108 via the server database 480.

At block 918, the audience measurement circuitry 104 determines an engagement of the media presentation device(s) 110 and/or the other media presentation devices registered with the audience measurement circuitry 104 with the supplementary content. For example, the supplementary content characterization circuitry 450 can determine engagement statistics based on a frequency (e.g., a rate of occurrence) of communications between the supplementary media provider 108 and the media presentation device(s) 110 and/or the respective other media presentation devices registered with the audience measurement circuitry 104.

At block 920, the audience measurement circuitry 104 identifies demographics associated with the media presentation device(s) 110 and/or any other registered media presentation devices identified in traffic associated with the supplementary media provider. For example, the demographics report generation circuitry 460 (FIG. 4) can identify the demographics associated with the media presentation device(s) 110. Specifically, the demographics report generation circuitry 460 can determine panelist identifiers associated with the media presentation device(s) 110 to identify the demographics. In some examples, the demographics report generation circuitry 460 determines the respective panelist identifiers based on a MAC address, an IP address, and/or some other identification value associated with the media presentation device(s) 110 and/or the other registered devices. In turn, the demographics report generation circuitry 460 performs a look-up of the respective panelist identifiers in the demographics database 490 (FIG. 4) and extracts demographic information associated with the respective panelist identifiers.

At block 922, the audience measurement circuitry 104 associates the identified supplementary content and the identified demographics with the supplementary media provider 108. For example, the demographics report generation circuitry 460 can associate the demographics and the engagement statistics associated with the supplementary media provider 108. In some examples, the demographics report generation circuitry 460 stores the associated demographics, the engagement statistics, and an identifier associated with the supplementary media provider 108 via the server database 480.

At block 924, the audience measurement circuitry 104 transmits a server demographics report to the supplementary media provider 108. For example, the demographics report generation circuitry 460 can generate the server demographics report. In some examples, the server demographics report includes the identifier associated with the supplementary media provider 108, the associated demographics of user(s) that encountered supplementary content from the supplementary media provider 108, and the engagement statistics. In some examples, the demographics report generation circuitry 460 causes the interface circuitry 410 to transmit the server demographics report to the supplementary media provider 108.

FIG. 10 is a flowchart representative of example machine readable instructions and/or example operations 1000 that may be executed and/or instantiated by processor circuitry to generate demographics reports indicative of demographics of users that encountered media and information associated with the media. The machine readable instructions and/or the operations 1000 of FIG. 10 begin at block 1002, at which the audience measurement circuitry 104 (FIGS. 1 and 4) accesses a media session report. For example, the audience measurement circuitry 104 can receive and/or extract the media session report generated by the metering circuitry 112 (FIGS. 1 and 3). In some examples, the metering circuitry 112 transmits data stored in the media session database 390 to the audience measurement circuitry 104. As such, the audience measurement circuitry 104 obtains identified viewing information associated with the media session, determined characteristics of primary content encountered by a user(s) associated with the media presentation device(s) 110 (FIGS. 1 and 2), determined characteristics of supplementary content encountered by the user(s), a determined engagement level(s) of the user(s), and a panelist identifier(s) associated with the user(s).

At block 1004, the audience measurement circuitry 104 associates the determined characteristics of the supplementary content with events in the primary content. In some examples, the demographics report generation circuitry 460 analyzes the primary content to identify timestamps associated with certain events encountered in primary content, such as a goal in a soccer game and/or a climax in a movie or television show. In some examples, the interface circuitry 410 (FIG. 4) receives data corresponding to the events encountered in the primary content from the primary media provider 102 (FIG. 1) via the network 114. In some examples, the demographics report generation circuitry 460 associates the events with supplementary content that the media presentation device(s) 110 rendered and/or had the opportunity to render. As such, the links between the events in the primary content and the characteristics of the supplementary content can provide an indication of triggers that caused the user(s) to access the supplementary content.

At block 1006, the audience measurement circuitry 104 identifies demographics associated with the user(s) identified in the media session report. For example, the demographics report generation circuitry 460 (FIG. 4) can access the panelist identifier(s) received in the media session report. In turn, the demographics report generation circuitry 460 can determine the demographic information associated with the panelist identifiers via the demographics database 490 (FIG. 4).

At block 1008, the audience measurement circuitry 104 generates a demographics report. For example, the demographics report generation circuitry 460 can generate the demographics report. In some examples, the demographics report includes the determined demographic information associated with the panelist identifiers, the identified viewing information, the characteristics associated with the primary content encountered during the media session, the characteristics associated with the supplementary content encountered during the media session, the audience engagement statistics, and/or the identified relationships between the events in the primary content and the characteristics associated with the supplementary content.

At block 1010, the audience measurement circuitry 104 causes transmission of the session demographics report. For example, the demographics report generation circuitry 460 can cause the interface circuitry 410 to transmit the demographics report to the primary media provider 102 and/or the supplementary media provider 108 via the network 114.

Figure 11:
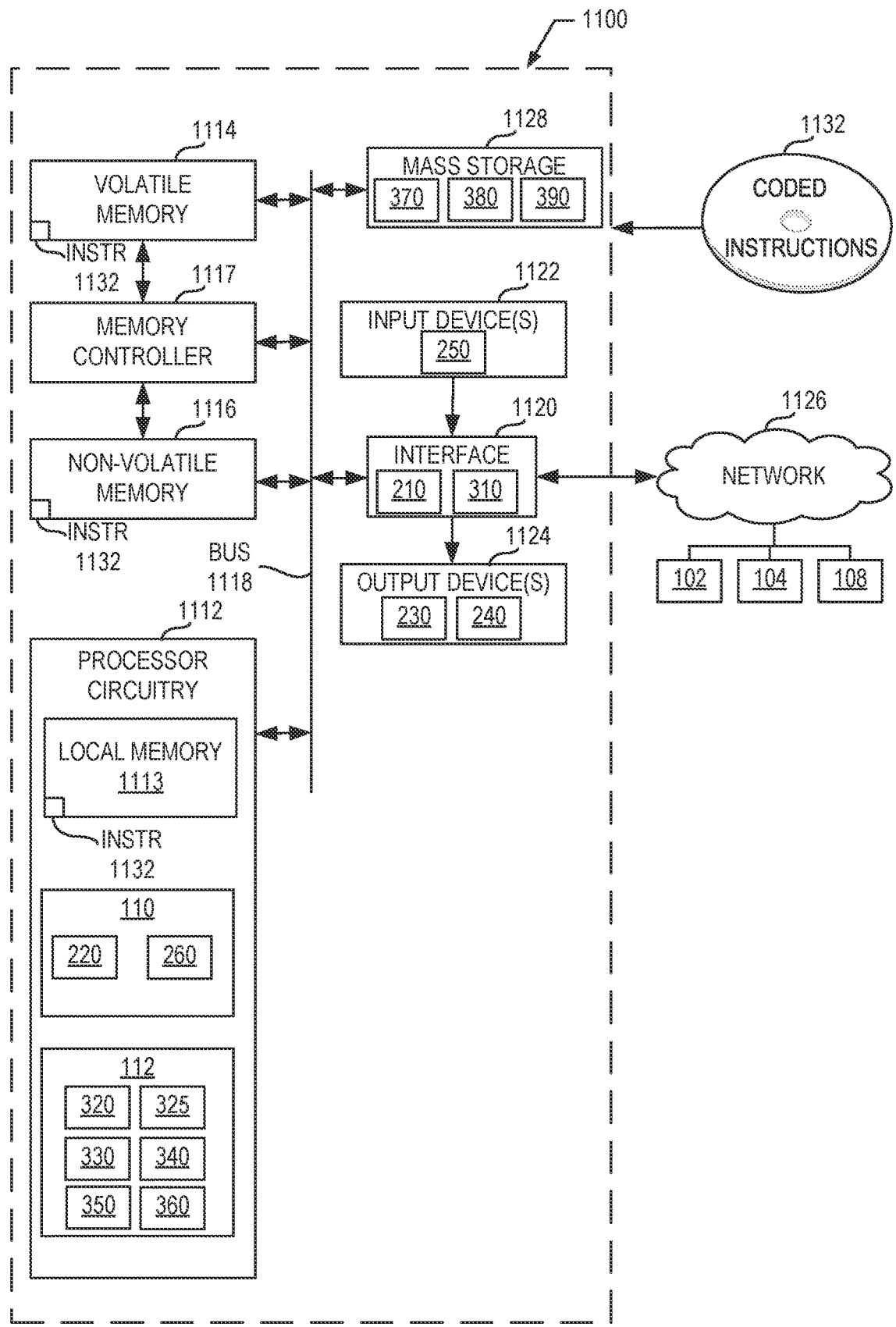
FIG. 11 is a block diagram of an example processing platform including processor circuitry structured to execute the example machine readable instructions and/or the example operations of FIGS. 5, 6, 7, and/or 8 to implement the example media presentation environment of FIGS. 1, 2, and/or 3.

FIG. 11 is a block diagram of an example processor platform 1100 structured to execute and/or instantiate the machine readable instructions and/or the operations of FIGS. 5-8 to implement the media presentation environment of FIG. 1. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the media presentation device(s) 110, the viewing information identification circuitry 260, the metering circuitry 112, the request circuitry 220, the traffic monitor circuitry 320, the viewing data collection circuitry 325, the primary content processor circuitry 330, the supplementary content processor circuitry 340, the audience engagement circuitry 350, and the media session report generation circuitry 360.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system. In this example, the input device(s) 1122 implement the user input circuitry 250.

One or more output devices 1124 are also connected to the interface circuitry 1120 of the illustrated example. The output device(s) 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. In this example, the output device(s) 1124 implement the display(s) 230 and the speaker(s) 240. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc. In this example, the interface circuitry 1120 implements the interface circuitry 210 and the interface circuitry 310.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the mass storage device(s) 1128 implement the primary content database 370, the supplementary content database 380, and the media session database 390.

The machine readable instructions 1132, which may be implemented by the machine readable instructions of FIGS. 5-8, may be stored in the mass storage device 1128, in the volatile memory 1114, in the non-volatile memory 1116, and/or on a removable non-transitory computer readable storage medium such as a CD or DVD.

Figure 12:
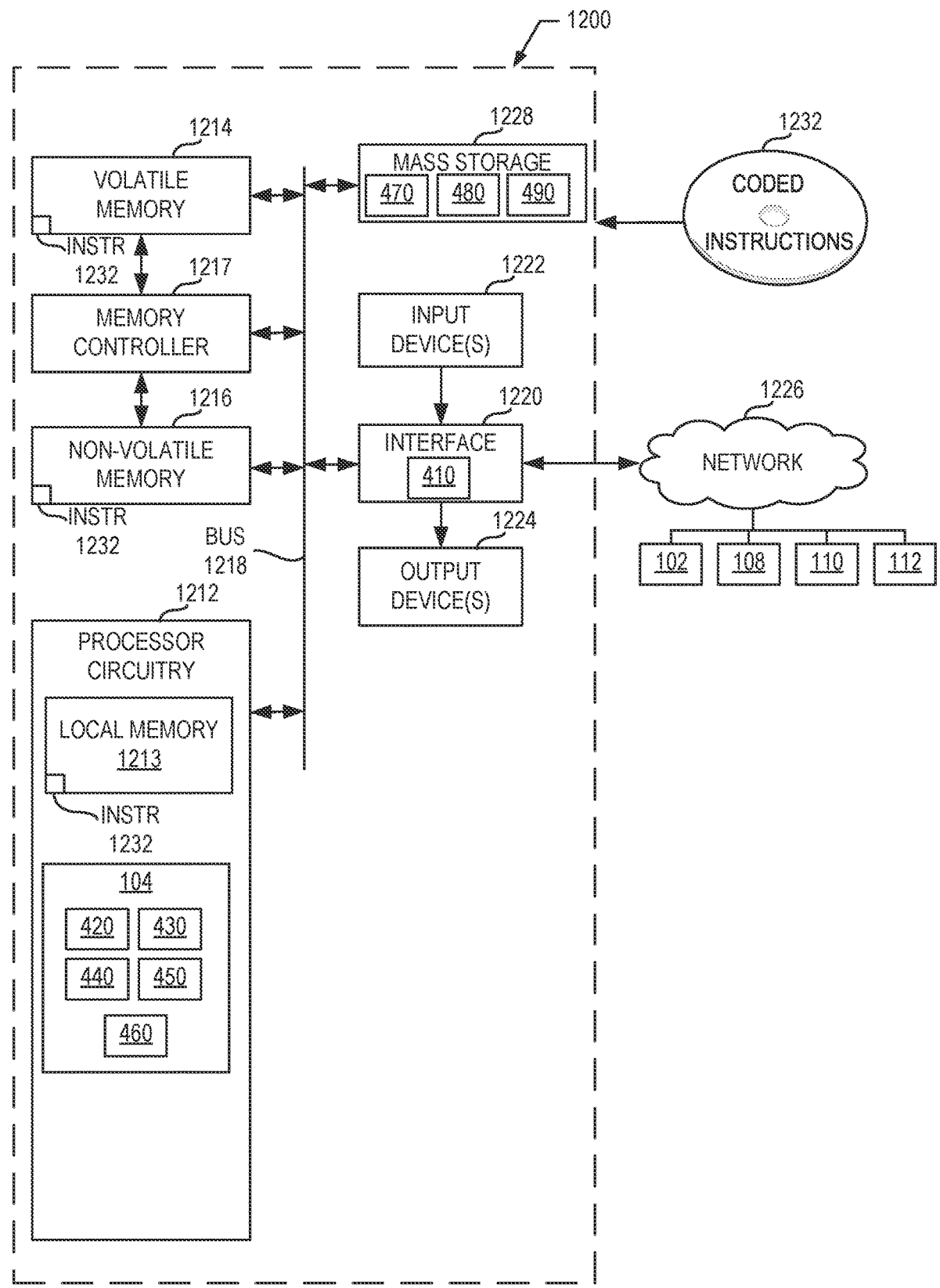
FIG. 12 is a block diagram of an example processing platform including processor circuitry structured to execute the example machine readable instructions and/or the example operations of FIGS. 9 and/or 10 to implement the example audience measurement circuitry of FIGS. 1 and/or 4.

FIG. 12 is a block diagram of an example processor platform 1200 structured to execute and/or instantiate the machine readable instructions and/or the operations of FIGS. 9-10 to implement the audience measurement circuitry 104 of FIGS. 1 and 4. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs, microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the audience measurement circuitry 104, the request identification circuitry 420, the device monitor circuitry 430, the server monitor circuitry 440, the supplementary content characterization circuitry 450, and the demographics report generation circuitry 460.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output device(s) 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc. In this example, the interface circuitry 1220 implements the interface circuitry 410.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the mass storage device(s) 1228 implement the primary content database 470, the server database 480, and the demographics database 490.

The machine readable instructions 1232, which may be implemented by the machine readable instructions of FIGS. 9-10, may be stored in the mass storage device 1228, in the volatile memory 1214, in the non-volatile memory 1216, and/or on a removable non-transitory computer readable storage medium such as a CD or DVD.

Figure 13:
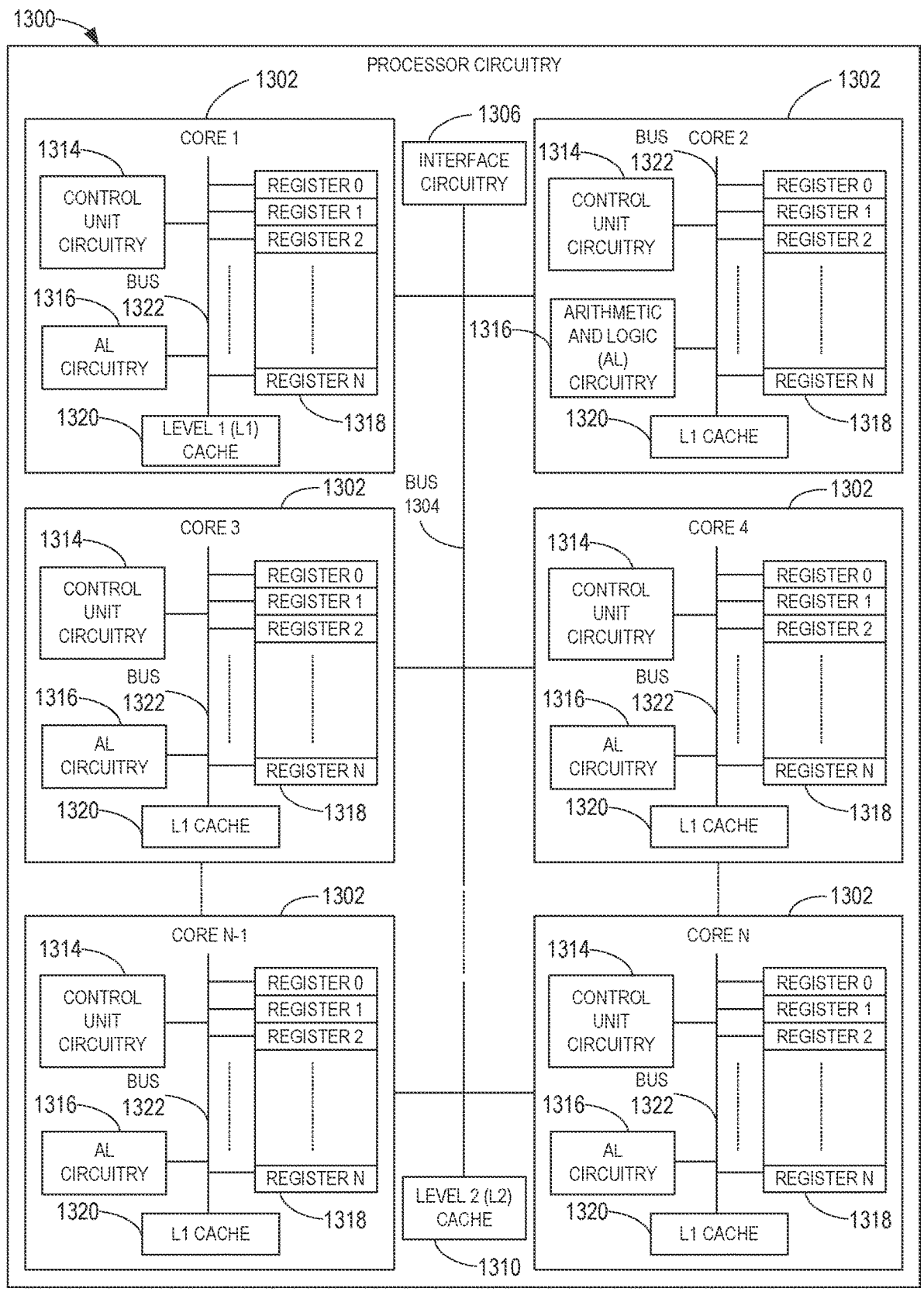
FIG. 13 is a block diagram of an example implementation of the processor circuitry of FIGS. 11 and/or 12.

FIG. 13 is a block diagram of an example implementation of the processor circuitry 1112, 1212 of FIGS. 11 and/or 12. In this example, the processor circuitry 1112, 1212 of FIGS. 11 and/or 12 is implemented by a microprocessor 1300. For example, the microprocessor 1300 may be a general purpose microprocessor (e.g., general purpose microprocessor circuitry). The microprocessor 1300 executes some or all of the machine readable instructions of the flowcharts of FIGS. 5, 6, 7, 8, 9, and/or 10 to effectively instantiate the circuitry of FIGS. 2, 3, and/or 4 as logic circuits to perform the operations corresponding to those machine readable instructions. In some such examples, the circuitry of FIGS. 2, 3, and/or 4 is instantiated by the hardware circuits of the microprocessor 1300 in combination with the instructions. For example, the microprocessor 1300 may be implemented by multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowcharts of FIGS. 5, 6, 7, 8, 9, and/or 10.

The cores 1302 may communicate by a first example bus 1304. In some examples, the first bus 1304 may be implemented by a communication bus to effectuate communication associated with one(s) of the cores 1302. For example, the first bus 1304 may be implemented by at least one of an Inter-Integrated Circuit (I2C) bus, a Serial Peripheral Interface (SPI) bus, a PCI bus, or a PCIe bus. Additionally or alternatively, the first bus 1304 may be implemented by any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2 cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1114, 1116 of FIG. 11, the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an ALU) 1316, a plurality of registers 1318, the local memory 1320, and a second example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating point operations. In yet other examples, the AL circuitry 1316 may include first AL circuitry that performs integer based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register(s), flag register(s), segment register(s), machine specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure including distributed throughout the core 1302 to shorten access time. The second bus 1322 may be implemented by at least one of an I2C bus, a SPI bus, a PCI bus, or a PCIe bus Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
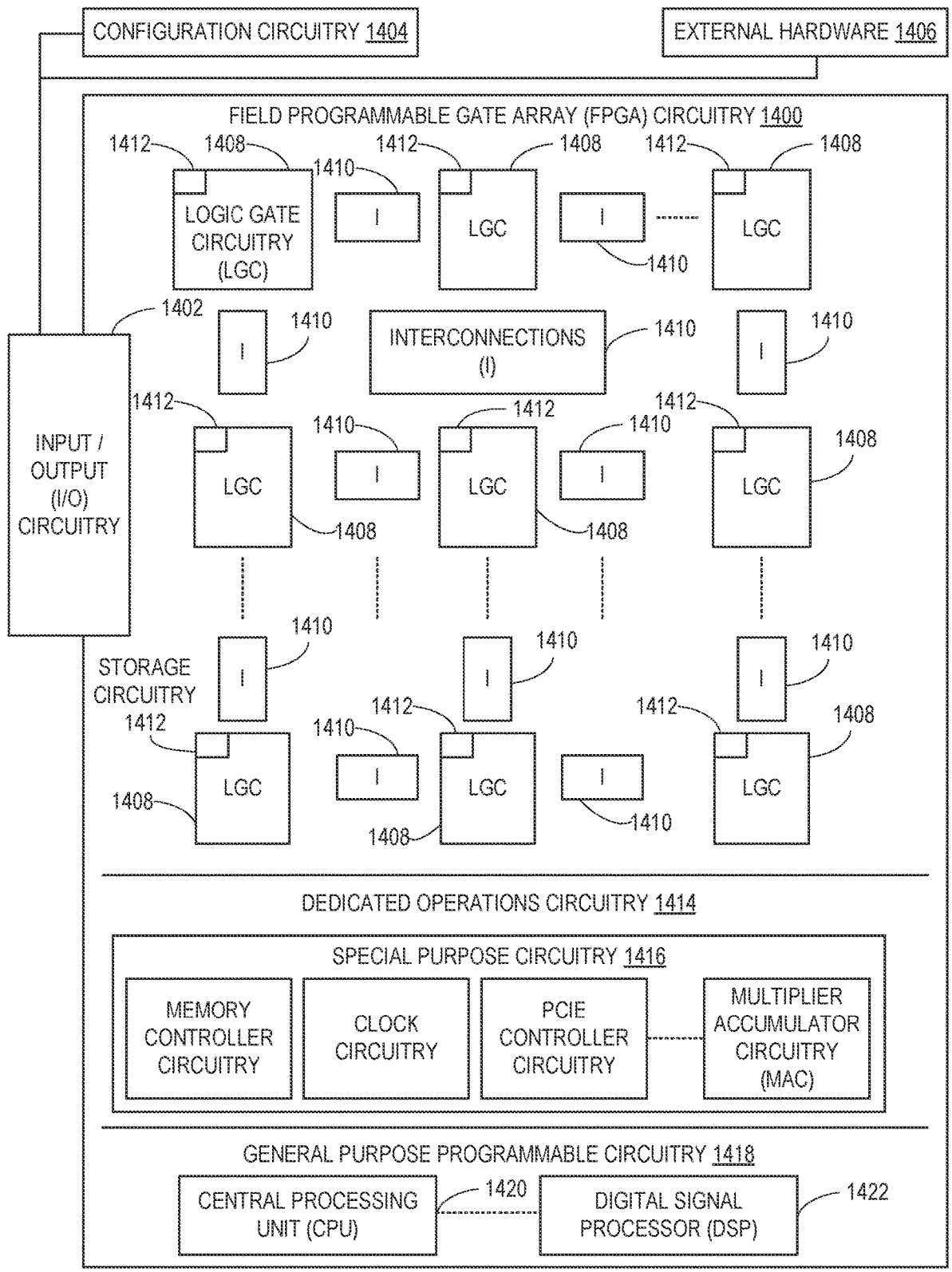
FIG. 14 is a block diagram of another example implementation of the processor circuitry of FIGS. 11 and/or 12.

FIG. 14 is a block diagram of another example implementation of the processor circuitry 1112, 1212 of FIGS. 11 and/or 12. In this example, the processor circuitry 1112, 1212 is implemented by FPGA circuitry 1400. For example, the FPGA circuitry 1400 may be implemented by an FPGA. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the machine readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine readable instructions represented by the flowcharts of FIGS. 5, 6, 7, 8, 9, and/or 10 but whose interconnections and logic circuitry are fixed once fabricated), the FPGA circuitry 1400 of the example of FIG. 14 includes interconnections and logic circuitry that may be configured and/or interconnected in different ways after fabrication to instantiate, for example, some or all of the machine readable instructions represented by the flowcharts of FIGS. 5, 6, 7, 8, 9, and/or 10. In particular, the FPGA circuitry 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowcharts of FIGS. 5, 6, 7, 8, 9, and/or 10. As such, the FPGA circuitry 1400 may be structured to effectively instantiate some or all of the machine readable instructions of the flowcharts of FIGS. 5, 6, 7, 8, 9, and/or 10 as dedicated logic circuits to perform the operations corresponding to those software instructions in a dedicated manner analogous to an ASIC. Therefore, the FPGA circuitry 1400 may perform the operations corresponding to the some or all of the machine readable instructions of FIGS. 5-10 faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 14, includes example input/output (I/O) circuitry 1402 to obtain and/or output data to/from example configuration circuitry 1404 and/or external hardware 1406. For example, the configuration circuitry 1404 may be implemented by interface circuitry that may obtain machine readable instructions to configure the FPGA circuitry 1400, or portion(s) thereof. In some such examples, the configuration circuitry 1404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may be implemented by external hardware circuitry. For example, the external hardware 1406 may be implemented by the microprocessor 1300 of FIG. 13. The FPGA circuitry 1400 also includes an array of example logic gate circuitry 1408, a plurality of example configurable interconnections 1410, and example storage circuitry 1412. The logic gate circuitry 1408 and the configurable interconnections 1410 are configurable to instantiate one or more operations that may correspond to at least some of the machine readable instructions of FIGS. 5-10 and/or other desired operations. The logic gate circuitry 1408 shown in FIG. 14 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The configurable interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the processor circuitry 1112, 1212 of FIGS. 11 and/or 12, many other approaches are contemplated. For example, as mentioned above, modern FPGA circuitry may include an on-board CPU, such as one or more of the example CPU 1420 of FIG. 14. Therefore, the processor circuitry 1112, 1212 of FIGS. 11 and/or 12 may additionally be implemented by combining the example microprocessor 1300 of FIG. 13 and the example FPGA circuitry 1400 of FIG. 14. In some such hybrid examples, a first portion of the machine readable instructions represented by the flowcharts of FIGS. 5, 6, 7, 8, 9, and/or 10 may be executed by one or more of the cores 1302 of FIG. 13, a second portion of the machine readable instructions represented by the flowcharts of FIGS. 5, 6, 7, 8, 9, and/or 10 may be executed by the FPGA circuitry 1400 of FIG. 14, and/or a third portion of the machine readable instructions represented by the flowcharts of FIGS. 5, 6, 7, 8, 9, and/or 10 may be executed by an ASIC. It should be understood that some or all of the circuitry of FIGS. 2, 3, and/or 4 may, thus, be instantiated at the same or different times. Some or all of the circuitry may be instantiated, for example, in one or more threads executing concurrently and/or in series. Moreover, in some examples, some or all of the circuitry of FIGS. 2, 3, and/or 4 may be implemented within one or more virtual machines and/or containers executing on the microprocessor.

In some examples, the processor circuitry 1112, 1212 of FIGS. 11 and/or 12 may be in one or more packages. For example, the microprocessor 1300 of FIG. 13 and/or the FPGA circuitry 1400 of FIG. 14 may be in one or more packages. In some examples, an XPU may be implemented by the processor circuitry 1112, 1212 of FIGS. 11 and/or 12, which may be in one or more packages. For example, the XPU may include a CPU in one package, a DSP in another package, a GPU in yet another package, and an FPGA in still yet another package.

Figure 15:
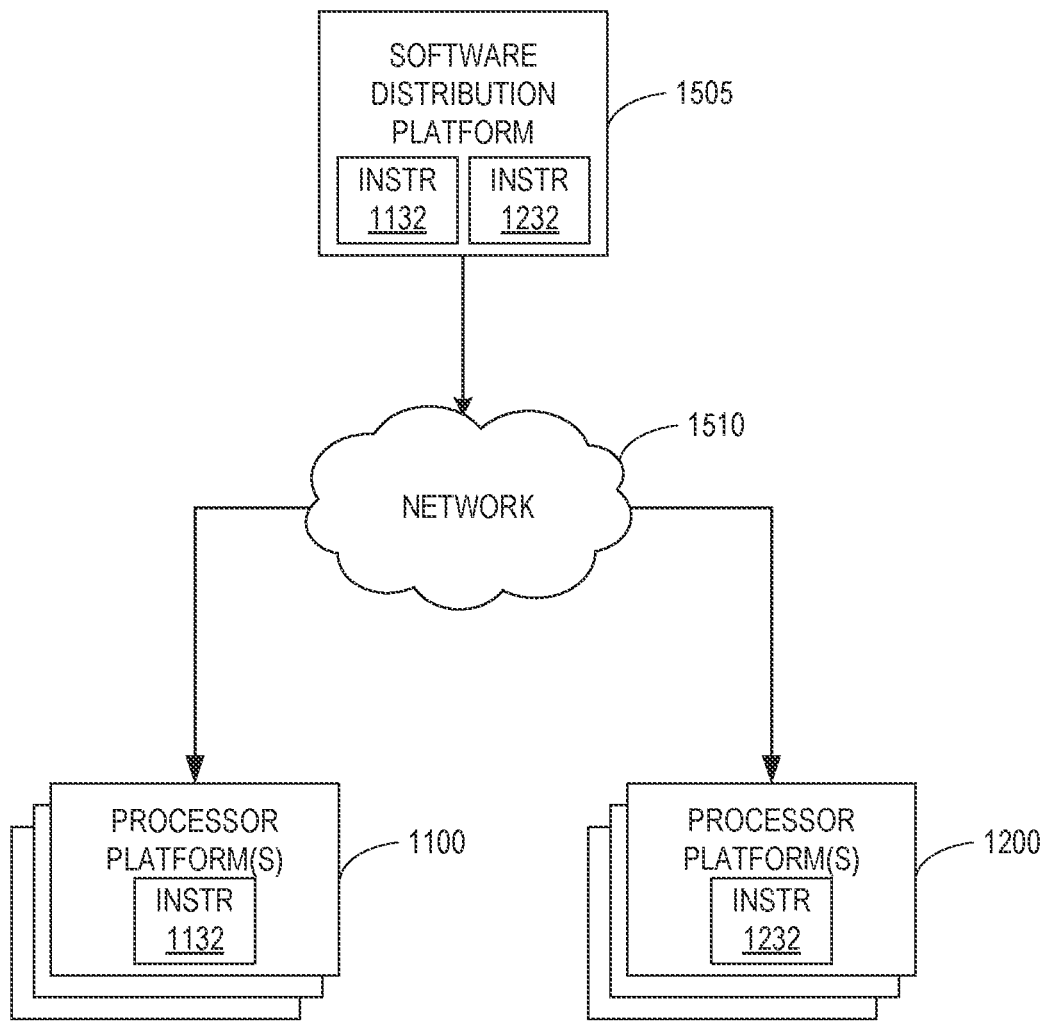
FIG. 15 is a block diagram of an example software distribution platform (e.g., one or more servers) to distribute software (e.g., software corresponding to the example machine readable instructions of FIGS. 5-10) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1505 to distribute software such as the example machine readable instructions 1132, 1232 of FIGS. 11 and/or 12 to hardware devices owned and/or operated by third parties is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform 1505. For example, the entity that owns and/or operates the software distribution platform 1505 may be a developer, a seller, and/or a licensor of software such as the example machine readable instructions 1132, 1232 of FIGS. 11 and/or 12. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the machine readable instructions 1132, 1232, which may correspond to the example machine readable instructions 500, 600, 700, 800, 900, 1000 of FIGS. 5-10, as described above. The one or more servers of the example software distribution platform 1505 are in communication with an example network 1510, which may correspond to any one or more of the Internet, a broadcast network, a hybrid broadcast/broadband network, and/or any of the example networks 114, 1126, 1226 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132, 1232 from the software distribution platform 1505. For example, the software, which may correspond to the example machine readable instructions 500, 600, 700, 800, 900, 1000 of FIGS. 5-10, may be downloaded to the example processor platform(s) 1100, 1200, which are to execute the machine readable instructions 1132, 1232 to implement the audience measurement circuitry 104, the media presentation device(s) 110, and/or the metering circuitry 112. In some examples, one or more servers of the software distribution platform 1505 periodically offer, transmit, and/or force updates to the software (e.g., the example machine readable instructions 1132, 1232 of FIGS. 11 and/or 12) to ensure improvements, patches, updates, etc., are distributed and applied to the software at the end user devices.

From the foregoing, it will be appreciated that example systems, methods, apparatus, and articles of manufacture have been disclosed that determine information associated with primary and supplementary content encountered by media devices. The example systems, methods, apparatus, and articles of manufacture enable audience engagement information to be determined based on the determined information associated with primary and supplementary content. The example systems, methods, apparatus, and articles of manufacture associate demographics of users that encountered the primary and supplementary content with the determined information and/or the audience engagement statistics. As such, the example systems, methods, apparatus, and articles of manufacture can provide the demographic information, the content information, and the audience engagement information to media providers to help the media providers determine content to be provided, presentation times for such content, advertisements to associate with certain content, etc. Furthermore, the example systems, methods, apparatus, and articles of manufacture can determine demographics associated with users that engaged with certain sources supplementary content. The example systems, methods, apparatus, and articles of manufacture can deliver the demographics to such sources with information associated with the encountered supplementary content.

Disclosed systems, methods, apparatus, and articles of manufacture improve the efficiency of using a computing device by enabling media information to be selectively verified to maintain an accuracy of such information while minimizing or otherwise reducing computing resources utilized for information verification. As such, the disclosed systems, methods, apparatus, and articles of manufacture enable maximal or otherwise increase computing resources to be dedicated to the monitoring and analysis of network traffic associated with media presentation devices to enable information communicated by the network traffic to be identified. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to determine media viewing information associated with hybrid content delivery are disclosed herein. Further examples and combinations thereof include the following:

Example 1 includes an apparatus to determine media viewing information comprising at least one memory, machine readable instructions, and processor circuitry to at least one of instantiate or execute the machine readable instructions to monitor network traffic associated with at least one device during a media session, determine viewing information associated with the media session based on a consumption data message in the network traffic, the consumption data message transmitted by the at least one device, determine a program identifier of primary content received by the at least one device, the program identifier indicative of a program presented as the primary content by the at least one device, associate a panelist identifier with the viewing information and the program identifier of the primary content, and generate a media session report based on the panelist identifier, the viewing information, and the program identifier.

Example 2 includes the apparatus of example 1, wherein the program identifier is determined based on a bitstream received by the at least one device.

Example 3 includes the apparatus of example 1, wherein the processor circuitry is to determine characteristics of supplementary content or a supplementary content opportunity encountered by the at least one device based on at least one of a watermark, a fingerprint, or a signature presented by the at least one device, and determine the program identifier of the primary content based on the characteristics of the supplementary content or the supplementary content opportunity.

Example 4 includes the apparatus of example 1, wherein the processor circuitry is to compare the program identifier to a portion of the viewing information, verify the program identifier in response to the portion of the viewing information being indicative of the program, and flag the program identifier in the media session report in response to the portion of the viewing information not being indicative of the program.

Example 5 includes the apparatus of example 1, wherein the consumption data message is a first consumption data message, wherein, in response to the at least one device transmitting a second consumption data message at least partially different from the first consumption data message when the program is being presented by the at least one device, the processor circuitry is to determine a data location indicative of the program identifier in the first consumption data message based on respective positions of a first data portion in the first consumption data message and a second data portion in the second consumption data message, the first data portion matching the second data portion.

Example 6 includes the apparatus of example 1, wherein the processor circuitry is to determine characteristics of supplementary content presented by the at least one device based on a request from the at least one device for the supplementary content and a response from a server with the supplementary content.

Example 7 includes the apparatus of example 6, wherein, to determine the characteristics of the supplementary content, the processor circuitry is to perform a look up of the server in a server database to identify information associated with the supplementary content, in response to the server not being identified in the server database cause the at least one device to request the information associated with the supplementary content, and in response to receiving the information, associate the information with the sever, and generate the media session report based on the information associated with the supplementary content.

Example 8 includes the apparatus of example 1, wherein the primary content corresponds to a broadcast in accordance with an ATSC example 3 includes 0 standard.

Example 9 includes the apparatus of example 1, wherein the viewing information includes an application identifier indicative of an application that the at least one device accessed to present the program.

Example 10 includes the apparatus of example 1, wherein the at least one device is at least one first device and the panelist identifier is a first panelist identifier, and the processor circuitry is to access a first request for supplementary content from the at least one first device, cause transmission of the first request to a server associated with the supplementary content, associate the first panelist identifier with the server, access a second request for the supplementary content from at least one second device, cause transmission of the second request to the server associated with the supplementary content, associate a second panelist identifier with the server, the second panelist identifier associated with the at least one second device, and determine demographics of engagement with the supplementary content provided by the server based on the first panelist identifier and the second panelist identifier.

Example 11 includes the apparatus of example 10, wherein the processor circuitry is to generate a server demographics report based on the determined demographics of engagement with the supplementary content, and cause transmission of the server demographics report to the server.

Example 12 includes a non-transitory machine readable storage medium comprising instructions that, when executed, cause processor circuitry to at least monitor network traffic associated with at least one device during a media session, determine viewing information associated with the media session based on a consumption data unit in the network traffic, the consumption data unit transmitted by the at least one device, determine a program identifier of primary content received by the at least one device, the program identifier indicative of a program presented as the primary content by the at least one device, associate a panelist identifier with the viewing information and the program identifier of the primary content, and generate a media session report based on the panelist identifier, the viewing information, and the program identifier.

Example 13 includes the non-transitory machine readable storage medium of example 12, wherein the program identifier is determined based on data received by the at least one device.

Example 14 includes the non-transitory machine readable storage medium of example 12, wherein the instructions, when executed, cause the processor circuitry to determine characteristics of supplementary content encountered by the at least one device based on at least one of a watermark, a fingerprint, or a signature presented by the at least one device, and determine the program identifier of the primary content based on the characteristics of the supplementary content.

Example 15 includes the non-transitory machine readable storage medium of example 12, wherein the instructions, when executed, cause the processor circuitry to compare the program identifier to a portion of the viewing information, verify the program identifier in response to the portion of the viewing information being indicative of the program, and flag the program identifier in the media session report in response to the portion of the viewing information not being indicative of the program.

Example 16 includes the non-transitory machine readable storage medium of example 12, wherein the consumption data unit is a first consumption data unit, wherein, in response to the at least one device transmitting a second consumption data unit at least partially different from the first consumption data unit when the program is being presented by the at least one device, wherein the instructions, when executed, cause the processor circuitry to determine a data location indicative of the program identifier in the first consumption data unit based on respective positions of a first data portion in the first consumption data unit and a second data portion in the second consumption data unit, the first data portion matching the second data portion.

Example 17 includes the non-transitory machine readable storage medium of example 12, wherein the instructions, when executed, cause the processor circuitry to determine characteristics of supplementary content presented by the at least one device based on a request from the at least one device for the supplementary content and a response from a server with the supplementary content.

Example 18 includes the non-transitory machine readable storage medium of example 17, wherein the instructions, when executed, cause the processor circuitry to perform a look up of the server in a server database to identify information associated with the supplementary content, in response to the server not being identified in the server database cause the at least one device to request the information associated with the supplementary content, and in response to receiving the information, associate the information with the sever, and generate the media session report based on the information associated with the supplementary content.

Example 19 includes the non-transitory machine readable storage medium of example 12, wherein the primary content corresponds to a broadcast in accordance with an ATSC example 3 includes 0 standard.

Example 20 includes the non-transitory machine readable storage medium of example 12, wherein the viewing information indicates a provider associated with the at least one device.

Example 21 includes the non-transitory machine readable storage medium of example 12, wherein the at least one device is at least one first device and the panelist identifier is a first panelist identifier, wherein the instructions, when executed, cause the processor circuitry to access a first request for supplementary content from the at least one first device, cause transmission of the first request to a server associated with the supplementary content, associate the first panelist identifier with the server, access a second request for the supplementary content from at least one second device, cause transmission of the second request to the server associated with the supplementary content, associate a second panelist identifier with the server, the second panelist identifier associated with the at least one second device, and determine demographics of engagement with the supplementary content provided by the server based on the first panelist identifier and the second panelist identifier.

Example 22 includes the non-transitory machine readable storage medium of example 21, wherein the instructions, when executed, cause the processor circuitry to generate a server demographics report based on the determined demographics of engagement with the supplementary content, and cause transmission of the server demographics report to the server.

Example 23 includes a method to determine media viewing information comprising monitoring network traffic associated with at least one device during a media session, determining viewing information associated with the media session based on a consumption data message in the network traffic, the consumption data message transmitted by the at least one device, determining a program identifier of primary content received by the at least one device, the program identifier indicative of a program presented as the primary content by the at least one device, associating a panelist identifier with the viewing information and the program identifier of the primary content, and generating a media session report based on the panelist identifier, the viewing information, and the program identifier.

Example 24 includes the method of example 23, wherein the program identifier is determined based on data received by the at least one device.

Example 25 includes the method of example 23, further including determining characteristics of supplementary content or a supplementary content opportunity encountered by the at least one device based on at least one of a watermark, a fingerprint, or a signature presented by the at least one device, and determine the program identifier of the primary content based on the characteristics of the supplementary content or the supplementary content opportunity.

Example 26 includes the method of example 23, further including determining an audience engagement level based on supplementary content requests transmitted by the at least one device in response to encountering supplementary content opportunities, and generating the media session report based on the audience engagement level.

Example 27 includes the method of example 23, further including comparing the program identifier to a portion of the viewing information, verifying the program identifier in response to the portion of the viewing information being indicative of the program, and flagging the program identifier in the media session report in response to the portion of the viewing information not being indicative of the program.

Example 28 includes the method of example 23, wherein the consumption data message is a first consumption data message, wherein, in response to the at least one device transmitting a second consumption data message at least partially different from the first consumption data message when the program is being presented by the at least one device, further including determining a data location indicative of the program identifier in the first consumption data message based on respective positions of a first data portion in the first consumption data message and a second data portion in the second consumption data message, the first data portion matching the second data portion.

Example 29 includes the method of example 23, further including determining characteristics of supplementary content presented by the at least one device based on a request from the at least one device for the supplementary content and a response from a server with the supplementary content.

Example 30 includes the method of example 29, wherein determining the characteristics of the supplementary content includes performing a look up of the server in a server database to identify information associated with the supplementary content, in response to the server not being identified in the server database causing the at least one device to request the information associated with the supplementary content, and in response to receiving the information, associating the information with the sever, and generating the media session report based on the information associated with the supplementary content.

Example 31 includes the method of example 23, wherein the primary content corresponds to a broadcast in accordance with an ATSC example 3 includes 0 standard.

Example 32 includes the method of example 23, wherein the viewing information includes location information associated with the at least one device.

Example 33 includes the method of example 23, wherein the at least one device is at least one first device and the panelist identifier is a first panelist identifier, further including accessing a first request for supplementary content from the at least one first device, causing transmission of the first request to a server associated with the supplementary content, associating the first panelist identifier with the server, accessing a second request for the supplementary content from at least one second device, causing transmission of the second request to the server associated with the supplementary content, associating a second panelist identifier with the server, the second panelist identifier associated with the at least one second device, and determine demographics of engagement with the supplementary content provided by the server based on the first panelist identifier and the second panelist identifier.

Example 34 includes the method of example 23, further including generating a server demographics report based on the determined demographics of engagement with the supplementary content, and causing transmission of the server demographics report to the server.

Example 35 includes an apparatus to determine media viewing information comprising at least one memory, machine readable instructions, and processor circuitry to at least one of instantiate or execute the machine readable instructions to monitor network traffic associated with at least one device during a media session, access first data in the network traffic, the first data associated with primary content to be presented by the at least one device, associate a program identifier of the primary content with the first data, the program identifier indicative of a program presented as the primary content by the at least one device, determine a source of the program based on the first data, in response to encountering second data in the network traffic that is partially different from the first data and is associated with the program identifier, determine a data location indicative of the program identifier based on respective positions of a first data portion of the first data and a second data portion of the second data, the first data portion matching the second data portion, associate a panelist identifier with the source and the program identifier of the primary content, and generate a media session report based on the panelist identifier, the source, and the program identifier.

Example 36 includes the apparatus of example 35, wherein the program identifier is a first program identifier, the program is a first program, and the processor circuitry is to access third data in the network traffic, identify a third data portion of the third data indicative of a second program identifier communicated by the third data based on the determined data location indicative of the first program identifier, identify a second program identifier associated with the third data portion, and generate the media session report based on the second program identifier.

Example 37 includes the apparatus of example 35, wherein the processor circuitry is to determine characteristics of supplementary content presented by the at least one device based on third data in the network traffic, the third data including a request from the at least one device for the supplementary content and a response from a server with the supplementary content.

Example 38 includes the apparatus of example 37, wherein, to determine the characteristics of the supplementary content, the processor circuitry is to perform a look up of the server identified in the second data in a server database to identify information associated with the supplementary content, in response to the server not being identified in the server database cause the at least one device to request the information associated with the supplementary content, and in response to receiving the information, associate the information with the sever identified in the third data, and generate the media session report based on the information associated with the supplementary content.

Example 39 includes the apparatus of example 35, wherein the primary content corresponds to a broadcast in accordance with an ATSC example 3 includes 0 standard.

Example 40 includes the apparatus of example 35, wherein the at least one device is at least one first device and the panelist identifier is a first panelist identifier, and the processor circuitry is to access a first request for supplementary content from the at least one first device, cause transmission of the first request to a server associated with the supplementary content, associate the first panelist identifier with the server, access a second request for the supplementary content from at least one second device, cause transmission of the second request to the server associated with the supplementary content, associate a second panelist identifier with the server, the second panelist identifier associated with the at least one second device, and determine demographics of engagement with the supplementary content provided by the server based on the first panelist identifier and the second panelist identifier.

Example 41 includes the apparatus of example 40, wherein the processor circuitry is to generate a server demographics report based on the determined demographics of engagement with the supplementary content, and cause transmission of the server demographics report to the server.

Example 42 includes a non-transitory machine readable storage medium comprising instructions that, when executed, cause processor circuitry to at least monitor network traffic associated with at least one device during a media session, determine characteristics of supplementary content encountered by the at least one device based on data in the network traffic, the data including at least one of a request from the at least one device for the supplementary content or a response from a server to deliver the supplementary content, associate a panelist identifier with the determined characteristics of the supplementary content, and generate a media session report based on the panelist identifier and the determined characteristics of the supplementary content.

Example 43 includes the non-transitory machine readable storage medium of example 42, wherein the characteristics are first characteristics and the data is first data, wherein the instructions, when executed, cause the processor circuitry to determine second characteristics of primary content presented by the at least one device during the media session based on second data in the network traffic, the second characteristics including a source of the primary content and a program presented as the primary content, and generate the media session report based on the second characteristics associated with the primary content.

Example 44 includes the non-transitory machine readable storage medium of example 42, wherein the instructions, when executed, cause the processor circuitry to access a first identifier of the program from a user, associate the first identifier of the program with the second data, in response to encountering third data in the network traffic at least partially different from the second data, access a second identifier from the user, and in response to the second identifier matching the first identifier identify a matching data portion between the second data and the third data, and associate the matching data portion with the program.

Example 45 includes the non-transitory machine readable storage medium of example 42, wherein the characteristics are first characteristics, the supplementary content is first supplemental content, the request is a first request, and the data is first data, wherein the instructions, when executed, cause the processor circuitry to determine second characteristics of second supplementary content based on second data in the network traffic, determine an opportunity to present the second supplementary content was ignored in response to the second data not being transmitted by the at least one device in a second request and the at least one device terminating a presentation of a signature associated with the second supplementary content, and generate the media session report to include at least one of the second characteristics of the second supplementary content or an indication that the second supplementary content was ignored.

Example 46 includes the non-transitory machine readable storage medium of example 42, wherein the instructions, when executed, cause the processor circuitry to determine an audience engagement level associated with the at least one device during the media session based on the request from the at least one device for the supplementary content, and generate the media session report based on the audience engagement level.

Example 47 includes the non-transitory machine readable storage medium of example 42, wherein, to determine the characteristics of the supplementary content, the instructions, when executed, cause the processor circuitry to perform a look up of the server identified in the data in a supplementary content database to identify information associated with the supplementary content, in response to the server not being associated with valid information in the supplementary content database cause the at least one device to request the information associated with the supplementary content, and in response to receiving the information, associate the information with the sever.

Example 48 includes the non-transitory machine readable storage medium of example 42, wherein the instructions, when executed, cause the processor circuitry to determine information in the supplementary content database is invalid in response to the information not being verified within a threshold period.

Example 49 includes the non-transitory machine readable storage medium of example 48, wherein the information includes a first portion and a second portion of the information, the first portion associated with a first threshold period for verification, the second portion associated with a second threshold period for verification.

Example 50 includes the non-transitory machine readable storage medium of example 42, wherein the network traffic corresponds with a broadcast in accordance with ATSC example 3 includes 0 standards.

Example 51 includes the non-transitory machine readable storage medium of example 42, wherein the at least one device is at least one first device and the panelist identifier is a first panelist identifier, and wherein the instructions, when executed, cause the processor circuitry to access a first request for the supplementary content from the at least one first device, cause transmission of the first request to the server associated with the supplementary content, associate the first panelist identifier with the server, access a second request for the supplementary content from at least one second device, cause transmission of the second request to the server associated with the supplementary content, associate a second panelist identifier associated with the at least one second device with the server, determine demographics of engagement with the supplementary content provided by the server based on the first panelist identifier and the second panelist identifier, generate a server demographics report based on the determined demographics of engagement with the supplementary content, and cause transmission of the server demographics report to the server.

Example 52 includes a method to determine media viewing information comprising monitoring network traffic associated with at least one device during a media session, determining first characteristics of primary content presented by the at least one device during the media session based on first data in the network traffic, the first characteristics including a first source of the primary content and a program associated with the primary content, determining second characteristics of supplementary content presented by the at least one device based on second data in the network traffic, the second data including at least one of a request from the at least one device for the supplementary content or a response from a second source to provide the supplementary content, associating a panelist identifier with the determined first characteristics of the primary content and the determined second characteristics of the supplementary content, and generating a media session report based on the panelist identifier, the determined first characteristics of the primary content, and the determined second characteristics of the supplementary content.

Example 53 includes the method of example 52, wherein the at least one device is at least one first device, the panelist identifier is a first panelist identifier, and the request is a first request, further including accessing the first request for supplementary content from the at least one first device, associating the first panelist identifier with an address of the second source, accessing a second request for the supplementary content from at least one second device, associating a second panelist identifier associated with the at least one second device with the address of the second source, determining demographics of engagement with the supplementary content provided by the second source based on the first panelist identifier and the second panelist identifier, generating a server demographics report based on the determined demographics of engagement with the supplementary content, and causing transmission of the server demographics report to the second source.

Example 54 includes the method of example 52, further including determining an audience engagement level based on the determined first characteristics and the determined second characteristics, and generating the media session report based on the audience engagement level.

Example 55 includes a method to determine media viewing information comprising monitoring network traffic associated with at least one device during a media session, accessing first data in the network traffic, the first data associated with primary content to be presented by the at least one device, associating a program identifier of the primary content with the first data, the program identifier indicative of a program presented as the primary content by the at least one device, determining a source of the program based on the first data, in response to encountering second data in the network traffic that is partially different from the first data and is associated with the program identifier, determining a data location indicative of the program identifier based on respective positions of a first data portion of the first data and a second data portion of the second data, the first data portion matching the second data portion, associating a panelist identifier with the source and the program identifier of the primary content, and generating a media session report based on the panelist identifier, the source, and the program identifier.

Example 56 includes a non-transitory machine readable storage medium comprising instructions that, when executed, cause processor circuitry to at least monitor network traffic associated with at least one device during a media session, access first data in the network traffic, the first data associated with primary content to be presented by the at least one device, associate a program identifier of the primary content with the first data, the program identifier indicative of a program presented as the primary content by the at least one device, determine a source of the program based on the first data, in response to encountering second data in the network traffic that is partially different from the first data and is associated with the program identifier, determine a data location indicative of the program identifier based on respective positions of a first data portion of the first data and a second data portion of the second data, the first data portion matching the second data portion, associate a panelist identifier with the source and the program identifier of the primary content, and generate a media session report based on the panelist identifier, the source, and the program identifier.

Example 57 includes an apparatus to determine media viewing information comprising means for monitoring network traffic associated with at least one device during a media session, means for accessing first data in the network traffic, the first data associated with primary content to be presented by the at least one device, means for associating a program identifier of the primary content with the first data, the program identifier indicative of a program presented as the primary content by the at least one device, means for determining a source of the program based on the first data, means for determining a data location indicative of the program identifier based on respective positions of a first data portion of the first data and a second data portion of second data in response to encountering the second data in the network traffic, the second data partially different from the first data, the second data associated with the program identifier, the first data portion matching the second data portion, means for associating a panelist identifier with the source and the program identifier of the primary content, and means for generating a media session report based on the panelist identifier, the source, and the program identifier.

Example 58 includes an apparatus to determine media viewing information comprising at least one memory, machine readable instructions, and processor circuitry to at least one of instantiate or execute the machine readable instructions to monitor network traffic associated with at least one device during a media session, determine characteristics of supplementary content encountered by the at least one device based on data in the network traffic, the data including at least one of a request from the at least one device for the supplementary content or a response from a server to deliver the supplementary content, associate a panelist identifier with the determined characteristics of the supplementary content, and generate a media session report based on the panelist identifier and the determined characteristics of the supplementary content.

Example 59 includes a method to determine media viewing information comprising monitoring network traffic associated with at least one device during a media session, determining characteristics of supplementary content encountered by the at least one device based on data in the network traffic, the data including at least one of a request from the at least one device for the supplementary content or a response from a server to deliver the supplementary content, associating a panelist identifier with the determined characteristics of the supplementary content, and generating a media session report based on the panelist identifier and the determined characteristics of the supplementary content.

Example 60 includes an apparatus to determine media viewing information comprising means for monitoring network traffic associated with at least one device during a media session, means for determining characteristics of supplementary content encountered by the at least one device based on data in the network traffic, the data including at least one of a request from the at least one device for the supplementary content or a response from a server to deliver the supplementary content, means for associating a panelist identifier with the determined characteristics of the supplementary content, and means for generating a media session report based on the panelist identifier and the determined characteristics of the supplementary content.

Example 61 includes an apparatus to determine media viewing information comprising at least one memory, machine readable instructions, and processor circuitry to at least one of instantiate or execute the machine readable instructions to monitor network traffic associated with at least one device during a media session, determine first characteristics of primary content presented by the at least one device during the media session based on first data in the network traffic, the first characteristics including a first source of the primary content and a program associated with the primary content, determine second characteristics of supplementary content presented by the at least one device based on second data in the network traffic, the second data including at least one of a request from the at least one device for the supplementary content or a response from a second source to provide the supplementary content, associate a panelist identifier with the determined first characteristics of the primary content and the determined second characteristics of the supplementary content, and generate a media session report based on the panelist identifier, the determined first characteristics of the primary content, and the determined second characteristics of the supplementary content.

Example 62 includes a non-transitory machine readable storage medium comprising instructions that, when executed, cause processor circuitry to at least monitor network traffic associated with at least one device during a media session, determine first characteristics of primary content presented by the at least one device during the media session based on first data in the network traffic, the first characteristics including a first source of the primary content and a program associated with the primary content, determine second characteristics of supplementary content presented by the at least one device based on second data in the network traffic, the second data including at least one of a request from the at least one device for the supplementary content or a response from a second source to provide the supplementary content, associate a panelist identifier with the determined first characteristics of the primary content and the determined second characteristics of the supplementary content, and generate a media session report based on the panelist identifier, the determined first characteristics of the primary content, and the determined second characteristics of the supplementary content.

Example 63 includes an apparatus to determine media viewing information comprising means for monitoring network traffic associated with at least one device during a media session, means for determining first characteristics of primary content presented by the at least one device during the media session based on first data in the network traffic, the first characteristics including a first source of the primary content and a program associated with the primary content, means for determining second characteristics of supplementary content presented by the at least one device based on second data in the network traffic, the second data including at least one of a request from the at least one device for the supplementary content or a response from a second source to provide the supplementary content, means for associating a panelist identifier with the determined first characteristics of the primary content and the determined second characteristics of the supplementary content, and means for generating a media session report based on the panelist identifier, the determined first characteristics of the primary content, and the determined second characteristics of the supplementary content.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A metering device of an audience measurement entity, the metering device comprising:
  a processor; and
  at least one memory storing machine readable instructions that, when executed by the processor, cause the metering device to perform operations comprising:
    during a media session in which at least one media presentation device renders (i) primary content requested and received by the at least one media presentation device from a primary media provider and (ii) supplementary content associated with the primary content, requested and received by the at least one media presentation device from a supplementary media provider, monitoring network traffic between the at least one media presentation device and the primary media provider and between the at least one media presentation device and the supplementary media provider, wherein the metering device is connected to the at least one media presentation device and located locally with the at least one media presentation device in a media presentation environment;
    determining viewing information associated with the media session based on a consumption data message in the network traffic, the consumption data message transmitted by the at least one media presentation device;
    determining a program identifier of the primary content, the program identifier indicative of a program presented as the primary content by the at least one media presentation device;

determining an engagement level of the media session based at least in part on making a determination that the supplementary content is not being ignored based on detecting both: (i) one or more of a signature or a watermark associated with presentation of the supplementary content, and (ii) a request for the supplementary content from the at least one media presentation device to the supplementary media provider;

determining a panelist identifier of a user of the at least one media presentation device;

associating the panelist identifier with the viewing information, the program identifier of the primary content, and the engagement level of the media session;

generating a media session report based on the panelist identifier, the viewing information, the program identifier, and the engagement level of the media session, the media session report indicating exposure of the user to the primary content and the supplementary content during the media session; and transmitting the media session report over a network to a remote server associated with the audience measurement entity.

2. The metering device of claim 1, wherein the program identifier is determined based on a bitstream received by the at least one media presentation device.

3. The metering device of claim 1,
wherein determining the program identifier of the primary content comprises determining the program identifier of the primary content based at least in part on the monitored network traffic between the at least one media presentation device and the supplementary media provider.

4. The metering device of claim 1, the operations further comprising:
comparing the program identifier to a portion of the viewing information;
verifying the program identifier in response to the portion of the viewing information being indicative of the program; and
flagging the program identifier in the media session report in response to the portion of the viewing information not being indicative of the program.

5. The metering device of claim 1, wherein the consumption data message is a first consumption data message,
wherein the operations further comprise, in response to the at least one media presentation device transmitting a second consumption data message at least partially different from the first consumption data message when the program is being presented by the at least one media presentation device, determining a data location indicative of the program identifier in the first consumption data message based on respective positions of a first data portion in the first consumption data message and a second data portion in the second consumption data message, the first data portion matching the second data portion.

6. The metering device of claim 1, the operations further comprising:
determining characteristics of the supplementary content rendered by the at least one media presentation device based on a request from the at least one media presentation device for the supplementary content and a response from a server with the supplementary content.

7. The metering device of claim 6, wherein, determining the characteristics of the supplementary content comprises:
performing a look up of the server in a server database to identify information associated with the supplementary content;
in response to the server not being identified in the server database:
causing the at least one media presentation device to request the information associated with the supplementary content; and
in response to receiving the information, associating the information with the server; and
generating the media session report based on the information associated with the supplementary content.

8. The metering device of claim 1, wherein the primary content corresponds to a broadcast in accordance with an ATSC 3.0 standard.

9. The metering device of claim 1, wherein the viewing information includes an application identifier indicative of an application that the at least one media presentation device accessed to present the program.

10. The metering device of claim 1, wherein the at least one media presentation device is at least one first media presentation device and the panelist identifier is a first panelist identifier, and the operations further comprise:
accessing a first request for the supplementary content from the at least one first media presentation device;
causing transmission of the first request to a server associated with the supplementary content;
associating the first panelist identifier with the server;
accessing a second request for the supplementary content from at least one second media presentation device;
causing transmission of the second request to the server associated with the supplementary content;
associating a second panelist identifier with the server, the second panelist identifier associated with the at least one second media presentation device; and
determining demographics of an audience of the supplementary content provided by the server based on the first panelist identifier and the second panelist identifier.

11. The metering device of claim 10, the operations further comprising:
generating a server demographics report based on the determined demographics of the audience; and
causing transmission of the server demographics report to the server.

12. The metering device of claim 1, the operations further comprising:
determining the engagement level of the media session based at least in part on an extent of supplementary content requests transmitted by the at least one media presentation device in response to encountering supplementary content opportunities during the media session, the supplementary content requests including a request for the supplementary content; and
associating the panelist identifier with the engagement level.

13. A non-transitory machine readable storage medium comprising instructions that, when executed, cause a processor of a metering device of an audience measurement entity to perform operations comprising:
during a media session in which at least one media presentation device renders (i) primary content requested and received by the at least one media presentation device from a primary media provider and (ii) supplementary content associated with the primary content, requested and received by the at least one media presentation device from a supplementary media provider, monitoring network traffic between the at least one media presentation device and the primary media provider and between the at least one media presentation device and the supplementary media provider, wherein the metering device is connected to the at least one media presentation device and located locally with the at least one media presentation device in a media presentation environment;

determining viewing information associated with the media session based on a consumption data unit in the network traffic, the consumption data unit transmitted by the at least one media presentation device;

determining a program identifier of the primary content, the program identifier indicative of a program presented as the primary content by the at least one media presentation device;

determining an engagement level of the media session based at least in part on making a determination that the supplementary content is not being ignored based on detecting both: (i) one or more of a signature or a watermark associated with presentation of the supplementary content, and (ii) a request for the supplementary content from the at least one media presentation device to the supplementary media provider;

determining a panelist identifier of a user of the at least one media presentation device;

associating the panelist identifier with the viewing information, the program identifier of the primary content, and the engagement level of the media session;

generating a media session report based on the panelist identifier, the viewing information, the program identifier, and the engagement level of the media session, the media session report indicating exposure of the user to the primary content and the supplementary content during the media session; and transmitting the media session report over a network to a remote server associated with the audience measurement entity.

14. The non-transitory machine readable storage medium of claim 13, the operations further comprising:
wherein determining the program identifier of the primary content comprises determining the program identifier of the primary content based at least in part on the monitored network traffic between the at least one media presentation device and the supplementary media provider.

15. The non-transitory machine readable storage medium of claim 13, wherein the primary content corresponds to a broadcast in accordance with an ATSC 3.0 standard.

16. The non-transitory machine readable storage medium of claim 13, the operations further comprising:
determining the engagement level of the media session based at least in part on an extent of supplementary content requests transmitted by the at least one media presentation device in response to encountering supplementary content opportunities during the media session, the supplementary content requests including a request for the supplementary content; and
associating the panelist identifier with the engagement level.

17. A method performed by a metering device of an audience measurement entity, the metering device comprising a processor, the method comprising:
during a media session in which at least one media presentation device renders (i) primary content requested and received by the at least one media presentation device from a primary media provider and (ii) supplementary content associated with the primary content, requested and received by the at least one media presentation device from a supplementary media provider, monitoring network traffic between the at least one media presentation device and the primary media provider and between the at least one media presentation device and the supplementary media provider, wherein the metering device is connected to the at least one media presentation device and located locally with the at least one media presentation device in a media presentation environment;

determining viewing information associated with the media session based on a consumption data message in the network traffic, the consumption data message transmitted by the at least one media presentation device;

determining a program identifier of the primary content, the program identifier indicative of a program presented as the primary content by the at least one media presentation device;

determining an engagement level of the media session based at least in part on making a determination that the supplementary content is not being ignored based on detecting both: (i) one or more of a signature or a watermark associated with presentation of the supplementary content, and (ii) a request for the supplementary content from the at least one media presentation device to the supplementary media provider;

determining a panelist identifier of a user of the at least one media presentation device;

associating the panelist identifier with the viewing information, the program identifier of the primary content, and the engagement level of the media session;

generating a media session report based on the panelist identifier, the viewing information, and the program identifier, and the engagement level of the media session, the media session report indicating exposure of the user to the primary content and the supplementary content during the media session; and transmitting the media session report over a network to a remote server associated with the audience measurement entity.

18. The method of claim 17, wherein the program identifier is determined based on data received by the at least one media presentation device.

19. The method of claim 17, further comprising:
determining the engagement level of the media session based at least in part on an extent of supplementary content requests transmitted by the at least one media presentation device in response to encountering supplementary content opportunities during the media session, the supplementary content requests including a request for the supplementary content; and
associating the panelist identifier with the engagement level.

20. The method of claim 17, wherein the viewing information includes location information associated with the at least one media presentation device.

* * * * *